US008068841B2

(12) United States Patent
Laroia et al.

(10) Patent No.: US 8,068,841 B2
(45) Date of Patent: *Nov. 29, 2011

(54) MULTI-CARRIER COMMUNICATIONS METHODS AND APPARATUS

(75) Inventors: Rajiv Laroia, Basking Ridge, NJ (US); Junyi Li, Bedminster, NJ (US); Tom Richardson, South Orange, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 1231 days.

This patent is subject to a terminal disclaimer.

(21) Appl. No.: 11/004,366

(22) Filed: Dec. 3, 2004

(65) Prior Publication Data

US 2005/0250502 A1    Nov. 10, 2005

Related U.S. Application Data

(63) Continuation-in-part of application No. PCT/US2004/034988, filed on Oct. 15, 2004, and a continuation-in-part of application No. PCT/US2004/034295, filed on Oct. 15, 2004.

(60) Provisional application No. 60/562,901, filed on Apr. 15, 2004, provisional application No. 60/619,540, filed on Oct. 15, 2004.

(51) Int. Cl.
*H04W 40/00* (2009.01)

(52) U.S. Cl. ............... 455/447; 455/450; 455/422.1

(58) Field of Classification Search ............ 455/12, 455/447, 67.11, 446, 422, 17, 450–452, 455, 455/464, 509, 511, 434, 515, 516, 556, 426, 455/437, 444, 436, 422.1, 556.1, 556.2; 370/342, 370/465, 468, 332, 335, 352; 375/200, 206, 375/287, 286

See application file for complete search history.

(56) References Cited

U.S. PATENT DOCUMENTS

| 5,228,029 A | * | 7/1993 | Kotzin ...................... 370/331 |
| 5,230,081 A | | 7/1993 | Yamada et al. |
| 5,353,332 A | * | 10/1994 | Raith et al. ................ 455/455 |
| 5,475,677 A | | 12/1995 | Arnold et al. |
| 5,493,563 A | | 2/1996 | Rozanski et al. |
| 5,513,379 A | | 4/1996 | Benveniste et al. |
| 5,548,813 A | | 8/1996 | Charas et al. |

(Continued)

FOREIGN PATENT DOCUMENTS

CA    2270830 A1    4/2000

(Continued)

OTHER PUBLICATIONS

Invitation to respond to Written Opinion from Singapore Patent Application No. 200607145-0 dated Dec. 18, 2007 with a Written opinion from Australian Patent Office mailed Nov. 14, 2007, 14 pages.

(Continued)

*Primary Examiner* — Dwayne Bost
*Assistant Examiner* — Myron Wyche
(74) *Attorney, Agent, or Firm* — Raphael Freiwirth

(57) ABSTRACT

Methods and apparatus for implementing a multi-carrier communications system are described. Various approaches to a phased system deployment and system configurations resulting from different levels of deployment are described. In addition mobile node and methods of operating mobile nodes in communications systems that may have different levels of deployment in different cells are described.

76 Claims, 26 Drawing Sheets

U.S. PATENT DOCUMENTS

| | | | |
|---|---|---|---|
| 5,844,894 A | 12/1998 | Dent | |
| 5,844,939 A | 12/1998 | Scherer et al. | |
| 6,078,815 A | 6/2000 | Edwards | |
| 6,151,512 A | 11/2000 | Chheda et al. | |
| 6,188,914 B1 | 2/2001 | Chheda | |
| 6,405,048 B1 * | 6/2002 | Haartsen | 455/464 |
| 6,463,302 B1 | 10/2002 | Kang et al. | |
| 6,546,252 B1 | 4/2003 | Jetzek et al. | |
| 6,643,277 B2 | 11/2003 | Garrison et al. | |
| 6,741,862 B2 | 5/2004 | Chung et al. | |
| 6,748,218 B1 * | 6/2004 | Johnson et al. | 455/446 |
| 6,781,960 B1 * | 8/2004 | Charas | 370/255 |
| 6,795,689 B1 * | 9/2004 | Ogren et al. | 455/67.13 |
| 6,826,402 B1 * | 11/2004 | Tran | 455/438 |
| 6,930,470 B2 | 8/2005 | Periyalwar et al. | |
| 6,973,312 B1 * | 12/2005 | Ngan et al. | 455/442 |
| 7,020,472 B2 | 3/2006 | Schmidt | |
| 7,053,709 B1 | 5/2006 | Darvish-Zadeh et al. | |
| 7,212,821 B2 * | 5/2007 | Laroia et al. | 455/437 |
| 7,301,920 B2 * | 11/2007 | Sanders et al. | 370/328 |
| 7,386,306 B2 | 6/2008 | Laroia et al. | |
| 2002/0028677 A1 | 3/2002 | Johnson et al. | |
| 2002/0163879 A1 * | 11/2002 | Li et al. | 370/200 |
| 2002/0187811 A1 | 12/2002 | Gerogiokas | |
| 2003/0125039 A1 | 7/2003 | Lachtar et al. | |
| 2003/0190918 A1 | 10/2003 | Frieder et al. | |
| 2003/0224733 A1 * | 12/2003 | Schwarz et al. | 455/67.11 |
| 2004/0127223 A1 | 7/2004 | Li et al. | |
| 2004/0219889 A1 | 11/2004 | Honcharenko | |
| 2006/0068835 A1 | 3/2006 | Chang | |
| 2006/0083210 A1 * | 4/2006 | Li et al. | 370/343 |

FOREIGN PATENT DOCUMENTS

| | | |
|---|---|---|
| DE | 19747365 A1 | 4/1999 |
| EP | 1178692 | 2/2002 |
| EP | 1408710 A1 | 4/2004 |
| JP | 2001197551 | 7/2001 |
| JP | 2003018091 | 1/2003 |
| WO | WO9604757 A1 | 2/1996 |
| WO | WO9608936 | 3/1996 |
| WO | WO9835519 A2 | 8/1998 |
| WO | WO 00/64059 | 10/2000 |
| WO | WO 00/64206 | 10/2000 |
| WO | WO 01/78435 | 10/2001 |
| WO | WO03039174 A1 | 5/2003 |
| WO | WO 2005/074305 | 12/2005 |

OTHER PUBLICATIONS

International Search Report—PCT/US04/034988, International Search Authority European Patent Office, Jan. 18, 2005.

Written Opinion—PCT/US04/034988, International Search Authority European Patent Office, Jan. 18, 2005.

International Preliminary Report on Patentability—PCT/US04/034988, The International Bureau of WIPO—Geneva, Switzerland, Oct. 19, 2006.

Supplementary European Search Report—EP04796050, Search Authority—The Hague Patent Office, Dec. 15, 2010.

Hisamoku, "Idou Tsuushin ni Okeru Jiritsubennsan seigyo (Autonomous Distribution Control in Mobile Communications)", bit, Japan, published by Kyoritsu Shuppan Kabushiki Kaisha, Oct. 1, 1999, vol. 31, No. 10, pp. 8-17.

Suzuki, "Frequency Re-using Pattern for Orthogonal CDMA Cellular System" The Institute of Electronics, Information and Communication Engineers Technical Report, Japan, Jun. 18, 1993, vol. 93, No. 90, pp. 19-24.

* cited by examiner

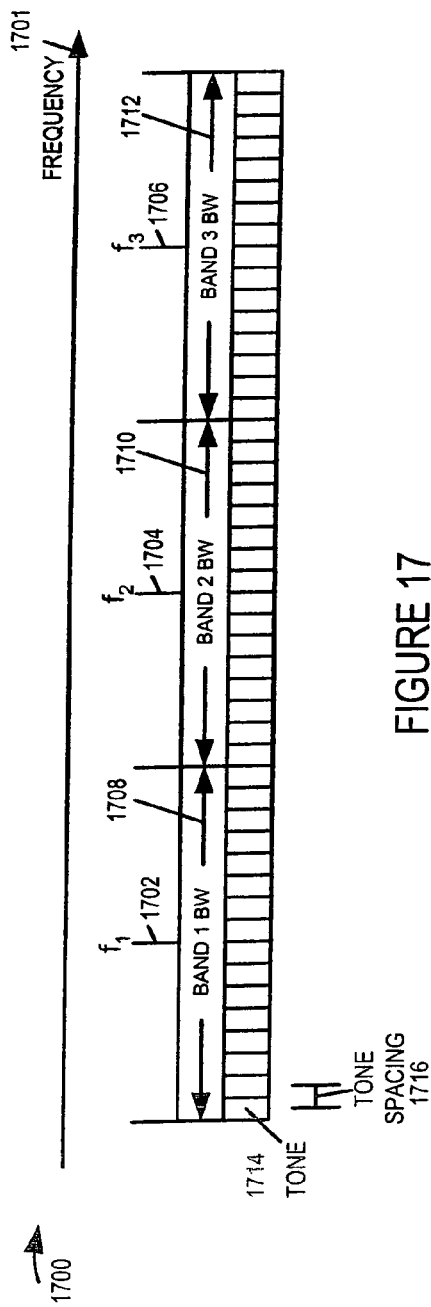
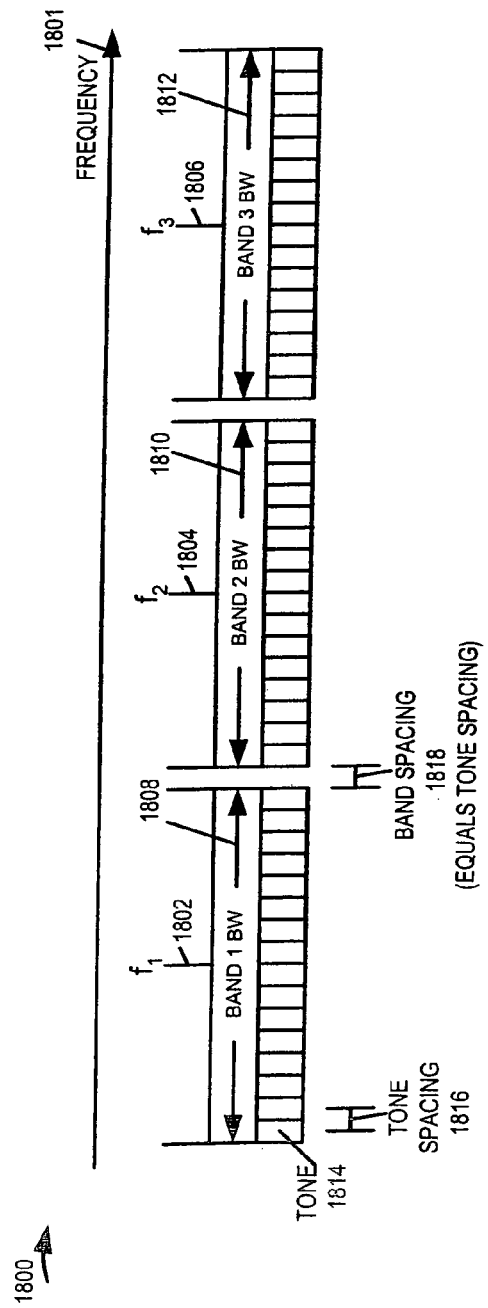
FIGURE 17
FIGURE 18

| DEPLOYMENT LEVEL CELL TYPE VALUE | WT STORED LOOK-UP TABLE (DETAILED REPRESENTATION) TO EVALUATE DEPLOYMENT LEVEL CELL TYPE INFO BROADCAST FROM A BS TRANSMITTER |
|---|---|
| | CORRESPONDING INFORMATION |
| 0 | 1 SECTOR CELL; CARRIER $f_1$; HIGH POWER LEVEL |
| 1 | 3 SECTOR CELL; SECTORS A, B, C USE CARRIER $f_1$; AT HIGH POWER LEVEL |
| 2 | 3 SECTOR CELL; SECTORS (A, B, C) USE CARRIER ($f_1, f_2, f_3$), RESPECTIVELY, AT HIGH POWER LEVEL |
| 3 | 3 SECTOR CELL; SECTORS (A, B, C) USE CARRIER ($f_1, f_2, f_3$), RESPECTIVELY, AT HIGH POWER LEVEL; SECTORS (A, B, C) USE CARRIER ($f_2, f_3, f_1$), RESPECTIVELY, AT INTERMEDIATE POWER LEVEL; SECTORS (B, C) USE CARRIER ($f_1$) AT LOW POWER LEVEL. |
| 4 | 3 SECTOR CELL; SECTORS (A, B, C) USE CARRIER ($f_1, f_2, f_3$), RESPECTIVELY, AT HIGH POWER LEVEL; SECTORS (A, B, C) USE CARRIER ($f_2, f_3, f_1$), RESPECTIVELY, AT INTERMEDIATE POWER LEVEL; SECTORS (A, B, C) USE CARRIER ($f_3, f_1, f_2$) AT LOW POWER LEVEL. |

FIGURE 23

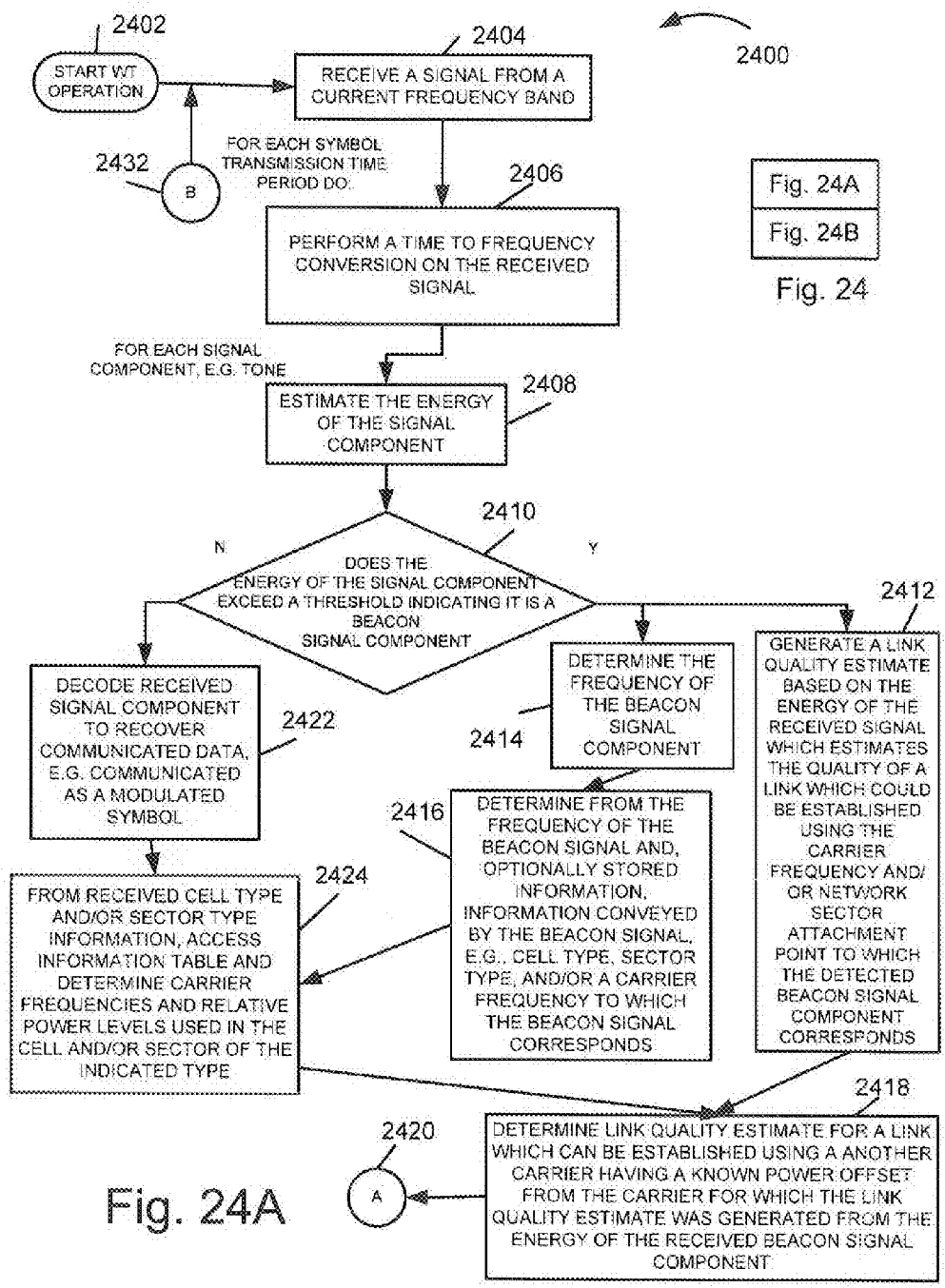

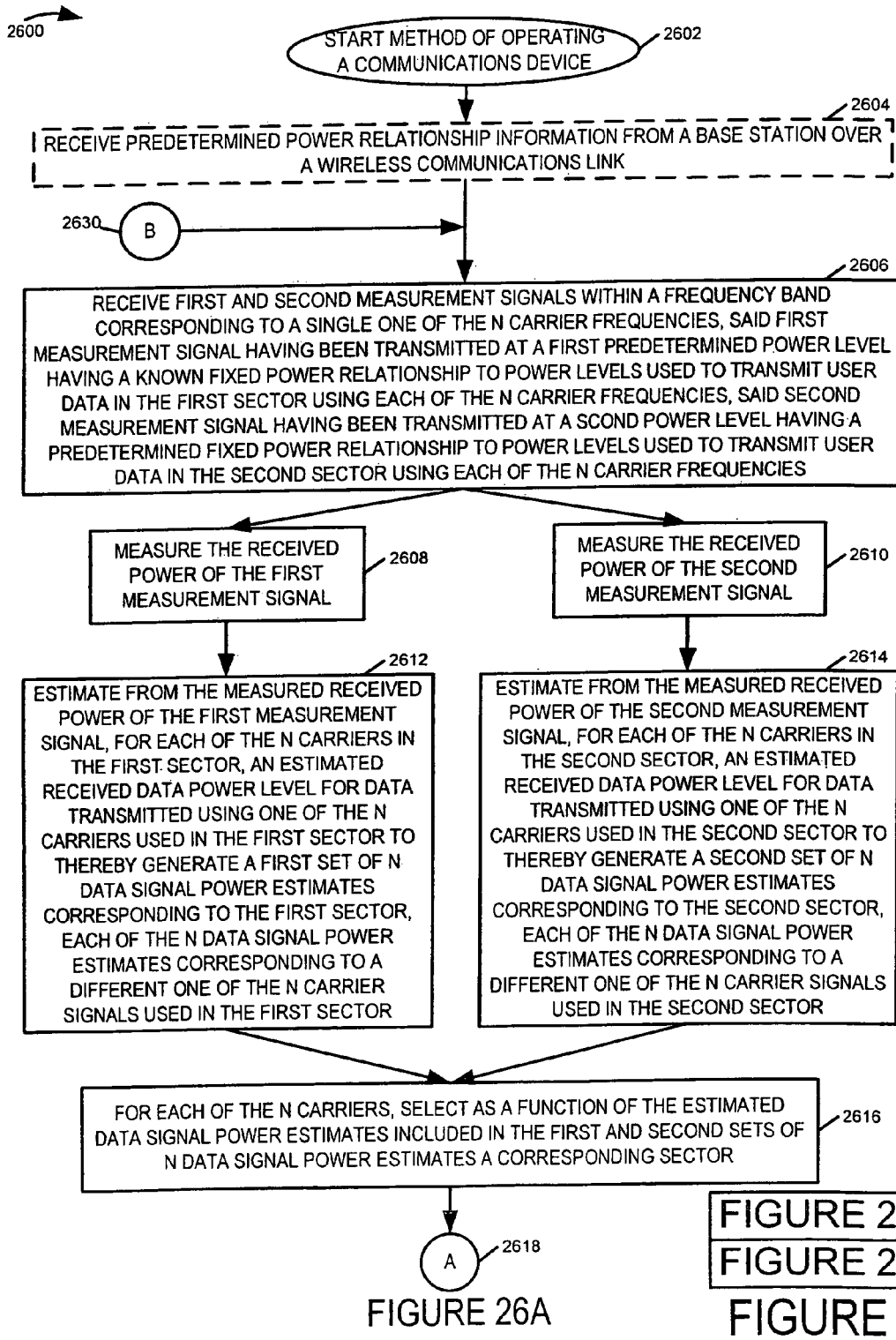

US 8,068,841 B2

MULTI-CARRIER COMMUNICATIONS METHODS AND APPARATUS

RELATED APPLICATIONS

The present application claims the benefit of U.S. Provisional Patent Application Ser. No. 60/562,901 filed on Apr. 15, 2004 and the benefit of U.S. Provisional Patent Application Ser. No. 60/619,540, filed Oct. 15, 2004 and is a continuation-in-part application of International Patent Application No. PCT/US2004/034988 filed Oct. 15, 2004, which designated the U.S. and is also a continuation-in-part application of International Application No. PCT/US2004/034295, filed Oct. 15, 2004 which designated the U.S., the full content of each of the preceding listed patent applications is hereby expressly incorporated by reference.

FIELD OF THE INVENTION

The present invention relates to communications systems and, more particularly, to methods and apparatus for supporting the use of different levels of bandwidth utilization using one or more cell configurations.

BACKGROUND

Deployment of communications systems can be a very costly process. Wireless bandwidth has become a very expensive commodity. In addition, system hardware is relatively expensive. One approach to deploying a communications system is to deploy cells utilizing the same number of carrier frequency's and bandwidth in each cell from the start of the system. Thus, individual cells may be deployed from the start of the system in a configuration which is intended to fully utilize the bandwidth intended to ultimately be used by the system.

For example, suppose an operator has a wideband spectrum. Traditionally, the operator has two options to deploy the communications systems. In the first option, the operator uses the entire wideband spectrum, e.g., in every sector of every cell, from the very beginning. The cost is that all the terminals have to be able to process the signals in the entire wideband channel, thereby increasing the terminal costs and battery power consumption. In the second option, the wideband spectrum is divided into multiple carriers. At the beginning, since the number of service subscribers tend to be relatively low, the operator deploys the communications system only in the first carrier, e.g., in every sector of every cell, from the very beginning, and leaves the other carriers unused. Later as the number of service subscribers increases and the first carrier becomes crowded, the operator then expands the system by deploying services in the second carrier. The procedure may repeat until all the carriers are utilized eventually. The problem of this approach is that when the first carrier is the only carrier used, there could be a significant amount of interference in the first carrier (thus limiting sector throughput), while the other carriers are completely idle. In addition, changes in the number of carriers and/or carrier frequencies in a cell over time can create problems for older WTs which were not intended to operate on the newly deployed carrier frequencies or do not know the availability of newly deployed carrier frequencies. This has, in many cases, made the initial deployment of wireless communications systems relatively expensive and/or often inefficient in terms of initial bandwidth utilization.

Various types of wireless communications systems are possible. Deployment and bandwidth under utilization problems tend to be associated with wireless communications systems regards of the particular communications method employed in the system.

Some communications systems use spread spectrum signals while other systems, e.g., narrow band systems, do not. In "Digital Communications" ($3^{rd}$ edition, page 695), J. Proakis provides the following definition of spread spectrum signals: "Spread spectrum signals used for the transmission of digital information are distinguished by the characteristic that their bandwidth W is much greater than the information rate R in bits/s. That is, the bandwidth expansion factor Be=W/R for a spread spectrum signal is much greater than unity."

In a communication system, the information bits are generally transmitted as blocks of coded bits to combat errors in the communication channel, where each block is the minimum unit of channel coding. In the case where no channel coding is performed, each information bit can be considered a block.

Direct sequence code division multiple access (DS-CDMA) signal and hopped orthogonal frequency division multiplexing (OFDM) are two typical spread spectrum signals. In the DS-CDMA signal, a coded bit of any coded block is transmitted as a sequence of chips, where the time duration of a chip is much shorter than that of a bit. Suppose a bit is N times longer than a chip, then the bandwidth expansion factor, or spreading factor, is N.

Consider two methods of transmitting a block of coded bits in an OFDM system, as shown in FIG. 1 and FIG. 2. FIG. 1 is a drawing 100 plotting tone on vertical axis 102 vs time on horizontal axis 104. Each tone represents a segment of bandwidth in the frequency domain. The air link resource is represented by a grid 106 including 120 squares, each square representing one tone over one time interval. Grid 106 shows 10 distinct tones over 12 time intervals. In the first method illustrated by FIG. 1, the coded bits of a block are transmitted using the minimum number of tones. In FIG. 1, the same two tones 108, 110 are used all the time. A first block of coded bits 112 represented by 12 squares with diagonal line shading uses tones 108, 110 during a first time segment 116. A second block of coded bits 114 represented by 12 squares with dotted shading uses tones 108, 110 during a second time interval 118. In this case, the OFDM signal is not spread spectrum signal.

FIG. 2 is a drawing 200 plotting tone on vertical axis 202 vs time on horizontal axis 204. Each tone represents a segment of bandwidth in the frequency domain. The air link resource is represented by a grid 206 including 120 squares, each square representing one tone over one time interval. Grid 206 shows 10 distinct tones 208, 210, 212, 214, 216, 218, 220, 222, 224, 226 over 12 time intervals 228, 230, 232, 234, 236, 238, 240, 242, 244, 246, 248, 250. In the second method illustrated in FIG. 2, the coded bits are transmitted using hopped tones. A first block of coded bits 252 represented by 12 squares with diagonal line shading uses: tones (208, 216) during a first time interval 228, tones (212, 220) during a second time interval 230, tones (216, 224) during a third time interval 232, tones (212, 220) during a fourth time interval 234, tones (210, 218) during a fifth time interval 236, and tones (222, 226) during a sixth time interval 238. A second block of coded bits 254 represented by 12 squares with dotted shading uses: tones (214, 220) during a seventh time interval 240, tones (208, 224) during an eighth time interval 242, tones (216, 222) during a ninth time interval 244, tones (212, 218) during a tenth time interval 246, tones (210, 226) during an eleventh time interval 248, and tones (214, 222) during a twelfth time interval 250. In FIG. 2, at any given time instant, only two tones are used. However, for the entire coded block 252, 254, twelve tones are used. In this case, the OFDM signal is spread spectrum signal.

In view of the above discussion, it should be apparent that method and apparatus for implementing a phased deployment of a communication system would be beneficial. In addition, a system configuration that can achieve a high level of bandwidth utilization, even if constructed in phases which use different amounts of bandwidth and/or different numbers of carries before arriving at the final system configuration, would be both desirable and beneficial.

SUMMARY OF THE INVENTION

The present invention is directed to methods and apparatus for deploying a communications system and to the various system configurations achieved at different levels of deployment.

In accordance with the present invention, a system can be implemented using cells having a variety of different configurations which provide different levels of bandwidth utilization and/or communications capacity.

One embodiment of the invention considers a multi-carrier deployment in multi-sector cells. At the early stage of system deployment, the number of service subscribers is relatively small. According to the invention, not all the carriers are used in every sector of a given cell, although all the carriers may be used in different sectors of a given cell. In one embodiment of 3-carriers and 3-sector deployment, in any given cell, a first carrier is used in a first sector, a second carrier is used in a second sector, and a third carrier is used in a third sector. Preferably, the same use pattern of the carriers repeats for multiple cells, where sectors of the same or similar orientation use the same carrier. Later, as the number of service subscribers increases, additional carriers can be added to a sector to increase sector throughput. In the above embodiment of 3-carriers and 3-sector deployment, in any given cell, the first and second carriers are used in the first sector, the second and third carriers are used in the second sector, and the third and first carriers are used in the third sector. Then, as the number of service subscribers further increases, all the three carriers are used in each sector.

Note that the above phased deployment scheme can be applied depending on the capacity needs of the local regions. That is, the use of the carriers may not be necessarily the same across the entire network. For example, after the early stage deployment, cell A may see large capacity needs and thus start to add additional carriers in its sector, while cell B do not see much increase in capacity needs and thus stay with the original deployment of one carrier per sector. Moreover, when multiple carriers are used in a given sector, the powers used by those carriers may be different. In one embodiment, the relative power difference (ratio) between those carriers is fixed and known to the users. In one embodiment, the power ratio is at least 3 dB.

By allowing different cells to use different amounts of bandwidth, e.g., different number of carriers, the methods of the present invention allow a system to be deployed in a gradual manner. A large number of cells may initially use a single carrier and corresponding frequency band to deploy service. Additional carriers can be added to cells over time by sectorizing cells and/or increasing the number of carriers used in each sector of cell.

In this manner, a service provider need not initially dedicate the entire bandwidth which may ultimately be allocated to the communications system at the time of initial deployment to every sector of every cell. Not using all the bandwidth in every sectors at the time initial deployment helps to reduce interference between those sectors, thereby improving the system performance and robustness.

In accordance with one feature of the invention, bandwidth intended for a system may be divided into a plurality of frequency bands. For example, a frequency band to be used by a system of 6 MHz or less, e.g., 5 MHz, can be divided into 3 frequency bands. A single one of the frequency bands may be used initially in a sector of a cell. The cells can be implemented as single or multi-sector cells using one of the frequency bands initially. As demand increases in individual sectors, the number of sectors per cell may be increased, e.g., from 1, to 2 or 3. The sectors may continue to use the same frequency band. To increase capacity further, one or more sectors can be modified to use one or more additional frequency bands in addition to the first frequency band.

WTs may be deployed initially with the ability to support the single frequency band used throughout the system initially. As frequency bands are added, assuming each cell and/or sector continues to support the original frequency band, the WTs initially deployed will be able to operate with the newly deployed carriers in the additional sectors and/or sectors which have been upgraded to use multiple carrier frequencies although the WTs might not be able to use multiple deployed carrier frequencies simultaneously.

In some but not all embodiments, different carriers are assigned different transmission power levels in a given sector. In some three sector embodiments which are particularly useful, each sector supports the same set of three different carrier frequencies, a different non-overlapping frequency band being associated with each of the different carrier frequencies. To reduce the risk of interference and vary the location of the sector boundaries for the different carriers, in one particular 3 sector embodiment, signals are transmitted on different carriers using different power levels in a given sector. In addition, the signals transmitted on any particular carrier are transmitted at a different average power level in different sectors of the cell. The average power level may be the power over a time period including the transmission of multiple symbols, e.g., 1 second or 2 seconds in some embodiments. In one particular embodiment OFDM signaling is used. In such an embodiment, the three frequency bands corresponding to the three different carriers each include a plurality of uniformly spaced tones with the frequency bands being contiguous or spaced by a positive integer multiple of the tone spacing of each carrier.

To facilitate mobile node operation in implementations where the system includes cells of different types and which use different numbers of carriers per sector, cell type information is periodically transmitted using broadcast common control channels, such as high power signals sometimes called beacon signals. The high power signals many be narrow in frequency, e.g., one tone wide, and may be transmitted at pre-selected frequencies with the frequency and/or periodicity of the tone being used to communicate transmitter information such as cell and/or sector type information.

BRIEF DESCRIPTION OF THE FIGURES

FIG. 17 is a drawing illustrating an exemplary bandwidth partition including 3 contiguous frequency bands each corresponding to a different carrier in accordance with the present invention.

FIG. 18 is a drawing illustrating an exemplary bandwidth partition including 3 frequency bands each corresponding to a different carrier in accordance with the present invention.

FIG. 23 is an illustration of an exemplary look-up table that may be stored in a wireless terminal and used by a WT to evaluate received deployment level cell type information.

DETAILED DESCRIPTION

Cells may include one or more sectors. A cell without multiple sectors is a single sector cell, i.e., it includes a single sector. Signals are normally transmitted by a sector transmitter using a carrier frequency and the corresponding bandwidth, e.g., one or more tones surrounding the carrier frequency. Cells and/or sectors of a cell often use a frequency band centered around a carrier frequency used by the sector or cell.

Wireless terminals, e.g., mobile nodes, communicating with a base station on a given carrier frequency and moving through a system need to decide when to make a handoff and transition to a new cell and/or sector.

In some cases, where communications systems have been deployed, the available bandwidth available to a service provider may change or become inadequate due to increased demands for bandwidth.

There is a need for methods and apparatus for providing a transition to a higher bandwidth capacity wireless communications system. A phased transition where an entire system need not be upgraded at once is desirable. It is also desirable that at least one or more methods be provided which avoid the need for a system wide changeover, allowing a phased deployment in which various components may be gradually phased in over time as new components become available, as the service providers customer base grows, as localized areas require additional capacity and/or as an individual user's data requirements demand. It is also desirable that phased deployments be backward capable with existing wireless terminals in the field, allowing customers to delay upgrade until convenient and/or needed. It would also be desirable if the methods of phased deployment did not introduce large levels of interference at the sector/cell boundaries and do not needlessly expend mobile's battery power. It would be advantageous if the methods and apparatus used to deploy and access this increased bandwidth, efficiently provide the wireless terminals with information to compare potential levels of interference and/or loading in different cells/sectors on the carrier frequencies available, and/or to make handoff decisions based upon interference, loading, and/or need.

Figure 3:
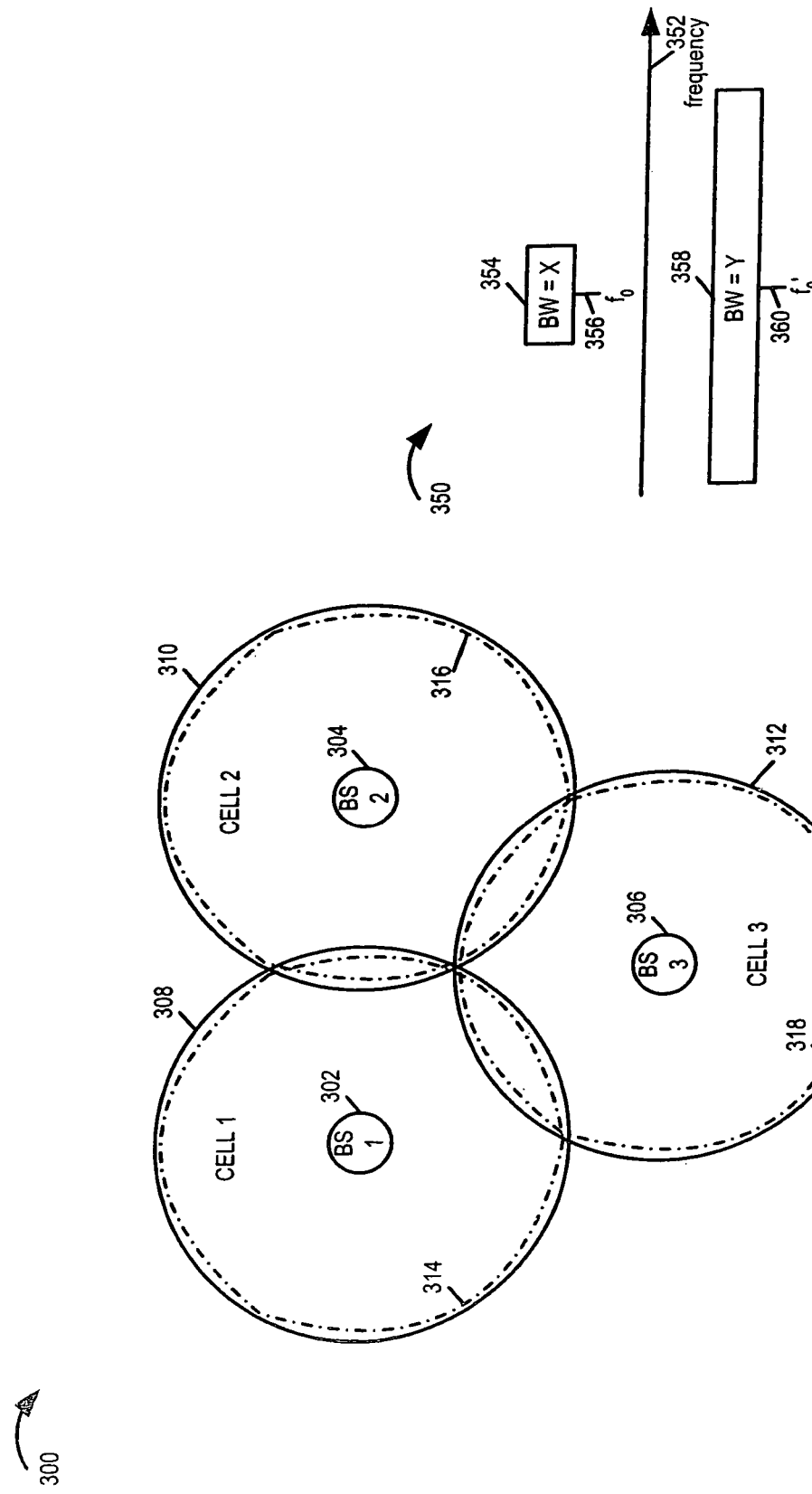
FIG. 3 is a drawing used for explaining a method of bandwidth expansion in a cellular communications system in which the bandwidth associated with a carrier is expanded to an increased level and employed universally throughout the system, in accordance with the present invention.

One approach is to change the entire system and deploy the increased bandwidth capability everywhere. FIG. 3 is an example of such a deployment. FIG. 3 shows an exemplary system 300 including three base stations (BSs) BS1 302, BS2 304, BS3 306. Each base station (302, 304, 306) is surrounded by a cell (cell 1 308, cell 2 310, cell 3 312), representing a wireless coverage area for the respective base station. Each base station 302, 304, 306 operates using the same bandwidth. Drawing 350 is an exemplary illustration of the system bandwidth change as the system 300 is upgraded. Horizontal axis 352 illustrates frequency. Block 354 illustrates the pre-upgrade system bandwidth X with the system 300 operating using carrier frequency $f_0$ 356, while block 358 illustrates the post-upgrade bandwidth Y with the system 300 operating using carrier frequency $f_0'$ 360, where Y>X. Wireless terminals, e.g., mobiles, which may move throughout the system 300 have to be modified to operate using the new bandwidth when the bandwidth is increased. The size of the dot/dash circles (314, 316, 318) in the cells (308, 310, 312) indicates the relative transmission power of the carrier frequency in its respective cell, which is the same for each cell (308, 310, 312) in the example of FIG. 3. One problem with this approach to deployment is that each of the system components including the base stations and wireless terminals need to be modified at the changeover time. Different components may be ready or available for changeover at different points in time. Such a large scale changeover may cause a disruption in service and be inconvenient for many wireless terminal users, e.g., who may need to upgrade or purchase new wireless terminals in order to continue operations within the network. Changing wireless terminals from using a carrier with a first size frequency band to using a second carrier with a larger size frequency band may involve significant changes, e.g., hardware changes in the RF section of the WT receiver. In addition, such a changeover requiring each wireless terminal to now operate on a larger bandwidth may result in larger battery power consumption for a given user. In many cases, the specific user may not need to be given a high rate, and therefore, it is inefficient to burn battery power with a large BW operation, when the original smaller bandwidth operation would have satisfied the user's needs. In addition, as a service provider transitions from a capability based on a first utilized band to a system with a larger utilized frequency band capability system, at first or in some areas, there may not be enough customers to use or justify the additional capability, and thus in such a mass changeover deployment as previously described additional cost in infrastructure is prematurely spent and wireless terminal battery power is needlessly wasted.

Figure 1:
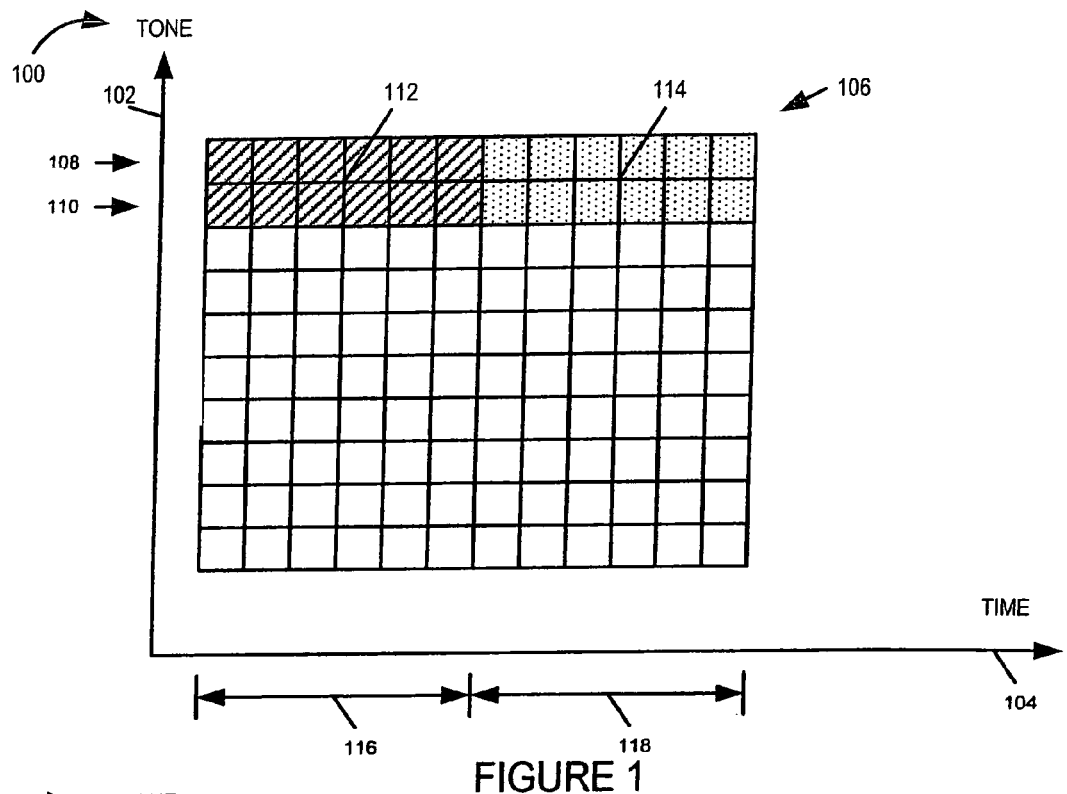
FIG. 1 is a drawing illustrating exemplary coded block transmission in an OFDM system using non-spread spectrum signaling.
Figure 2:
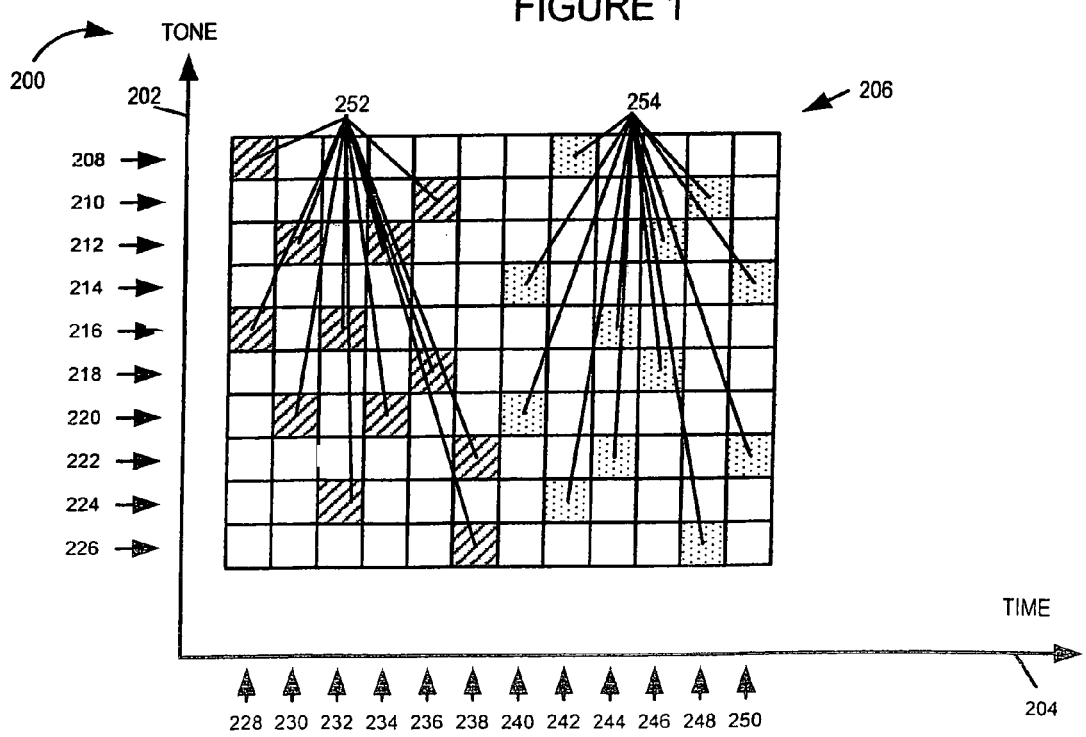
FIG. 2 is a drawing illustrating exemplary coded block transmission in an OFDM system using spread spectrum signaling.
Figure 4:
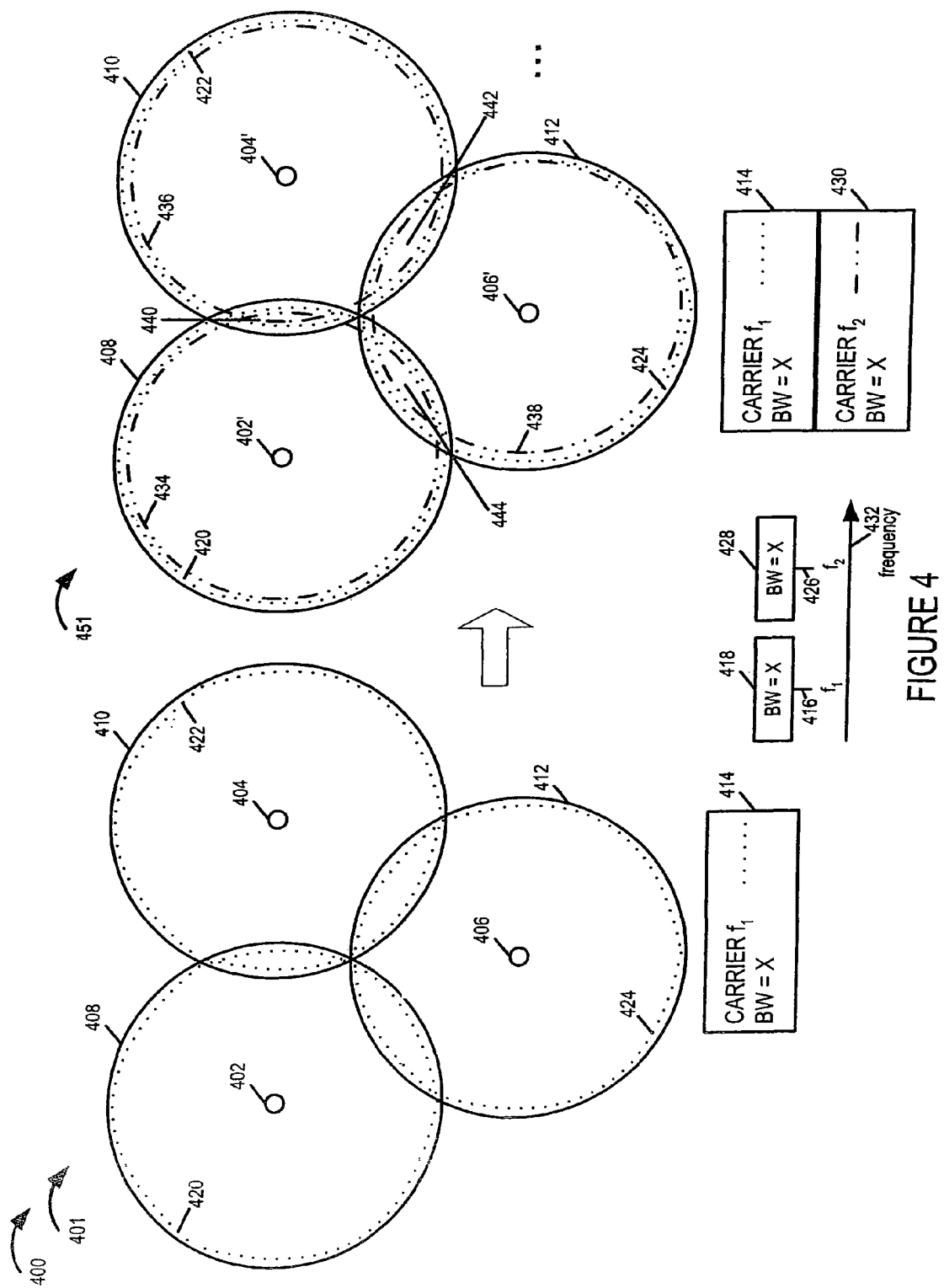
FIG. 4 is a drawing used for explaining a method of bandwidth expansion in an exemplary cellular communications in which the added bandwidth is associated with an additional carrier, in accordance with the present invention.

Another approach to adding increased bandwidth into the system is a phased deployment where an additional carrier frequency with the same bandwidth is added to the entire system when needed. FIG. 4 is an illustration 400 used to describe this approach. FIG. 4 shows an exemplary system 401 including three base stations (402, 404, 406). Each base station (402, 404, 406) is surrounded by a cell (408, 410, 412), representing a wireless coverage area for the respective base station. Each base station (402, 406, 408) operates with using carrier frequency $f_1$ 416. In FIG. 1, the dotted line in the legend 414 indicates carrier frequency $f_1$ 416 with a bandwidth X 418. The size of the dotted line circles (420, 422, 424) in the cells (408, 410, 412), indicates the relative transmission power of the carrier frequency $f_1$ in its respective cell, which is the same for each cell (408, 410, 412) in the exemplary system 401 of FIG. 1.

As the need arises, e.g., more customers, a second carrier frequency $f_2$ 426 with a BW X 428, represented by a dot/dash line shown in legend 430, that does not overlap the first carrier $f_1$ BW segment 418 in the frequency range 432 may be employed in each of the cells (408, 410, 412) of the system. Exemplary system 451 represents such a modified implementation of system 401. In system 451, each of the base stations (402', 404', 406') represents a modified base station (402, 404, 406) which supports both carrier frequencies $f_1$ 416 and $f_2$ 426 in each of the cells (408, 410, 412). The size of the dot/dash line circles (434, 436, 438) in the cells (408, 410, 412), indicates the relative transmission power of the carrier frequency $f_2$ in its respective cell, which is the same for each cell in the exemplary system 451 of FIG. 4. The relative transmission power of the carrier frequency $f_2$ in each respective cell (408, 410, 412) as indicated by the size of circles (434, 436, 438) is equivalent or nearly equivalent to the relative transmission power of the carrier frequency $f_1$ in each respective cell (408, 410, 412) as indicated by circles (420, 422, 424) overlaying circles (434, 436, 438). Such a deployment strategy has the disadvantage that there will be a lot of interference especially in the boundary areas (440, 442, 444), e.g., overlapping areas between the cells since the same BW is used in each cell. In addition, such an approach results in data rate capability rates that vary significantly depending on the wireless terminals location in the cell. Near the base station, high data rates will be supported, while far away from the base station only lower data rates will be supported. This approach is bad from a quality of service perspective, as a service provider can't guarantee a mobile user a high rate.

Consider the illustrations in FIGS. 3 and 4 representing different options of a deployment scenario. Specifically, the exemplary deployment scenario being considered is that there is a wideband available to provide service and initially the number of users is relatively low.

FIG. 3 can illustrate an option where the operator deploys the entire wideband from the very beginning. For example, BW=Y 358 using carrier frequency $f_0'$ 360 can represent the wideband. In this case, the network elements need to be wideband and so do the wireless terminals, thus incurring high equipment expenditure. The wireless terminals waste battery power.

FIG. 4 can illustrate another option where the operator divides the entire wideband into multiple carriers, each having a bandwidth, e.g., 1.25 MHz. For example, the wideband may include a band with BW=X 418 using carrier $f_1$ 416 and another band with BW=X 428 using carrier $f_2$ 426. At the beginning, only one carrier is deployed in every sector of every cell, while the remaining carriers are unused and left idle. Drawing 401 illustrates such a scenario. Then as the traffic demand increases, additional carriers are added to provide service. Drawing 451 illustrates two carriers being used to provide service. The problem is that when a carrier is reused in every sector of every cell, the interference is excessive, thus limiting the system capacity. For example, in cell boundary areas 440, 442, 444, the interference is excessive.

Figure 5:
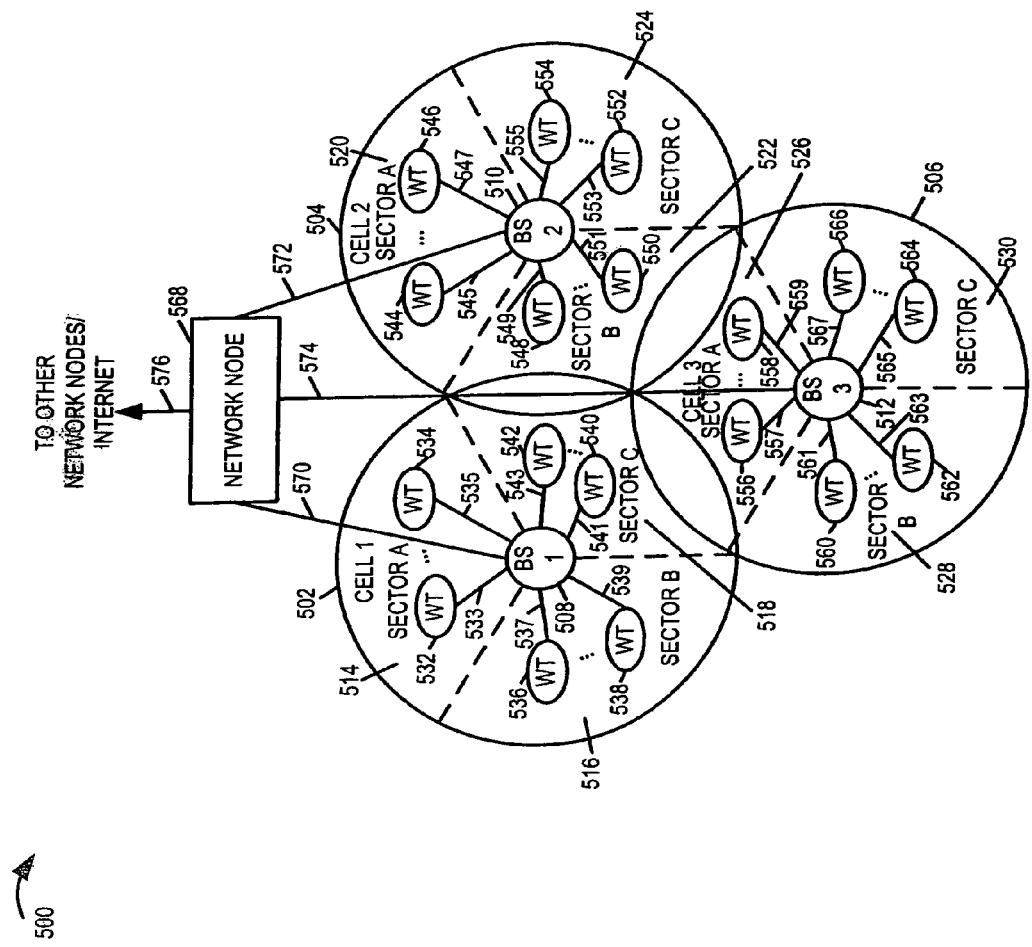
FIG. 5 is a drawing of an exemplary sectorized cellular communications system implemented in accordance with the present invention and using methods of the present invention, the exemplary system being well suited for a phased deployment of bandwidth expansion.

FIG. 5 shows an exemplary system 500 implemented in accordance with the present invention and using apparatus and methods of the present invention. FIG. 5 includes a plurality of multi-sector cells (502, 504, 506), each cell representing a wireless coverage area for a base station (BS), (BS 1 508, BS 2 510, BS 3 512), and each cell (502, 504, 506) including three sectors (sector A, sector B, sector C). Cell 1 502 includes sector A 514, sector B 516, and sector C 516; cell 2 504 includes sector A 520, sector B 522, and sector C 524; cell 3 506 includes sector A 526, sector B 528, and sector C 530. Wireless terminals (WTs), e.g., mobile nodes (MNs) may move throughout the system and communicate with peer nodes, e.g., other MNs, via a wireless link to a BS. Exemplary WTs (532, 534) in sector A 514 of cell 1 502 are coupled to BS 1 508 via wireless links (533, 535), respectively. Exemplary WTs (536, 538) in sector B 516 of cell 1 502 are coupled to BS 1 508 via wireless links (537, 539), respectively. Exemplary WTs (540, 542) in sector C 518 of cell 1 502 are coupled to BS 1 508 via wireless links (541, 543), respectively. Exemplary WTs (544, 546) in sector A 520 of cell 2 504 are coupled to BS 2 510 via wireless links (545, 547), respectively. Exemplary WTs (548, 550) in sector B 522 of cell 2 504 are coupled to BS 2 510 via wireless links (549, 551), respectively. Exemplary WTs (552, 554) in sector C 524 of cell 2 504 are coupled to BS 2 510 via wireless links (553, 555), respectively. Exemplary WTs (556, 558) in sector A 526 of cell 3 506 are coupled to BS 3 512 via wireless links (557, 559), respectively. Exemplary WTs (560, 562) in sector B 528 of cell 3 506 are coupled to BS 3 512 via wireless links (561, 563), respectively. Exemplary WTs (564, 566) in sector C 530 of cell 3 506 are coupled to BS 3 512 via wireless links (565, 567), respectively.

BSs may be coupled together via a network. In FIG. 5, the BSs (508, 510, 512) are coupled via network links (570, 572, 574) to a network node 568. The network node may be, e.g., a router. Network node 568 is also coupled to other networks nodes, e.g., other base station, AAA node, home agent nodes, etc., and the Internet via network link 576. Network links 570, 572, 574, 576 may be, e.g., fiber optic cables.

In accordance with the invention, different cells (502, 504, 506) of the system 500 may support various levels of multiple carriers and various levels of frequency reuse, and the system 500 is well suited for a phased deployment of a bandwidth capacity increase, e.g., from 1.25 MHz system to a 5 MHz system where the 5 MHz system may be supplemented using 3 carriers each having an associated non-overlapping BW of 1.25 MHz.

Each sector's BS transmitter may transmit a set of narrow high strength signals at periodic intervals, sometimes referred to as beacon signals. The frequency and/or phase and/or timing of the beacon signal may be used to convey information indicating the cell and/or sector from which the beacon signal was transmitted. WTs such as MNs may operate on a single carrier band and receive beacon signals from a plurality of cell/sector/carrier frequency sources. The MNs may process the beacon signals, make signal power and/or other quality measurements, predict SNR for each of the potential connections, and make hand-off selections using the received information. While beacon signals are used in some embodiments, in other embodiments such signals are not used.

Figure 6:
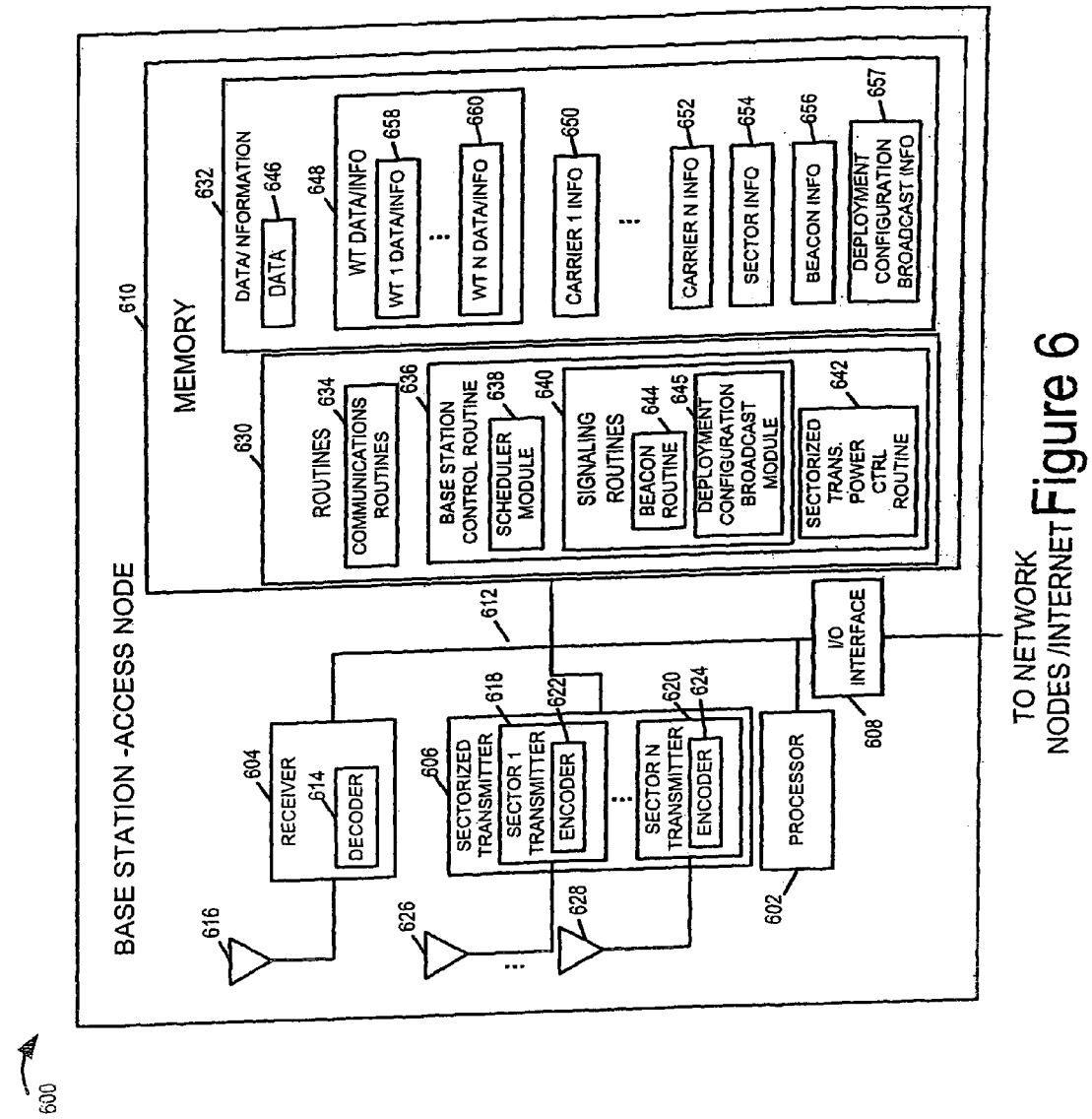
FIG. 6 is an illustration of an exemplary base station implemented in accordance with the present invention and using methods of the present invention.

FIG. 6 illustrates an exemplary base station (access node) 600 implemented in accordance with the present invention. For example, exemplary base station 600 may correspond to a cell in an exemplary communications system, the base station including a transmitter for transmitting spread spectrum OFDM signals into each sector using one or more carrier frequencies used in the sector into which signals are transmitted. In some embodiments, the base station 600 includes one transmitter per sector. In some embodiments, the base station 600 includes one transmitter per sector per carrier frequency used for user data downlink signaling within the sector. In such an embodiment, each transmitter may correspond to a potential attachment point. The base station of FIG. 6 may be a more detailed representation of any of the base stations 508, 510, 512 of the system of FIG. 5. The base station 600 includes a processor 602, e.g., CPU, a receiver 604 including a decoder 614, a sectorized transmitter 606, a memory 610, an I/O interface 608 coupled together via a bus 612 over which the various elements can interchange data and information. The receiver 604 is coupled to a sectorized antenna 616 and can receive signals from wireless terminals 700 (see FIG. 7) in each of the sectors covered by the base station 700. In some embodiments, receiver 604 is a sectorized receiver, e.g., one receiver per sector or one receiver per sector per carrier frequency. The sectorized transmitter 606 includes a plurality of transmitters, a sector 1 transmitter 618, a sector N transmitter 620. Each sector transmitter (618, 620) includes an encoder (622, 624) and is coupled to an antenna (626, 628), respectively. Each sector transmitter (618, 620) is capable of transmitting downlink signals, e.g., data and control signals, on a plurality of bands, e.g. 3 distinct 1.25 MHz BW bands within a 5 MHz BW window, and can also transmit beacon signals in each of the bands, in accordance with the invention. The base station I/O interface 608 couples the base station 600 to other network nodes, e.g., other access nodes, routers, AAA servers, home agent nodes, and the Internet. The memory 610 includes routines 630 and data/information 632. The processor 602 executes routines 630 and uses the data/information 632 in the memory 610 to control the operation of the base station 600 including scheduling users on different carrier frequencies using different power levels, power control, timing control, communication, signaling, and beacon signaling in accordance with the invention.

The data/information 632 in the memory 610 includes data 646, e.g., user data to be transmitted to and received from wireless terminals 700, sector information 654 including carrier frequencies associated with each sector and data transmission power levels associated with each carrier frequency within the sector, a plurality of carrier frequency information (carrier 1 info 650, carrier N info 652), beacon information 656, and deployment configuration broadcast information 657. Carrier frequency information (650, 652) includes information such as, e.g., the frequency of the carrier and the associated bandwidth. The beacon information 656 includes tone information, e.g., information associating beacon signals in each sector with specific frequencies and carriers, and sequence timing associated to transmit the beacon signals. The data/information 632 in memory 610 also includes a plurality of WT data/information sets 648 for each WT: WT 1 data/info 658, WT N data/info 660. WT 1 data/info 658 includes user data in route from/to WT 1, a terminal ID associating the WT to the base station, a sector ID identifying the sector in which WT 1 is currently located and carrier frequency information associating WT 1 to a specific carrier frequency used for ordinary signaling.

Deployment configuration broadcast information 657 includes information identifying the status of the base station sector attachment point transmitters in terms of deployment status such as information identifying the sector, type of deployed cell from a plurality of possible deployed cell types, information indicating which carriers are being used in which sectors, and/or information indicating the power levels of each of the carriers used in each of the sectors. Deployment configuration broadcast information 657 also includes information structured in messages to be sent as broadcast messages, e.g., periodically to convey the base station's deployment status.

The base station's memory 610 includes communications routines 634, and base station control routines 636. The communications routines 634 may implement the various communications protocols used by the base station 600. The base station control routines 636 include a scheduler module 638, signaling routines 640, and a sectorized transmitter power control routine 642. The base station control routines 636 control base station operation including the receiver(s), transmitter(s) scheduling, signaling, and beacon signaling. The scheduler module 638 used for scheduling air link resources, e.g. bandwidth over time, to wireless terminals 700 for uplink and downlink communications. Signaling routines 640 control: the receiver(s), the decoder(s), the transmitter(s), the encoder(s), ordinary signal generation, data and control tone hopping, and signal reception. Signaling routines 640 includes a beacon routine 644 and a deployment configuration broadcast module 645. The beacon routine 644 uses the beacon information 656 to control the generation and transmission of beacon signals in accordance with the invention. In accordance with the invention, beacon signals may be transmitted in each sector in each of the carrier frequency bands used. In various embodiments different sectors of a cell and sectors of adjoining cells support different numbers of carrier frequency bands at the same point in time. This occurs, e.g., in the case of a phased deployment of additional carrier frequencies in accordance with one feature of the invention. The deployment configuration broadcast module 645 controls the generation and transmission of broadcast signals conveying information that may be used by WTs 700 to identify the configuration status of the base station 600. The sectorized transmitter power control routine 642 controls transmission power so that in each sector the downlink data signaling using different carrier frequencies is transmitted at different controlled power levels in accordance with the invention.

Figure 7:
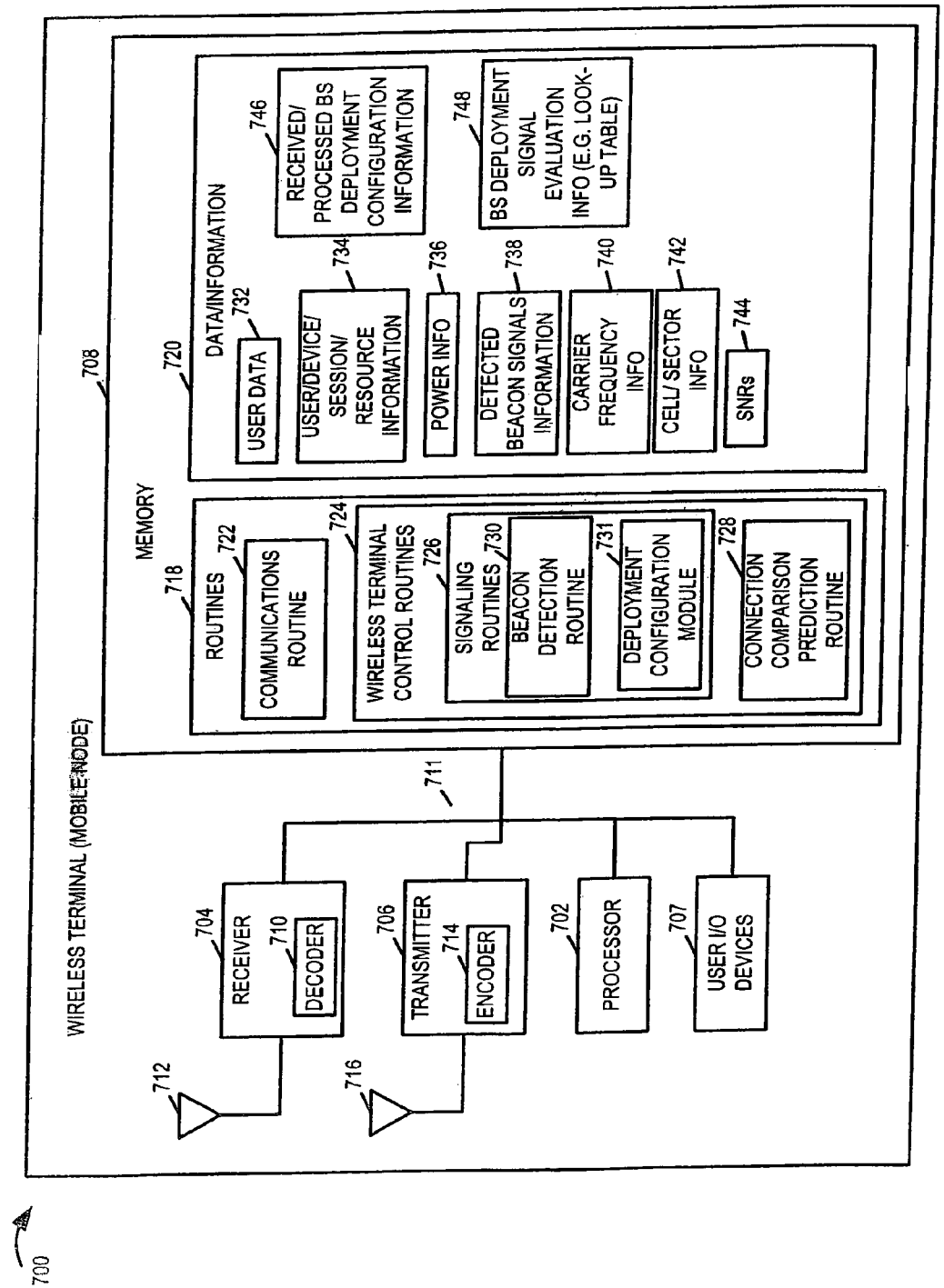
FIG. 7 is an illustration of an exemplary wireless terminal implemented in accordance with the present invention and using methods of the present invention.

FIG. 7 illustrates an exemplary wireless terminal (mobile node) 700, implemented in accordance with the present invention. The wireless terminal 700 of FIG. 7 may be a more detailed representation of any of the WTs (532, 534, 536, 538, 540, 542, 544, 546, 548, 550, 552, 554, 556, 558, 560, 562, 564, 566) of the system 500 of FIG. 5. The wireless terminal 700 includes a receiver 704, a transmitter 706, a processor 702, e.g., CPU, user I/O devices 707, and memory 708 coupled together via a bus 711 over which the various elements can interchange data and information. The receiver 704 including a decoder 710 is coupled to an antenna 712 over which the wireless terminal 700 may receive signaling including beacon signaling transmitted from different sectors by different base stations on the same carrier band in accordance with the invention. The illustrated receiver 704 supports multiple carrier frequencies and may switch between various carrier frequency bands, e.g., three 1.25 MHz carrier frequency bands supported in a sector or cell. The decoder 710 in the receiver 704 may decode ordinary signaling and use error correction coding processes to attempt to recover information overwritten or interfered with by beacon signaling. The transmitter 706 is coupled to an antenna 716 and may transmit signaling and information to base stations 600 including: requests to initiate a handoff to another sector of the same cell using the same or a new carrier frequency, requests to initiate a handoff to a different carrier frequency within the same sector, and requests to initiate a handoff to a specific sector and carrier frequency of a different cell. User I/O devices 707, e.g., microphone, keypad, mouse, keyboard, video camera, speaker, display, etc., allow a user of WT 700 to input user data/information for a peer and to output user data received from a peer in a communications session with WT 700.

The wireless terminal's memory 708 includes routines 718 and data/information 720. The processor 702 executes the routines 718 and uses the data/information 720 in memory 708 to control the operation of the wireless terminal 700 including implementing the wireless terminal functions in accordance with the present invention.

Wireless terminal data/information 720 includes user data 732, user/device/session/resource information 734, power information 736, detected beacon signals information 738, carrier frequency information 740, cell/sector information 742, SNR information 744, received/processed deployment configuration information 746, and base station deployment signal evaluation information 748. User data 732 includes data, information and files intended to be sent to/or received from a peer node in a communications session with the wireless terminal 700.

User/device/session/resource information 734 includes terminal ID information, base station ID information, sector ID information, selected carrier frequency information, mode information, and identified beacon information. The terminal ID information may be an identifier, assigned to the WT by the base station to which the WT is coupled, that identifies the wireless terminal to the base station. Base station ID information may be, e.g., cell identifier such as a value of slope associated with the base station and used in hopping sequences. Sector ID information includes information identifying the sector ID of the sectorized base station's transmitter/receiver through which ordinary signaling is being communicated, and may correspond to the sector of the cell in which the wireless terminal is located. Selected carrier frequency information includes information identifying the carrier being used by the BS for downlink data signaling, e.g. traffic channel signals. Mode information identifies whether the wireless terminal is in an access/on/hold/sleep state. Identified beacon information may identify which beacon signals have been detected. User/device/session/resource information 734 may also include information identifying peer nodes in a communication session with WT 700, routing information, and/or air link resources such as, e.g., uplink and downlink traffic channel segments assigned to WT 700.

Power information 736 may include information associating each sector, cell, and carrier frequency set with a specific data transmission power levels and/or information identifying data transmission power ratio between different carriers within the same sector of a cell, as well as information associating different beacon signals with different transmission power levels. Detected beacon signal information 738 may include: information on each of the beacon signals that have be received and measured, e.g., cell/sector ID, received power level, and carrier frequency associated with ordinary signaling in the sector from which the beacon signal was transmitted. Detected beacon information 738 may also include information comparing adjacent sector beacons to the current WT sector beacon, information comparing measured beacon signals and/or information derived from measured beacon signals to handoff criteria. Cell/sector information 742 may include information used to construct hopping sequences used in the processing, transmission, and reception of data, information, control signals, and beacon signals. Carrier frequency information 740 may include information associating each sector/cell of the base stations in the communications system with a specific carrier frequencies, beacon signals, and sets of tones. SNR information 744 includes signal to noise ratio information including a measured SNR for the current downlink traffic channel (with the current cell/sector/carrier frequency connection) being used to receive downlink traffic signaling, as well as, predicted SNRs that the WT 700 would experience if the downlink traffic channel signaling was communicated using a different connection to a base station, e.g., a different cell, sector, and/or carrier frequency connection.

Received/processed base station deployment configuration information 746 includes received broadcast messages from BS transmitters conveying information which can be used to determine the deployment status of the corresponding base station transmitter, e.g., in terms of deployment cell type, frequencies used in a sector, and/or power levels used corresponding to the carriers deployed in the sector and/or cell. Received/processed base station deployment configuration information 746 also includes information determined from those received messages. Deployment signal evaluation information 748 includes information such as, e.g., look-up tables, used in the processing of received deployment configuration broadcast signals to obtain the base station sector attachment point deployment status and configuration.

WT routines 718 include a communications routine 722 and wireless terminal control routines 724. Wireless terminal communications routine 722 may implement the various communication protocols used by the wireless terminal 700. Wireless terminal control routines 724 perform the functional control operations of the wireless terminal 700 including power control, timing control, signaling control, data processing, I/O, beacon signal related functions, base station cell/sector/carrier frequency selection, and handoff request functions in accordance with the invention. The WT control routines 724 include signaling routines 726 and a connection comparison prediction routine 728. The signaling routines 726 using the data/information 720 in memory 708 control the operation of the receiver 704 and transmitter 706. The signaling routines 726 include a beacon detection routine 730 and a deployment configuration module 731. The beacon detection routine 730 detects and identifies beacons signals from different cells and/or sectors transmitted within the same carrier frequency band that the WT 700 is tuned for to receive ordinary downlink signaling, traffic channel signals. The beacon detection routine 730 also measures power levels for each of the detected beacon signals. The deployment configuration module 731 receives broadcast signals from BS transmitters including deployment configuration information and uses the stored BS deployment signal evaluation information, e.g., a look-up table, to determine the deployment configuration of the corresponding BS transmitter. The connection comparison prediction routine 728 uses detected beacon signal information 738 and known power relationships associated with the various cell/sector/carrier frequency combinations to calculate expected signal strength levels, e.g., for downlink traffic channel signals, if the WT 700 was connected to each of the potential cell/sector/carrier frequency combinations available. The connection comparison prediction routine 728 uses the calculated predicted signal strength information to calculate potential SNRs (signal to noise ratios) for each of the candidate base station connection possibilities currently available. Then the connection comparison prediction routine 728 may make decisions as to which cell/sector/carrier frequency to connect to and initiate handoff requests signals to the appropriate base station.

Figure 8:
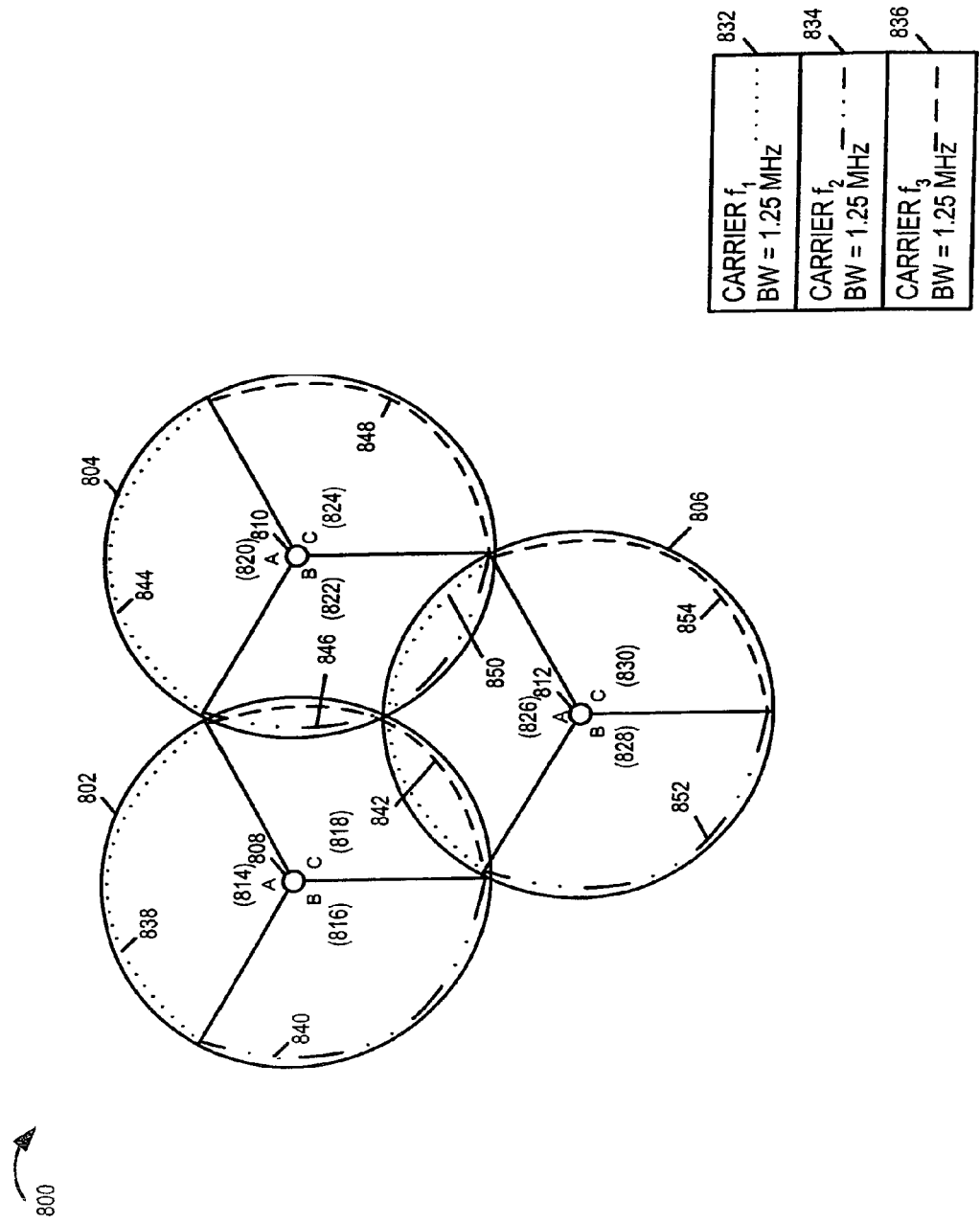
FIG. 8 is an illustration of an exemplary three sector per cell multi-cell cellular system in which different carrier frequencies, are used in each sector of a cell, in accordance with the present invention.

FIG. 8 shows an exemplary wireless communications system 800 of the invention including three cells (cell 1 802, cell 2 804, cell 3 806), each cell indicated by a solid line circle. Each cell (802, 804, 806) represents the wireless coverage area for a base station (808, 810, 812), respectively, located at the center of the cell. Each cell (802, 804, 806) is subdivided into three sectors A, B, and C. Cell 1 802 includes sector A 814, sector B 816, and sector C 818. Cell 2 804 includes sector A 820, sector B 822, and sector C 824. Cell 3 806 includes sector A 826, sector B 828, and sector C 830. Base stations sector A transmitters uses carrier frequency $f_1$ with a bandwidth of e.g., 1.25 MHz for communications from the base station to wireless terminals; base stations sector B transmitters uses carrier frequency $f_2$ with a bandwidth of 1.25 MHz for communications; base stations sector C transmitters uses carrier frequency $f_3$ with a bandwidth of 1.25 MHz for communications between the base station to wireless terminals. Carrier $f_1$ is indicated by a dotted line as shown in legend 832; carrier $f_2$ is indicated by a dot/dash line as shown in legend 834; carrier $f_3$ is indicated by a dash line as shown in legend 836. The radius of each (dotted, dot/dash, or dashed) line is indicative of the transmitter power associated with carrier in the given sector. In the example of FIG. 8, the power in each sector for a given carrier is the same or nearly equivalent. In each cell (802, 804, 806), the exemplary total available 5 MHz bandwidth is subdivided to include three non-overlapping bands, each with a different carrier frequency. The pattern is repeated across the cells of the system 800, with each cell oriented approximately in the same direction. The entire spectrum is used in each cell. In each of the cells, the sectors of the same or similar orientation use the same carrier. Advantageously, customized frequency planning on a per cell basis is not required. In sector A (814, 820, 826) of cells (802, 804, 806), carrier frequency $f_1$ is used, as indicated by dotted lines (838, 844, 850), respectively. In sector B (816, 822, 828) of cells (802, 804, 806), carrier frequency $f_2$ is used, as indicated by dot/dash lines (840, 846, 852), respectively. In sector C (818, 824, 830) of cells (802, 804, 806), carrier frequency $f_3$ is used, as indicated by dashed line (842, 848, 854), respectively. An advantage of this approach of making use of the 5 MHz total BW available is that the wireless terminals, e.g., mobiles, can process a 1.25 MHz band as opposed to requiring the wireless terminal to have the ability to process the larger 5 MHz band at a particular point in time as would be the case if frequency hopping throughout the 5 MHz band was used for a communications session. The 1.25 MHz band is normally sufficiently large to support spread spectrum signaling and frequency hopping over a relatively large number of tones to provide a fair amount of signal and interference diversity. The portioning of the total BW into distinct bands can result in a lower battery power consumption, thus increasing wireless terminal operational time between battery recharges or replacements since the mobiles need not process and hop over the total 5 MHz band during a particular communications session. One advantage of this approach as compared to using the same carrier in each section is that interference is reduced, as different carrier frequencies are used at cell and sector boundaries. This should result in a more uniform throughput across the sectors and cells of the system and higher data rate at cell and/or sector edges. This more uniform throughput can be important in terms of quality of service and being able to offer a high data rate that will be reliable throughout the system. Reduced interference at boundaries is particularly important in wireless data systems, where traffic tends to be bursty and there is a constant string of control signals, which need to reach the worst case user in the system. In such as system, because of the reduced interference levels, the worst case SNR may not be so bad; therefore the cost associated with reaching each user, e.g., in terms of power requirements, is smaller as compared to other approaches. This approach of using different carrier frequencies in different sectors also lends itself well to further expansion in a phased gradual deployment as needs arise in accordance with the invention.

Figure 9:
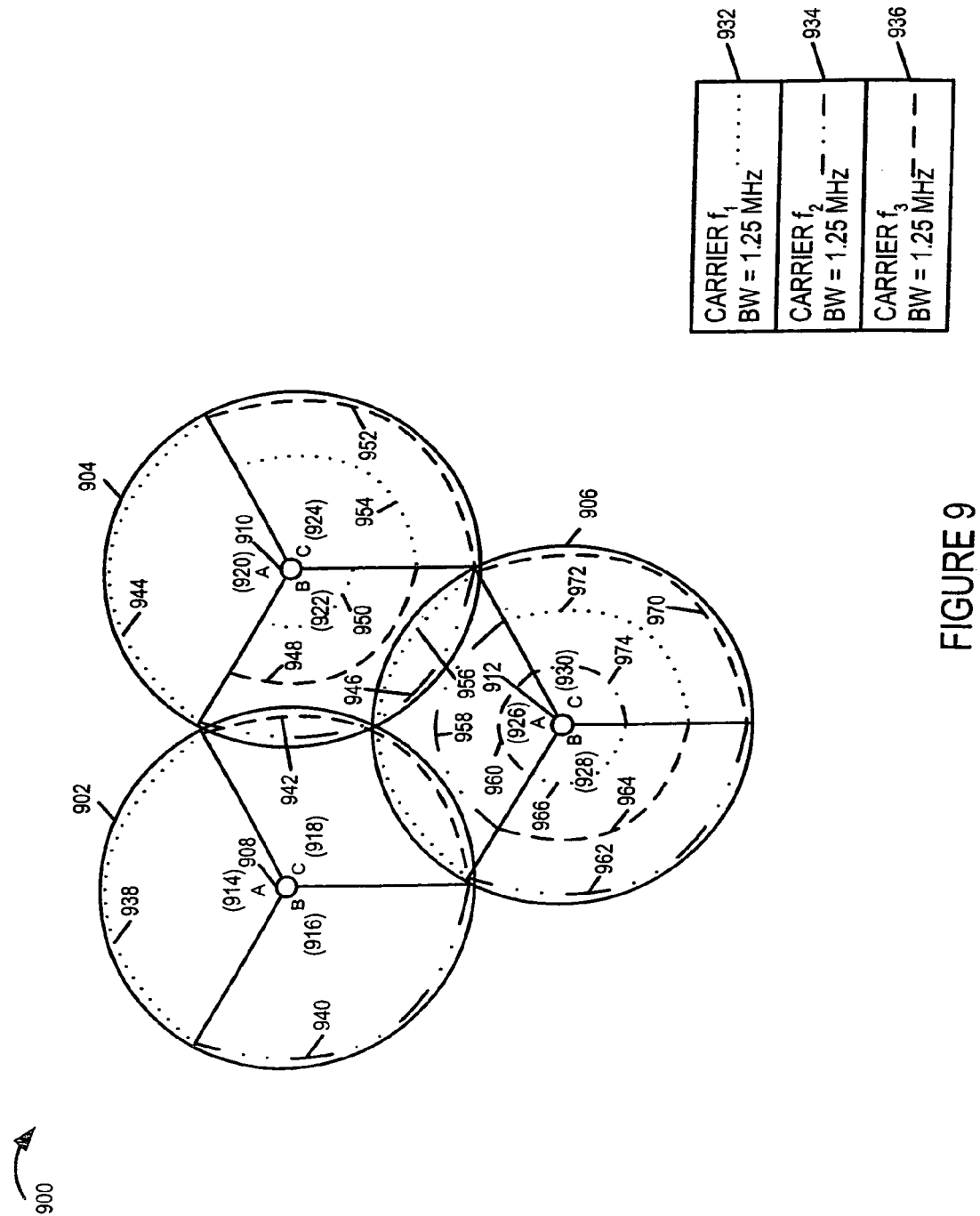
FIG. 9 is an illustration on a exemplary three sector per cell multi-cell cellular system illustrating phased deployment of increased bandwidth in which different carrier frequencies are used to varying extends and at different power levels in the various sectors of the cells of the system, in accordance with the present invention.

FIG. 9 illustrates an exemplary wireless communications system 900 including three exemplary cells (cell 1 902, cell 2 904, cell 3 906), each cell indicated by a solid line circle. Each cell (902, 904, 906) represents the wireless coverage area for a base station (908, 910, 912) located at the center of the cell (902, 904, 906), respectively. Each cell (902, 904, 906) is subdivided into three sectors A, B, and C. Cell 1 902 includes sector A 914, sector B 916, and sector C 918. Cell 2 904 includes sector A 920, sector B 922, and sector C 924. Cell 3 906 includes sector A 926, sector B 928, and sector C 930. Carrier $f_1$ is indicated by a dotted line as shown in legend 932; carrier $f_2$ is indicated by a dot/dash line as shown in legend 934; carrier $f_3$ is indicated by a dash line as shown in legend 936. Each carrier frequency $f_1$, $f_2$, $f_3$ is associated with a 1.25 MHz bandwidth segment of the 5 MHz available total BW, and the BW segments are non-overlapping. The radius of each (dotted, dash/dot, or dashed) line is indicative of the transmitter power associated with the carrier in the given sector.

In the first cell 902, the base stations sector A transmitter uses carrier frequency $f_1$ at a high power level (arc) 938 for communications, e.g., downlink traffic and control channel signals, from the base station 908 to wireless terminals 700; the base station sector B transmitter uses carrier frequency $f_2$ at a high power level (arc) 940 for data communications; the base station sector C transmitter uses carrier frequency $f_3$ at a high power level (arc 942) for data communications.

In the second cell 904, the base stations sector A transmitter uses carrier frequency $f_1$ with at a high power level (arc) 944 for communications, e.g., downlink traffic and control channel signals, from the base station 910 to wireless terminals 700; the base station sector B transmitter uses carrier frequency $f_2$ at a higher power level (arc) 946, carrier $f_3$ at an intermediate power level (arc) 948, and carrier $f_1$ at a low power level (arc) 950 for data communications; the base station sector C transmitter uses carrier frequency $f_3$ at high power (arc) 952, and carrier frequency $f_1$ at an intermediate power level (arc) 954 for data communications. Carriers $f_2$ and $f_3$ are not used in sector A 920 of the second cell 904 for data communications. Carrier $f_2$ is not used in sector C 924 of the second cell 904 for data communications.

In the third cell 906, the base stations sector A transmitter uses carrier frequency ($f_1$, $f_2$, $f_3$) at high (arc) 956, intermediate (arc) 958, and low (arc) 960 power levels, respectively, for communications, e.g., downlink traffic and control channel signals, from the base station 912 to wireless terminals 700; the base station sector B transmitter uses carrier frequency ($f_2$, $f_3$, $f_1$) at a (high (arc) 962, intermediate (arc) 964, low (arc) 966) power level, respectively, for communications, e.g., downlink traffic and control channel signals, from the base station 912 to wireless terminals 700 ; the base station sector C transmitter uses carrier frequency ($f_3$, $f_1$, $f_2$) at a (high (arc) 970, intermediate (arc) 972, low (arc) 974) power level, respectively, for data communications, e.g., downlink traffic and control channel signals, from the base station 912 to wireless terminals 700. Thus, in the $3^{rd}$ cell 906 there is full frequency reuse. In the first cell 902 there is a frequency reuse of ⅓ and in cell 2 904 there is a frequency reuse rate somewhere between ⅓ and 1.

FIG. 9 represents different levels of frequency reuse throughout a system and may represent a system in an intermediate level of deployment in accordance with the invention. The first cell 902 may represent a region where there are a low number of customers to support, while the third cell 906 may represent a region where there are a high number of users to support. Different sectors (920, 922, 924) of the second cell 904 may represent different regions, each region requiring a different level of user support. Alternatively or in addition, the differences in levels of deployment in each sector of each cell may correspond to a gradual infrastructure deployment program, e.g., based upon hardware delivery, funding, and/or installation limitations. Alternatively, or in addition, the different levels of deployment in each sector may depend upon the licensing agreements and/or frequencies available for the service provider to use at the particular point in time.

Figure 10:
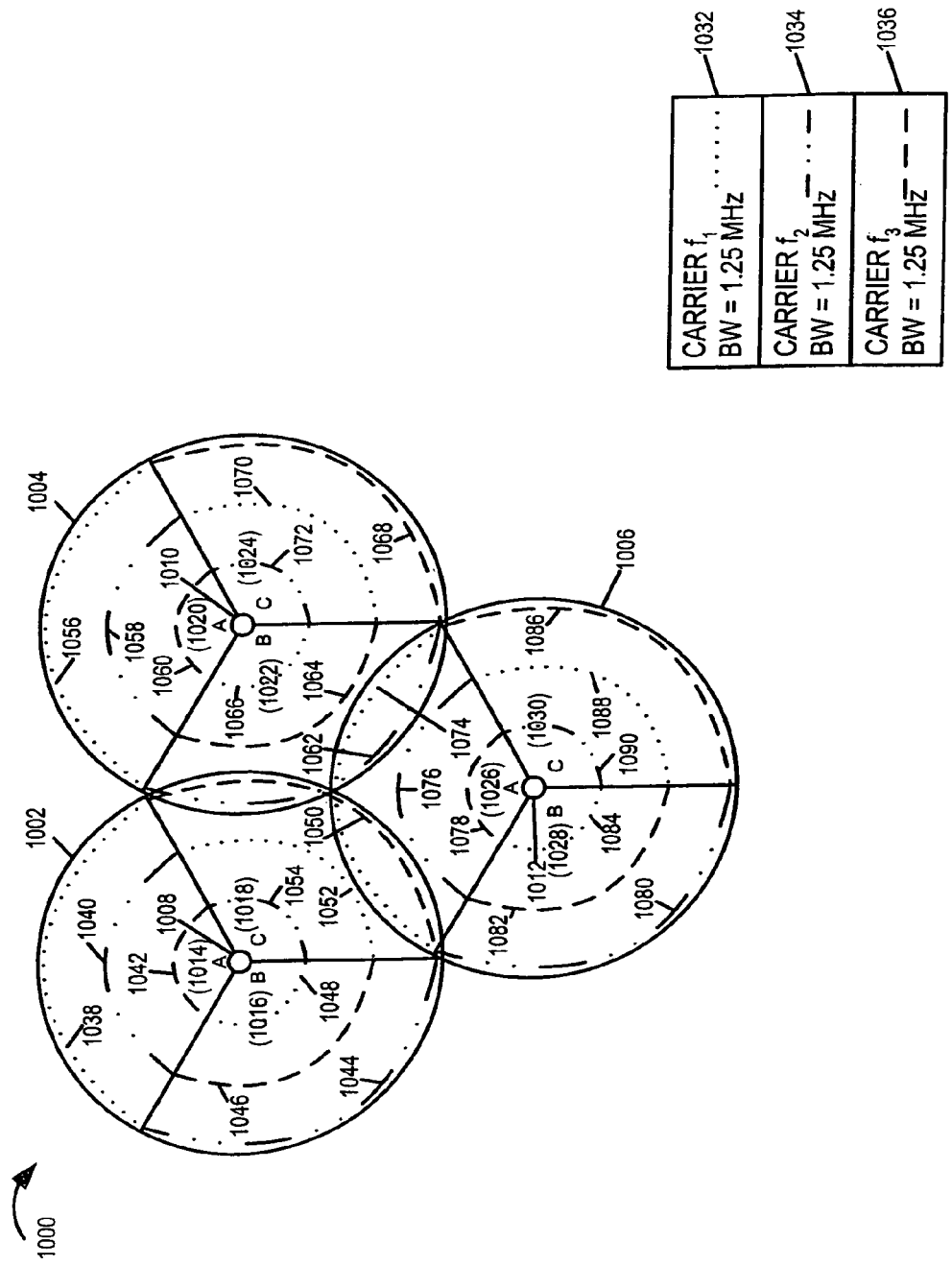
FIG. 10 is an illustration of an exemplary three per cell sector multi-cell cellular system illustrating a level of deployment in which three carrier frequencies each with an equivalent associated bandwidth are used simultaneously in each of the sectors of the cells, with different power levels associated with each of the three carriers in given sector, in accordance with the present invention.

FIG. 10 illustrates an exemplary wireless communications system 1000 including three exemplary cells (cell 1 1002, cell 2 1004, cell 3 1006), each cell indicated by a solid line circle. Each cell (1002, 1004, 1006) represents the wireless coverage area for a base station (1008, 1010, 1012) located at the center of the cell (1002, 1004, 1006), respectively. Each cell (1002, 1004, 1006) is subdivided into three sectors A, B, and C. Cell 1 1002 includes sector A 1014, sector B 1016, and sector C 1018. Cell 2 1004 includes sector A 1020, sector B 1022, and sector C 1024. Cell 3 1006 includes sector A 1026, sector B 1028, and sector C 1030. Carrier $f_1$ is indicated by a dotted line as shown in legend 1032; carrier $f_2$ is indicated by a dot/dash line as shown in legend 1034; carrier $f_3$ is indicated by a dash line as shown in legend 1036. Each carrier frequency $f_1$, $f_2$, $f_3$ is associated with a 1.25 MHz bandwidth segment of the 5 MHz available total BW in the exemplary embodiment, and the BW segments are non-overlapping. The radius of each (dotted, dot/dash, or dashed) line is indicative of the transmitter power associated with the carrier in the given sector. In FIG. 10, there is a frequency reuse factor of 1, i.e., the same set of frequencies is used in each sector and in each cell.

In each of the three cells (1002, 1004, 1006), the base stations sector A transmitter uses carrier frequency ($f_1$, $f_2$, $f_3$) at a (high, intermediate, low) power level, respectively, for communications, e.g., downlink traffic and control channel signals, from the base station (1008, 1010, 1012) to wireless terminals 700. In each cell (1002, 1004, 1006), the base station sector B transmitter uses carrier frequency ($f_2$, $f_3$, $f_1$) at a (high, intermediate, low) power level, respectively, communications, e.g., downlink traffic and control channel signals, from the base station (1008, 1010, 1012) to wireless terminals 700; the base station sector C transmitter uses carrier frequency ($f_3$, $f_1$, $f_2$) at a (high, intermediate, low) power level, respectively, for communications, e.g., downlink traffic and control channel signals, from the base station (1008, 1010, 1012) to wireless terminals 700. The following notation is used to describe the base station transmitter power levels in system 700 with respect to the carrier frequencies: (cell, sector, high power carrier/intermediate power carrier/low power carrier): (cell reference number, sector reference number, arc line reference number for high power carrier/arc line reference number for intermediate power carrier/arc line reference number for low power carrier). System 1000 includes: (cell 1, sector A, $f_1/f_2/f_3$):(1002, 1014, 1038/1040/1042); (cell 1, sector B, $f_2/f_3/f_1$):(1002, 1016, 1044/1046/1048); (cell 1, sector C, $f_3/f_1/f_2$):(1002, 1018, 1050/1052/1054); (cell 2, sector A, $f_1/f_2/f_3$):(1004, 1020, 1056/1058/1060); (cell 2, sector B, $f_2/f_3/f_1$):(1004, 1022, 1062/1064/1066); (cell 2, sector C, $f_3/f_1/f_2$):(1004, 1024, 1068/1070/1072); (cell 3, sector A, $f_1/f_2/f_3$):(1006, 1026, 1074/1076/1078); (cell 3, sector B, $f_2/f_3/f_1$):(1006, 1028, 1080/1082/1084); (cell 3, sector C, $f_3/f_1/f_2$):(1006, 1030, 1086/1088/1090).

FIG. 10 represents the same level of frequency reuse throughout each sector of a system and may represent a system in an advanced level of deployment, e.g., where a deployment program has been completed and/or where the service provider has a larger customer base with high demands which can justify such a deployment level.

The three carriers are transmitted at different power levels $P_1$, $P_2$ $P_3$, in each sector. In various embodiments there is a fixed relationship between the three power levels $P_1$, $P_2$, $P_3$, used in each sector. In one such embodiment the ratio of high power to medium power is the same regardless of the sector, and so is the ratio of medium power to low power. In one embodiment, the ratio is at least 3 dB. A preferable ratio is about 6 dB.

Figure 11:
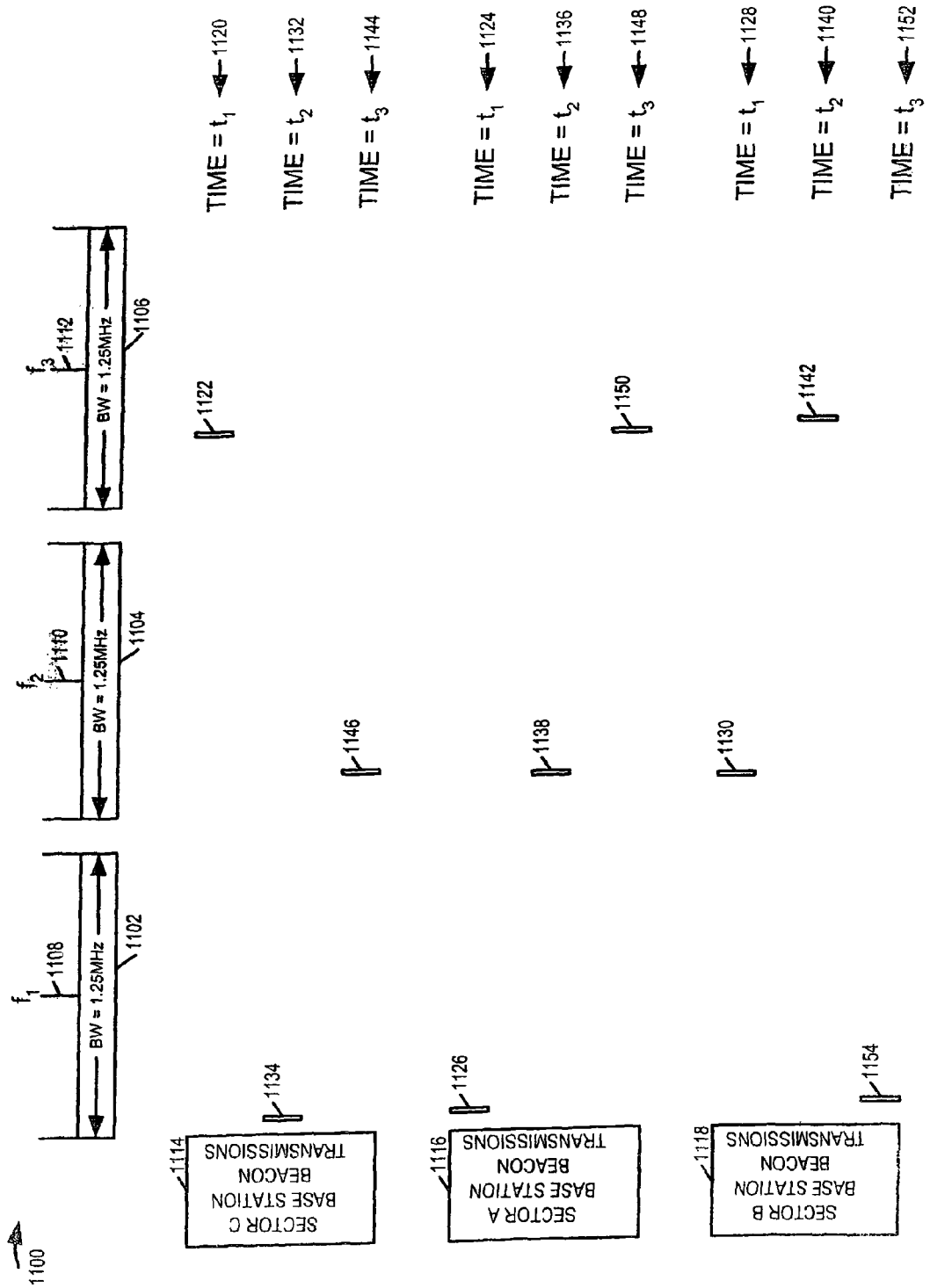
FIG. 11 is an illustration of an exemplary method of beacon signaling in accordance with the invention which may be used to convey to wireless terminals information that may be used to make carrier selection evaluations, in accordance with the present invention.

FIG. 11 is an illustration 1100 of an exemplary method of beacon signaling in accordance with the invention which may be used to convey information wireless terminals 700, e.g., mobiles traveling through a system, so that the mobiles may make informed decisions regarding handoffs between the various carriers available at different transmission power levels from the various sectors/cells of the system. In accordance with the invention, the mobile selects and determines to which cell, sector, and carrier frequency to use for the downlink communications.

As discussed above, beacon signals are transmitted in some embodiments. FIG. 11 shows exemplary beacon signaling for an exemplary cell, e.g., one of the cells in FIG. 10. FIG. 11 shows three distinct 1.25 MHZ bands (1102, 1104, 1106), the set of three bands (1102, 1104, 1106), represented horizontally in illustration 1100, may be included as part of a wireless communications system with a 5 MHz overall BW. Each 1.25 MHz band (1102, 1104, 1106) includes a carrier frequency ($f_1$ 1108, $f_2$ 1110, $f_3$ 1112) respectively. Sector C base station beacon transmission are represented in the vertical section of illustration 1100 defined by the vertical boundaries of block 1114; sector A base station beacon transmission are represented in the vertical section of illustration 1100 defined by the vertical boundaries of block 1116; Sector B base station beacon transmission are represented in the vertical section of illustration 1100 defined by the vertical boundary of block 1118. In each sector, the sector's base station transmitter transmits beacon signals into each of the three bands (1102, 1104, 1106) at different times. This allows a wireless terminal 700 in any sector to maintain its receiver on the frequency band that is currently using for downlink data signaling, and yet receive and process beacon signals from adjacent sectors/cells in order to make decisions regarding handoffs. The tone locations of the beacon signals within the 1.25 MHz band can be used carry information identifying the cell ID and sector ID. In FIG. 11, at time $t_1$, sector C base station transmitter transmits a beacon signal 1122 within the carrier $f_3$ band 1106 (row 1120), sector A base station transmitter transmits a beacon signal 1126 within the carrier $f_1$ band 1102 (row 1124), and sector B base station transmitter transmits a beacon signal 1130 within the carrier $f_2$ band 1104 (row 1128). At time $t_2$, sector C base station transmitter transmits a beacon signal 1134 within the carrier $f_1$ band 1102 (row 1132), sector A base station transmitter transmits a beacon signal 1138 within the carrier $f_2$ band 1104 (row 1136), and sector B base station transmitter transmits a beacon signal 1142 within the carrier $f_3$ band 1106 (row 1140). At time $t_3$, sector C base station transmitter transmits a beacon signal 1146 within the carrier $f_2$ band 1104 (row 1144), sector A base station transmitter transmits a beacon signal 1150 within the carrier $f_3$ band 1106 (row 1148), and sector B base station transmitter transmits a beacon signal 1154 within the carrier $f_1$ band 1102 (row 1152). The timing of the transmitted beacon signals can be such that time designation $t_1$ occurs first, followed later by $t_2$, followed later by $t_3$, and then the cycle repeats, e.g., periodically over time.

Figure 12:
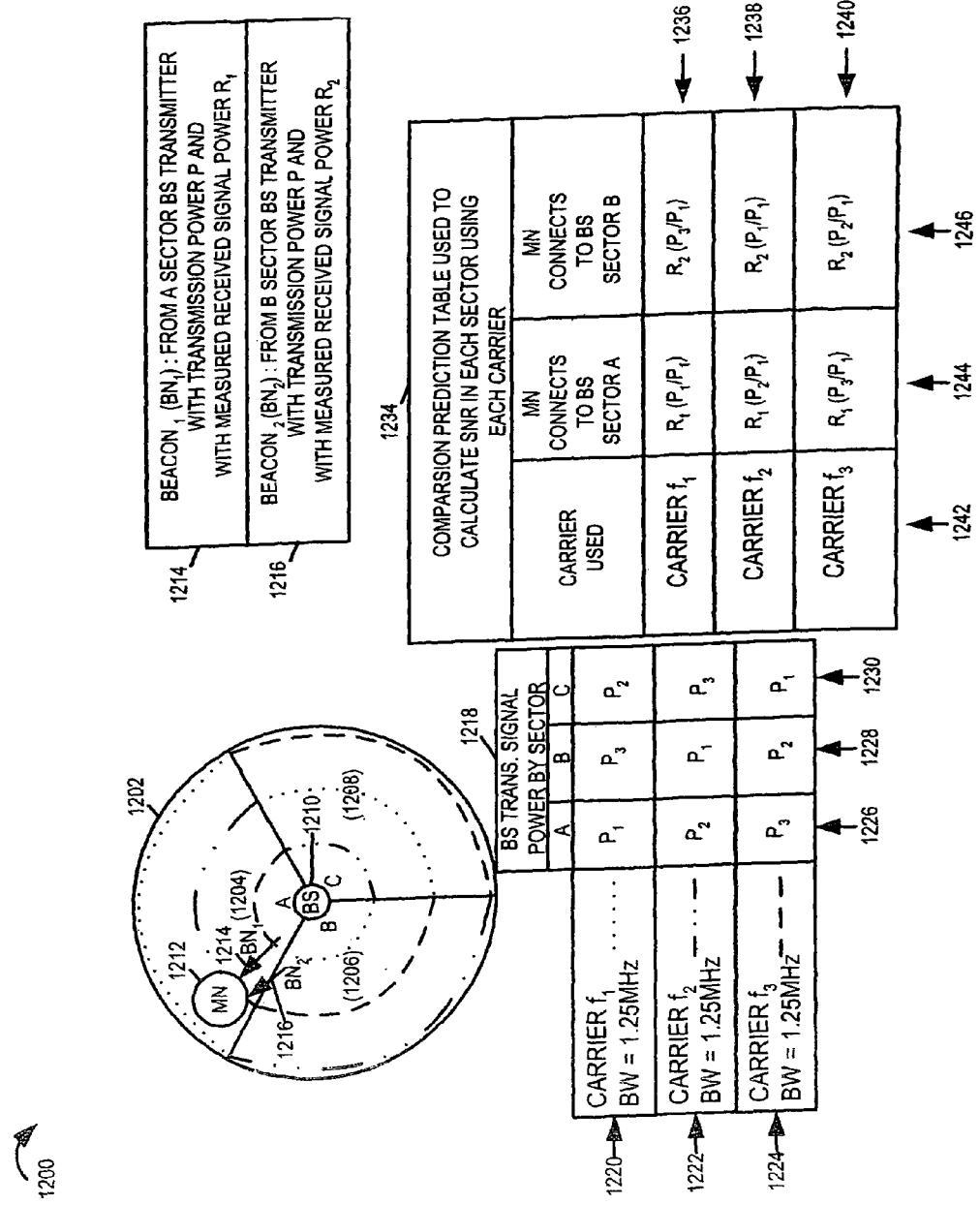
FIG. 12 is an illustration of a exemplary three sector cell employing three carrier frequencies ($f_1$, $f_2$, $f_3$), each carrier using a distinct 1.25 MHz BW in a 5 MHz system, an exemplary wireless terminal receiving beacon signals, an exemplary table for associating transmission power levels with carriers, and an exemplary comparison prediction table for calculating expected signal-to-noise ratios, in accordance with the present invention.

FIG. 12 is an illustration 1200 of a exemplary three sector (A 1204, B 1206, C 1208) cell 1202 employing three carrier frequencies ($f_1$, $f_2$, $f_3$), each carrier using a distinct 1.25 MHz BW in a 5 MHz system. Carrier frequency $f_1$ is indicated by dotted lines in the legend in row 1220 and in cell 1202. Carrier frequency $f_2$ is indicated by dot/dash lines in the legend in row 1222 and in cell 1202. Carrier frequency $f_3$ is indicated by dashed lines in the legend in row 1224 and in cell 1202.

For example, the cell 1202 of FIG. 12 may represent one of the cells in FIG. 10. A base station 1210 located at the center of the cell 1202 can transmit data signals, e.g., downlink traffic channel signals and controls signals using three different carrier frequencies. Sector transmitters use a different data signaling transmission power level for the same carrier in each sector. In the same sector, the data signaling transmission power is transmitted at different power levels for each carrier; the power level is represented by the radius of the line representing the carrier frequency in the sector. FIG. 12 also shows an exemplary wireless terminal 1212, e.g., mobile node (MN), located with the exemplary cell 1202 near the boundary between sector A 1204 and sector B 1206. The MN 1212 is receiving beacon$_1$ signal (BN$_1$) 1214 from A sector BS transmitter, where the beacon signal (BN$_1$) 1214 was transmitted with power level P and has a measured received power at the MN of $R_1$. The MN 1212 is also receiving beacon$_2$ signal (BN$_2$) 1216 from B sector BS transmitter, where the beacon signal (BN$_2$) 1216 was transmitted with power level P and has a measured received power at the MN of $R_2$. The beacon signals 1214, 1216 shown in FIG. 12 may correspond to exemplary beacon signals as described in FIG. 11.

A table 1218 lists the data transmission power levels ($P_1$, $P_2$, $P_3$) associated with each carrier frequency in each sector of the cell, where $P_1 > P_2 > P_3$. First row 1220 corresponds to carrier frequency $f_1$; second row 1222 corresponds to carrier frequency $f_2$; third row 1224 corresponds to carrier frequency $f_3$. First column 1226 corresponds to BS sector A power transmission level; second column 1228 corresponds to base station sector B power transmission level; third column 1230 corresponds to BS sector C power transmission level. In the illustration 1200, frequency $f_1$ is represented by a dotted line, $f_2$ by a dot/dash line, and frequency $f_3$ by a dashed line.

FIG. 12 also includes a comparison prediction table 1234 that may be used by the MN 1212 to calculate SNR in each sector (A 1204, B 1206) using each carrier and make predictions as to what would happen is the MN 1212 connected and tuned to another carrier within the same sector or to one of the carriers in the adjacent sectors. The MN 1212 knows the fixed ratio relationship that exists between $P_1$, $P_2$ and $P_3$, obtains measured values for $R_1$ and $R_2$, computes the values of the table, uses the table to calculated expected SNR for each of the available options, e.g., sector/carrier frequency combination available, and makes a decision regarding hand-offs. For example in the FIG. 12 example, the MN 1212 can predict a measure of the expected received power levels for data downlink signaling for each of the three carriers for sector A and for each of the three carriers for sector B using the equations shown. From those values expected signal strength may be obtained, and by dividing by the expected interference level the expected SNR may be calculated. First column 1242 lists the carrier used; second column 1244 lists equations used to calculate expected SNRs if the MN 1212 connects to a sector A BS transmitter, while third column 1246 lists equations used to calculate expected SNRs if the MN 1212 connects to a sector B BS transmitter. First row 1236 includes equations calculating expected SNRs if the MN 1212 connects via carrier $f_1$; second row 1238 includes equations calculating expected SNRs if the MN 1212 connects via carrier $f_2$; third row 1240 includes equations if the MN 1212 connects via carrier $f_3$.

In accordance with the invention, the MN may use different criteria to decide to which sector/carrier frequency to be connect to the BS. For example, some MNs may select to use the connection with the best SNR, while other MNs may select to use an SNR that is acceptable for the MNs data requirements but not necessarily the best, e.g., leaving the better SNR for another MN that may require the higher level. In some embodiments, selection decision shall consider traffic loading requirements in the system. In some embodiments traffic loading information for a given sector and carrier frequency may be included in the information conveyed by the beacons.

In various embodiments, each sector will transmit a set of beacons and the tone locations of those beacons can be used by MNs to identify the cell and sector. In some embodiments, different beacon signals may be transmitted at different, e.g., slightly different, power levels, the corresponding transmitted power levels of the beacon signals being known to the MNs. In a given sector, the beacon signal using the same carrier frequency as that used to transmit data at the intermediate data transmission power level, should have a beacon transmission power that is more than the sum of the data transmission power using that carrier frequency. Similarly, in a given sector, the beacon signal using the same carrier frequency as that used to transmit data at the lower data transmission power level, should have a beacon transmission power that is more than the sum of the data transmission power using that carrier frequency. In one embodiment, the transmission power of the beacon signals is the same for each of the carriers in a sector of a cell. In another embodiment, the transmission power of the beacon signals is the same for each of the sectors of a cell.

In some embodiments, a fixed data transmission power relationship between the carriers serving a sector exists and is known, for that sector by the MN. In some embodiments, the MN retains or obtains information allowing the MN to determine absolute data transmission power values from the relative data transmission relationships.

Although shown for an exemplary communications system with bandwidth divided between 3 carriers (frequency bands), the invention is applicable to other communications systems with bandwidth partitioned into a different numbers of carrier slots in the system.

In some embodiments, various features or elements of the invention may be implemented in part of a communications system and not implemented in other parts of the system. In such an embodiment, the wireless terminals, implemented in accordance with the invention, may utilize the beacon signaling features and method of the invention when available in making decisions regarding inter-sector, inter-cell, and/or intra-sector handoffs.

For purposes of explaining the invention it should be appreciated that each cell includes at least one sector and one base station. In some embodiments multi-sector cells and base stations are used. Handoffs occur between sectors and/or cells. In the case of multi-sector cells, intra-cell as well as inter-cell handoffs may occur. In the case of multiple carriers within the same sector, intra-sector handoffs may occur. Handoff's to a sector of a cell involves transfers of information, physical layer signaling including, e.g., device ID assignments for a sector, and other signaling layer operations, e.g., power and/or timing control which are performed by the module(s) of the sector(s) involved in the handoff. Data may be communicated from one sector to another via communications links, e.g., non-wireless links such as fiber optic or wire links, that exit between one or more base stations and/or between the modules corresponding to the sectors of a single base station.

Table 1234 of FIG. 12 lists the projected signal strength if the MN connects to a particular carrier. The MN can then further calculate the signal-to-interference ratio (SIR) condition if the MN chooses any carrier.

For example, suppose the MN chooses carrier $f_1$. The MN first determines which BS sector transmitter corresponds to the highest received signal strength in carrier $f_1$. For example, if $R_1(P_1/P_1) > R_2(P_3/P_1)$, then in carrier $f_1$, the BS sector A transmitter is considered the stronger transmitter by the MN and will be the preferred BS sector transmitter to make the connection if the MN finally uses carrier $f_1$. Then, the signal from the BS sector B transmitter will be interference. Hence, in such a case, the SIR in carrier $f_1$ will be $[R_1(P_1/P_1)]/[R_2(P_3/P_1)]$.

Now suppose that the MN chooses carrier $f_2$. Following the same procedure, the MN will find the preferred BS sector transmitter to make the connection in carrier $f_2$ and the resultant SIR. For example, if $R_1(P_2/P_1) < R_2(P_1/P_1)$, then the BS sector B transmitter will be the preferred one and the SIR in carrier $f_2$ will be $[R_2(P_1/P_1)]/[R_1/(P_2/P_1)]$.

The above example can be easily expanded to the cases where the MN receives the beacon signals from more than two BS sector transmitters.

As illustrated in the above example, because of the power scaling, the preferred BS sector transmitters may be different in different carriers.

The MN derives the SIRs for each of the carriers and then selects one carrier to make the connection as a function of the SIRs. The MN may prefer to use a carrier of high SIR, but not necessarily always use the carrier of the highest SIR. In one embodiment, if the SIRs of multiple BS sector transmitters are each above certain threshold, the MN may randomly choose one of the carriers, or even choose the carrier with the lowest SIR. In another embodiment, the choice of carriers is also a function of the traffic loading of individual BS sectors.

Once the MN has chosen a carrier, the above calculation also tells the MN which BS sector transmitter to make a connection with.

Figure 13:
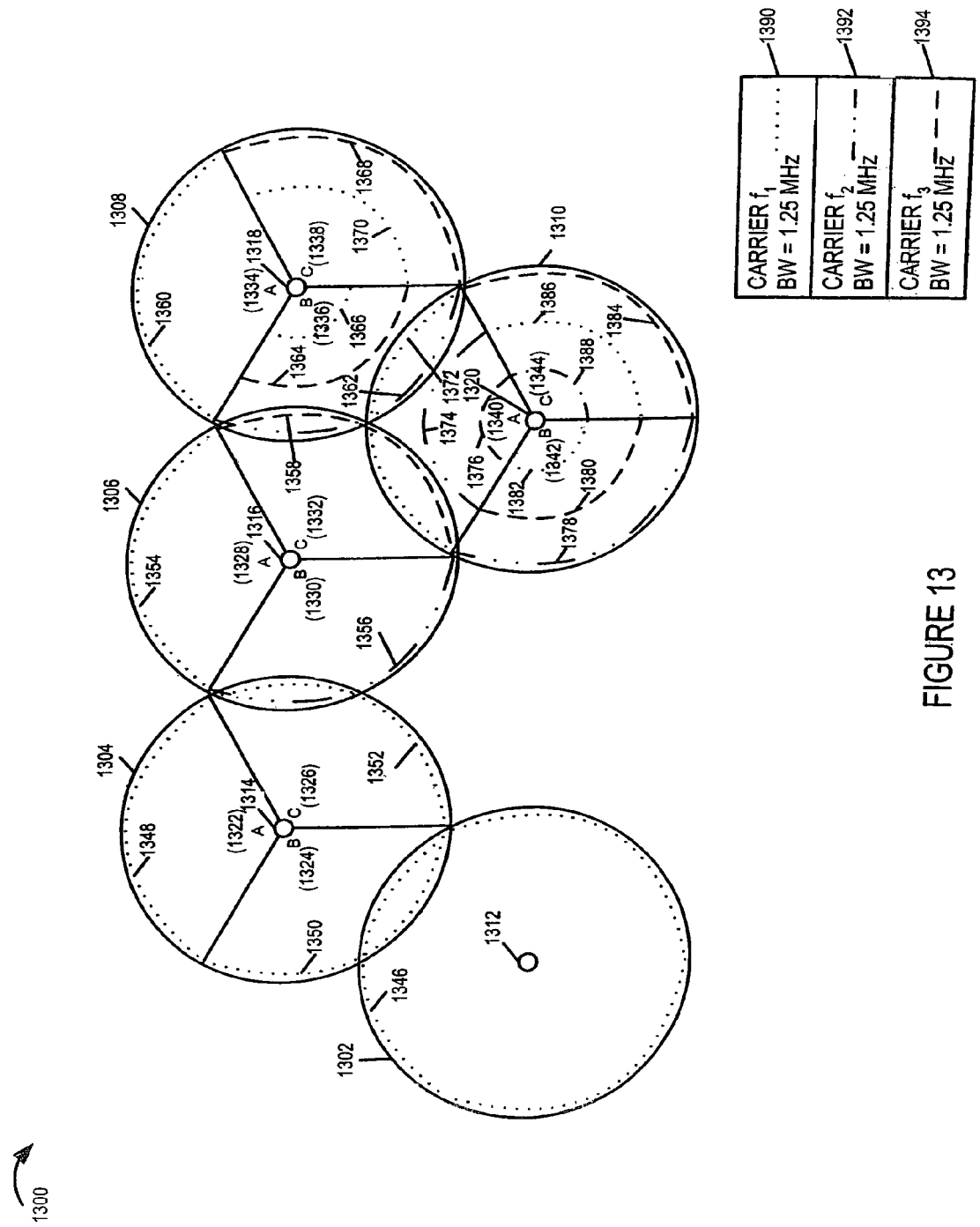
FIG. 13 illustrates an exemplary wireless communications system including five exemplary cells, each cell illustrating a different level of deployment.

FIG. 13 illustrates an exemplary wireless communications system 1300 including five exemplary cells (cell 1 1302, cell 2 1304, cell 3 1306, cell 4 1308, cell 5 1310), each cell indicated by a solid line circle. Each cell (1302, 1304, 1306, 1308, 1310) represents the wireless coverage area for a base station (1312, 1314, 1316, 1318, 1320) located at the center of the cell (1302, 1304, 1306, 1308, 1310), respectively. Cell 1 1302 is a single sector cell. Each cell (1304, 1306, 1308, 1310) is subdivided into three sectors A, B, and C. Cell 2 1304 includes sector A 1322, sector B 1324, and sector C 1326. Cell 3 1306 includes sector A 1328, sector B 1330, and sector C 1332. Cell 4 1308 includes sector A 1334, sector B 1336, and sector C 1338. Cell 5 1310 includes sector A 1340, sector B 1342, and sector C 1344. Carrier $f_1$ is indicated by a dotted line as shown in legend 1390; carrier $f_2$ is indicated by a dot/dash line as shown in legend 1392; carrier $f_3$ is indicated by a dash line as shown in legend 1394. Each carrier frequency $f_1, f_2, f_3$ is associated with a 1.25 MHz bandwidth segment of the 5 MHz available total BW, and the BW segments are non-overlapping. The radius of each (dotted, dash/ dot, or dashed) line is indicative of the transmitter power associated with the carrier in the given sector.

In the first cell 1302, the base station transmitter uses carrier frequency $f_1$ at a high power level (arc) 1346 for communications, e.g., downlink traffic and control channel signals, from the base station 1312 to wireless terminals 700. Carriers $f_2$ and $f_3$ are not used in first cell 1302 for data communications.

In the second cell 1304, the base stations sector A transmitter uses carrier frequency $f_1$ at a high power level (arc) 1348 for communications, e.g., downlink traffic and control channel signals, from the base station 1314 to wireless terminals 700; the base station sector B transmitter uses carrier frequency $f_1$ at a high power level (arc) 1350 for data communications; the base station sector C transmitter uses carrier frequency $f_1$ at a high power level (arc 1352) for data communications. Carriers $f_2$ and $f_3$ are not used in second cell 1304 for data communications.

In the third cell 1306, the base stations sector A transmitter uses carrier frequency $f_1$ at a high power level (arc) 1354 for communications, e.g., downlink traffic and control channel signals, from the base station 1316 to wireless terminals 700; the base station sector B transmitter uses carrier frequency $f_2$ at a high power level (arc) 1356 for data communications; the base station sector C transmitter uses carrier frequency $f_3$ at a high power level (arc) 1358 for data communications.

In the fourth cell 1308, the base stations sector A transmitter uses carrier frequency $f_1$ with at a high power level (arc) 1360 for communications, e.g., downlink traffic and control channel signals, from the base station 1318 to wireless terminals 700; the base station sector B transmitter uses carrier frequency $f_2$ at a higher power level (arc) 1362, carrier $f_3$ at an intermediate power level (arc) 1364, and carrier $f_1$ at a low power level (arc) 1366 for data communications; the base station sector C transmitter uses carrier frequency $f_3$ at high power (arc) 1368, and carrier frequency $f_1$ at an intermediate power level (arc) 1370 for data communications. Carriers $f_2$ and $f_3$ are not used in sector A 1334 of the fourth cell 1308 for data communications. Carrier $f_2$ is not used in sector C 1338 of the fourth cell 1308 for data communications.

In the fifth cell 1310, the base stations sector A transmitter uses carrier frequency $(f_1, f_2, f_3)$ at high (arc) 1372, intermediate (arc) 1374, and low (arc) 1376 power levels, respectively, for communications, e.g., downlink traffic and control channel signals, from the base station 1320 to wireless, terminals 700; the base station sector B transmitter uses carrier frequency $(f_2, f_3, f_1)$ at a (high (arc) 1378, intermediate (arc) 1380, low (arc) 1382) power level, respectively, for communications, e.g., downlink traffic and control channel signals, from the base station 1320 to wireless terminals 700 ; the base station sector C transmitter uses carrier frequency $(f_3, f_1, f_2)$ at a (high (arc) 1384, intermediate (arc) 1386, low (arc) 1388) power level, respectively, for data communications, e.g., downlink traffic and control channel signals, from the base station 1320 to wireless terminals 700. Thus, in the $5^{th}$ cell 1310 there is full frequency reuse. In the first, second and third cells (1302, 1304, 1306) there is a frequency reuse of ⅓ and in cell 2 904 there is a frequency reuse rate somewhere between ⅓ and 1.

FIG. 13 represents different levels of frequency reuse throughout a system and may represent a system in an intermediate level of deployment in accordance with the invention. The first cell 1302 may represent a region where there are a low number of customers to support, while the fifth cell 1310 may represent a region where there are a high number of users to support. Second, third and fourth cells may represent successively increasing levels of support. Different sectors (1334, 1336, 1338) of the fourth cell 1308 may represent different regions, each region requiring a different level of user support. Alternatively or in addition, the differences in levels of deployment in each sector of each cell may correspond to a gradual infrastructure deployment program, e.g., based upon hardware delivery, funding, and/or installation limitations. Alternatively, or in addition, the different levels of deployment in each sector may depend upon the licensing agreements and/or frequencies available for the service provider to use at the particular point in time.

Figure 14:
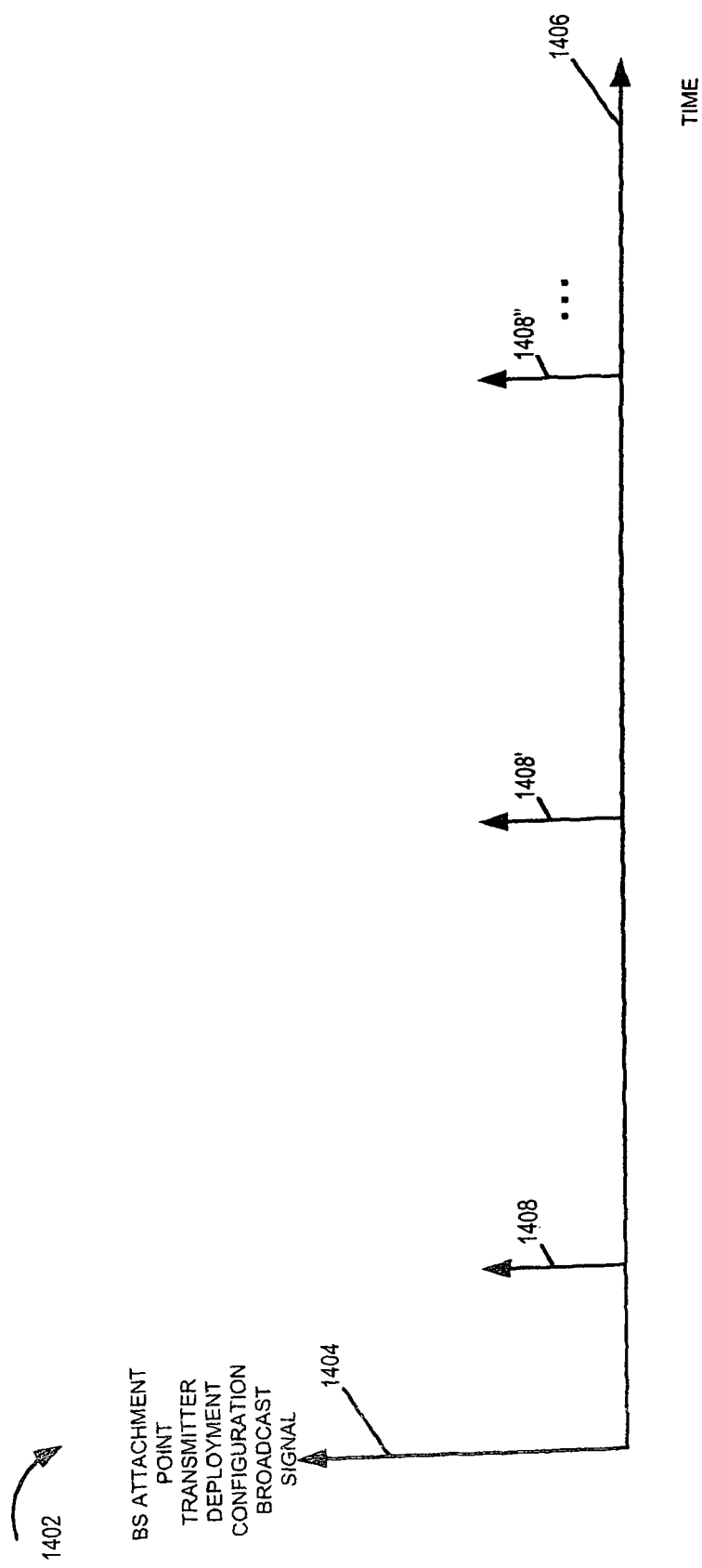
FIG. 14 is a drawing illustrating exemplary base station attachment point transmitter deployment configuration broadcast signaling.

In some embodiments of the present invention, the base station transmitters transmit broadcast signals on a periodic basis, the broadcast signals including information identifying the base station transmitter's current deployment configuration. FIG. 14 is an exemplary drawing 1402 illustrating base station attachment point transmitter deployment configuration broadcast signal on the vertical axis 1404 vs time on the horizontal axis 1406. An exemplary broadcast signal 1408 including information identifying current transmitter deployment configuration status is shown, which repeats periodically as signal 1408', 1408", etc.

Figure 15:
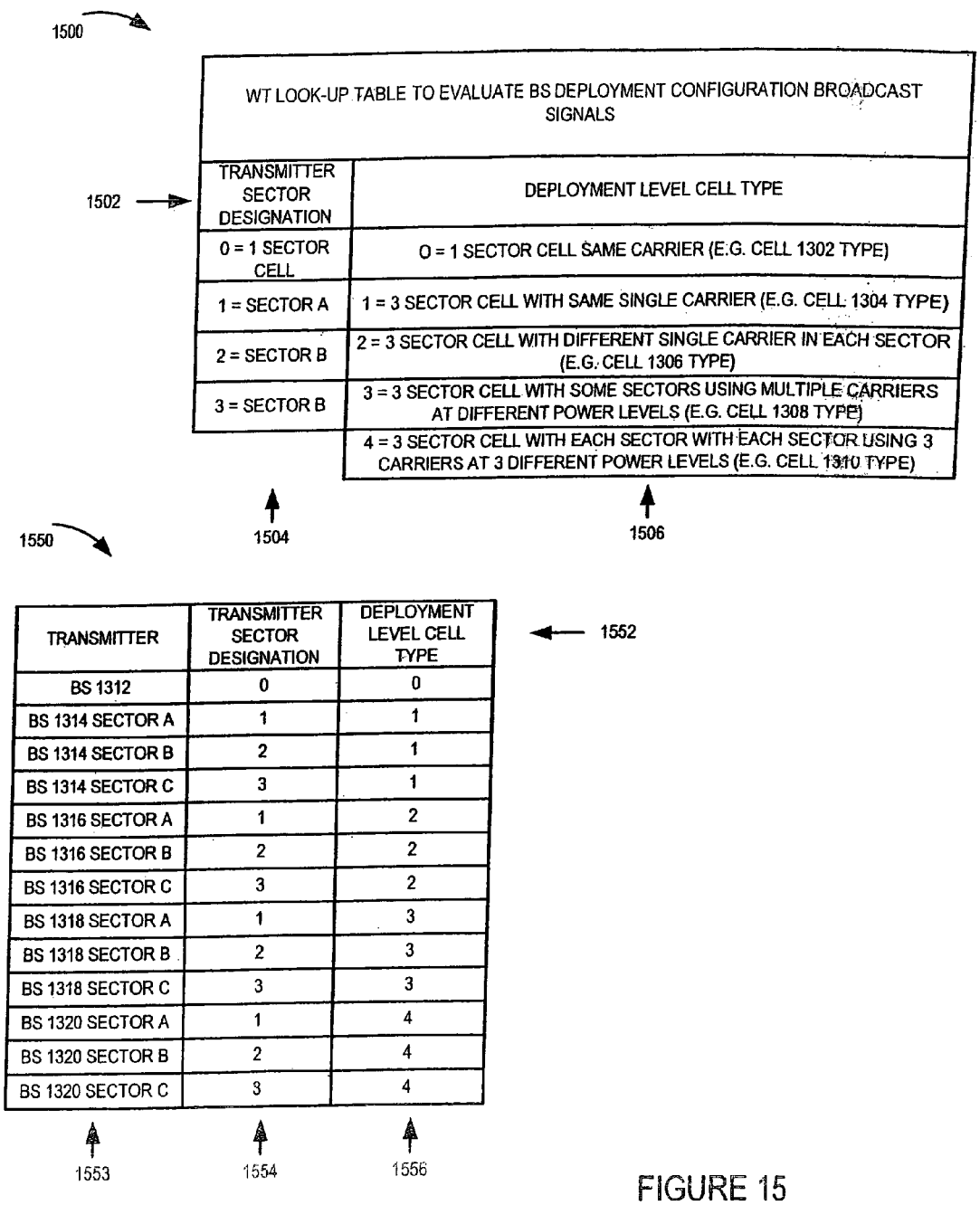
FIG. 15 includes a drawing of an exemplary look-up table that can be used by a wireless terminal to evaluate base station deployment configuration broadcast signals in an exemplary embodiment and a table including exemplary deployment configuration broadcast signal values.

FIG. 15 includes a drawing of an exemplary look-up table 1500 that can be used to evaluate base station deployment configuration broadcast signals in an exemplary embodiment. WTs 700 can store the information in table 1500 and use the information to process received broadcast signals, e.g., signal 1408, to determine the status of the corresponding BS transmitter and properly configure the WT. First row 1502 of table 1500 identifies that first column 1504 includes information on the transmitter sector designation and that second column 1506 includes information on the deployment level cell status in terms of cell type. A first field in broadcast message 1408 can include the transmitter sector designation, where: a value of 0 identifies a 1 sector cell that is not partitioned and which uses a single transmitter, a value of 1 identifies a sector A transmitter, a value of 2 identifies a sector B transmitter, and a value of 2 identifies a sector C transmitter. In this example, for the purposes of explanation, it is assumed that there a five distinct types of deployed cells in the system, as shown in FIG. 13. The second field of message 1408 includes a value used to determine the deployment level cell type, where a 0 value indicates a cell of type 1302, a value of 1 indicates a cell of type 1304, a value of 2 indicates a cell of type 1306, a value of 3 indicates a cell of type 1308, and a value of 4 indicates a cell of type 1310. The WT having stored carrier usage and power level information associated with each sector of each potential cell types, uses the broadcast message 1308 to determine the base station sector transmitter deployment configuration.

FIG. 15 also includes table 1550 which illustrates exemplary message field information for broadcast messages from the various transmitters identified in exemplary system 1300. First row 1552 identifies titles for each column. First column 1553 identifies the transmitter of FIG. 1300; second column 1554 identifies the transmitter sector designation value broadcast; third column 1556 identifies the deployment level cell type value broadcast.

Figure 16:
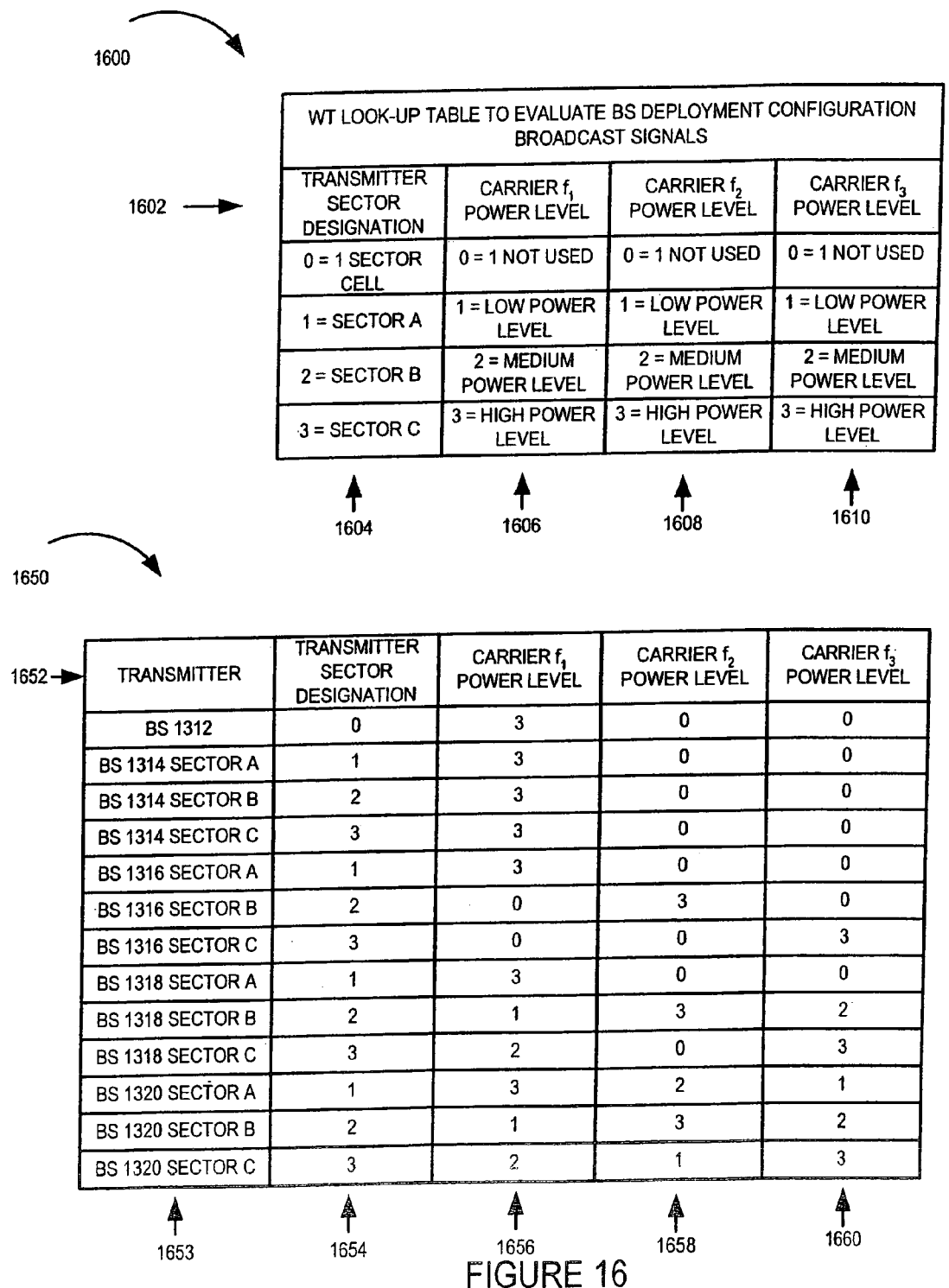
FIG. 16 includes a drawing of another exemplary look-up table that can be used by a wireless terminal to evaluate base station deployment configuration broadcast signals in an exemplary embodiment and a table including exemplary deployment configuration broadcast signal values.

FIG. 16 includes a drawing of another exemplary look-up table 1600 that can be used to evaluate base station deployment configuration broadcast signals in an exemplary embodiment. WTs 700 can store the information in table 1600 and use the information to process received broadcast signals, e.g., signal 1408, to determine the status of the corresponding BS transmitter and properly configure the WT. First row 1602 of table 1600 identifies that: first column 1604 includes information on the transmitter sector designation, (second, third, fourth) column (1606, 1608, 1610) includes information on the deployment level information on carrier ($f_1$, $f_2$, $f_3$) in terms of power level, respectively. A first field in broadcast message 1408 can include the transmitter sector designation, where: a value of 0 identifies a 1 sector cell that is not partitioned and which uses a single transmitter, a value of 1 identifies a sector A transmitter, a value of 2 identifies a sector B transmitter, and a value of 3 identifies a sector C transmitter. In this example, for the purposes of explanation, it is assumed that there are three distinct types carriers and three distinct power levels in the system, as shown in FIG. 13. The (second, third, fourth) field of message 1408 each includes a value used to determine the deployment level in terms of power level for the corresponding carrier, where a 0 value indicates that that carrier is not used, a value of 1 indicates the carrier is used at a low power level, a value of 2 indicates the carrier is used at an intermediate power level, a value of 3 indicates the carrier is used at a high power level. The WT uses the broadcast message 1408 to determine the base station sector transmitter deployment configuration.

FIG. 16 also includes table 1650 which illustrates exemplary message field information for broadcast messages from the various transmitters identified in exemplary system 1300. First row 1652 identifies titles for each column. First column 1653 identifies the transmitter of FIG. 1300; second column 1654 identifies the transmitter sector designation value broadcast; (third, fourth, fifth) column (1656, 1658, 1660) identifies the broadcast value corresponding to the power level of deployment for each of the ($f_1$, $f_2$, $f_3$) carrier as used by that BS sector transmitter.

FIG. 17 is a drawing 1700 illustrating an exemplary bandwidth partition into 3 frequency bands each corresponding to a different carrier in accordance with the present invention. FIG. 17 includes a horizontal axis 1701 illustrating frequency. The bandwidth is partitioned into (band 1 bandwidth 1708, band 2 bandwidth 1710, band 3 bandwidth 1712), each associated with a corresponding carrier frequency ($f_1$ 1702, $f_2$ 1704, $f_3$ 1706). The bandwidth in each band (1708, 1710, 1712) is partitioned into a set of tones, as illustrated by exemplary tone 1714. Tone spacing 1716, equal to the width of one tone, exists between each of the successive tones of any carrier. In the example of FIG. 17, each band has an equal number of tones, and there is no gap between the successive bands. In this example, the tone spacing, between the highest tone of band 1 1708 and the lowest tone of band 2 1710 is equal to a tone spacing of one; similarly the tone spacing between the highest tone of band 2 1710 and the lowest tone of band 3 1712 is equal to a tone spacing of one.

FIG. 18 is a drawing 1800 illustrating an exemplary bandwidth partition including 3 frequency bands each corresponding to a different carrier in accordance with the present invention. FIG. 18 includes a horizontal axis 1801 illustrating frequency. The bandwidth is partitioned to include (band 1 bandwidth 1808, band 2 bandwidth 1810, band 3 bandwidth 1812), each associated with a corresponding carrier frequency ($f_1$ 1802, $f_2$ 1804, $f_3$ 1806). The bandwidth in each band (1808, 1810, 1812) is partitioned into a set of tones, as illustrated by exemplary tone 1814. Tone spacing 1816 within each band, is equal to the width of one tone and exists between each of the successive tones in the band. In the example of FIG. 18, each band has an equal number of tones, and there is a band spacing gap 1818 between the successive bands which equals the tone spacing width 1816. In this example, the tone spacing between the highest tone of band 1 1808 and the lowest tone of band 2 1810 is equal to a tone spacing of two; similarly, the tone spacing between the highest tone of band 2 1810 and the lowest tone of band 3 1812 is equal to a tone spacing of two.

Figure 19:
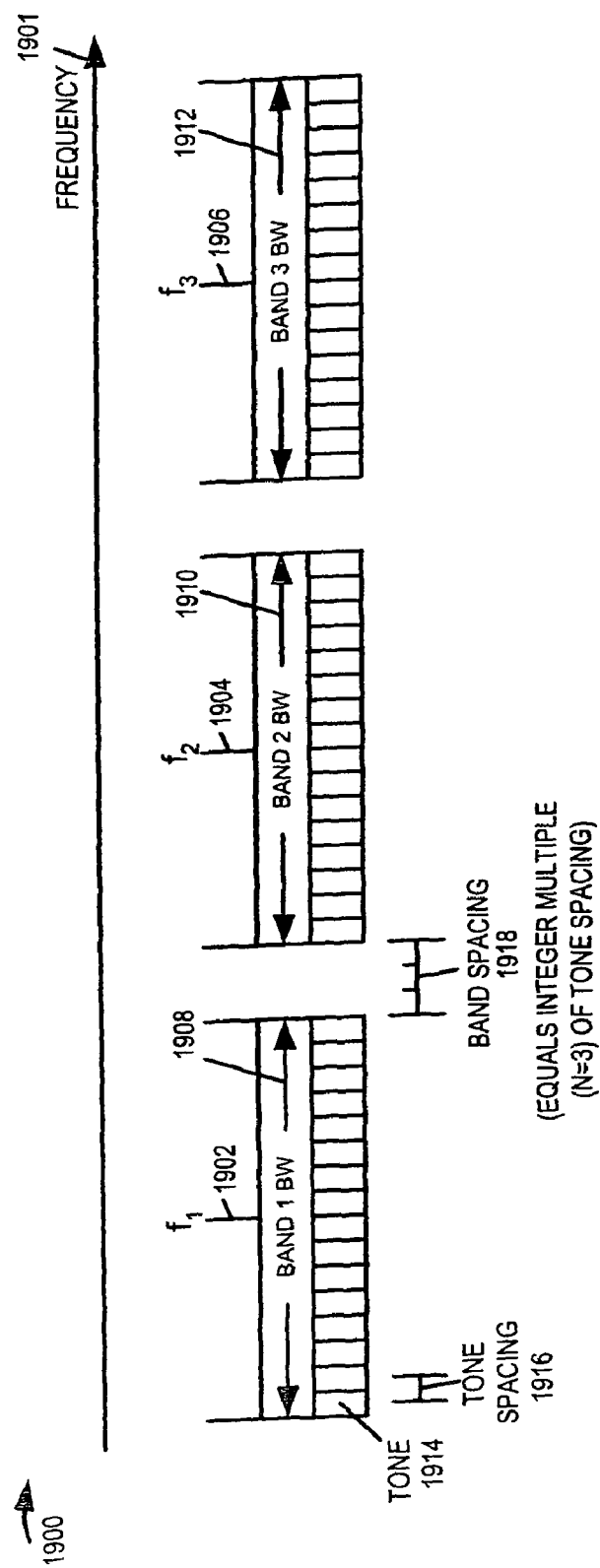
FIG. 19 is a drawing illustrating another exemplary bandwidth partition including 3 frequency bands each corresponding to a different carrier in accordance with the present invention.

FIG. 19 is a drawing 1900 illustrating an exemplary bandwidth partition including 3 frequency bands each corresponding to a different carrier in accordance with the present invention. FIG. 19 includes a horizontal axis 1901 illustrating frequency. The bandwidth is partitioned to include (band 1 bandwidth 1908, band 2 bandwidth 1910, band 3 bandwidth 1912), each associated with a corresponding carrier frequency ($f_1$ 1902, $f_2$ 1904, $f_3$ 1906). The bandwidth in each band (1908, 1910, 1912) is partitioned into a set of tones, as illustrated by exemplary tone 1914. Tone spacing 1916 within each band, is equal to the width of one tone and exists between each of the successive tones in the band. In the example of FIG. 19, each band has an equal number of tones, and there is a band spacing gap 1918 between the successive bands which equals three times the tone spacing width 1916. In various embodiments, the band spacing equals an integer multiple of the tone spacing 1916, e.g. 1 time, 2 times, 3 times, 4 times, etc., the tone spacing width. In this example, the tone spacing between the highest tone of band 1 1908 and the lowest tone of band 2 1910 is equal to a tone spacing of four times width 1916; similarly, the tone spacing between the highest tone of band 2 1910 and the lowest tone of band 3 1912 is equal to a tone spacing of four times width 1916.

Figure 20:
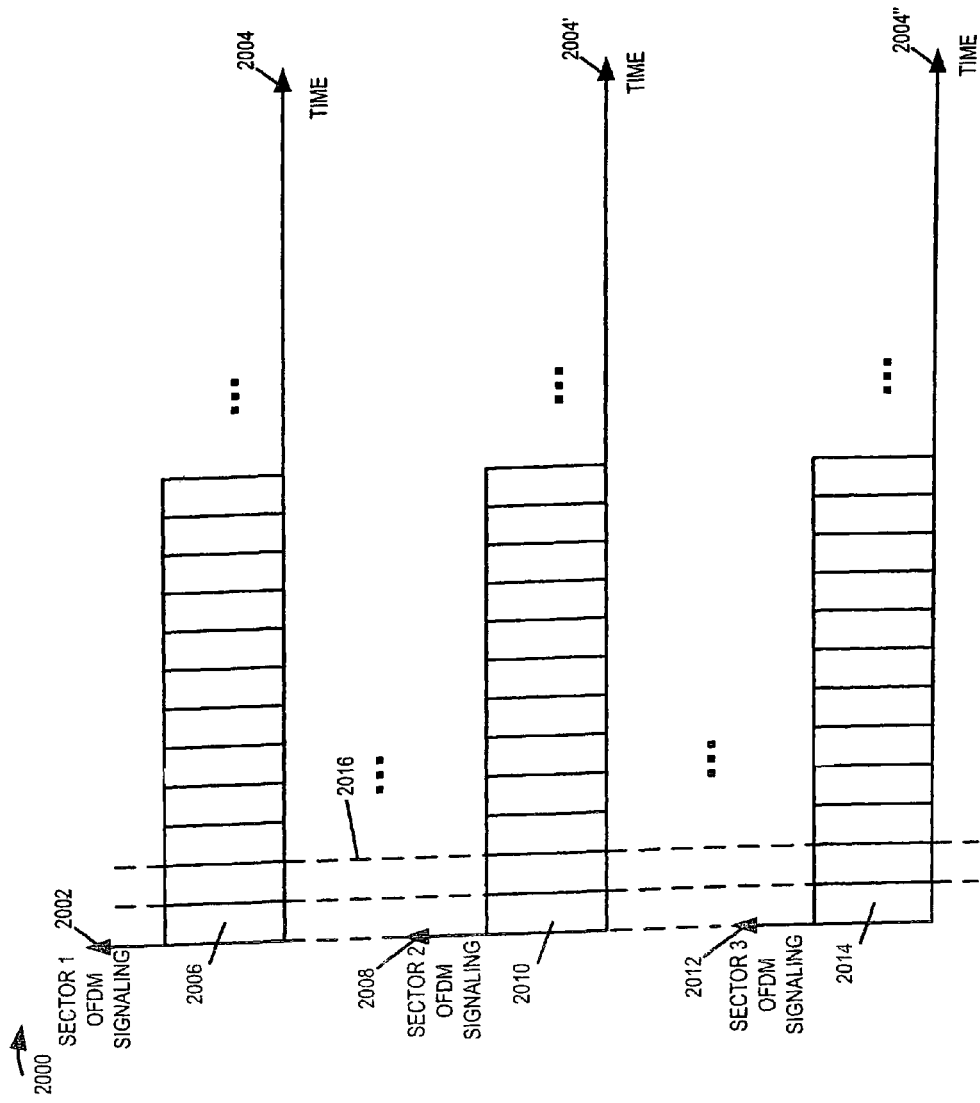
FIG. 20 is a drawing illustrating exemplary OFDM signaling, e.g., downlink signaling, within three sectors of the same cell which illustrates synchronization between sectors, in accordance with the present invention.

FIG. 20 is a drawing 2000 illustrating exemplary OFDM signaling, e.g., downlink signaling, within three sectors of the same cell. Vertical axis 2002 represents sector 1 OFDM signaling while horizontal axis 2004 represents time. Exemplary successive sector 1 OFDM signals are shown as successive rectangles 2006, each rectangle corresponding to an OFDM signaling during an OFDM symbol transmission time interval. Vertical axis 2010 represents sector 2 OFDM signaling while horizontal axis 2004' represents time. Exemplary successive sector 2 OFDM signals are shown as successive rectangles 2008, each rectangle corresponding to an OFDM signaling during an OFDM symbol transmission time interval. Vertical axis 2012 represents sector 3 OFDM signaling while horizontal axis 2004" represents time. Exemplary successive sector 3 OFDM signals are shown as successive rectangles 2014, each rectangle corresponding to an OFDM signaling during an OFDM symbol transmission time interval. The three time axes 2004, 2004' and 2004" are equivalent.

It can be observed in FIG. 20 that the OFDM symbol transmission time intervals are synchronized between the three sectors are shown by the alignment illustrated with dashed vertical lines 2016. In some embodiments, there may be fixed timing offsets between the various sectors, the fixed offsets predetermined and known to the base station and wireless terminals. In some embodiments, the offset is such that a beacon of one sector/carrier is offset by an integer number of OFDM symbol transmission time intervals from another beacon of another sector/carrier.

In many embodiments, in each sector of the same cell, OFDM symbols transmission time intervals are synchronized in symbol time among each of the carriers.

Figure 21:
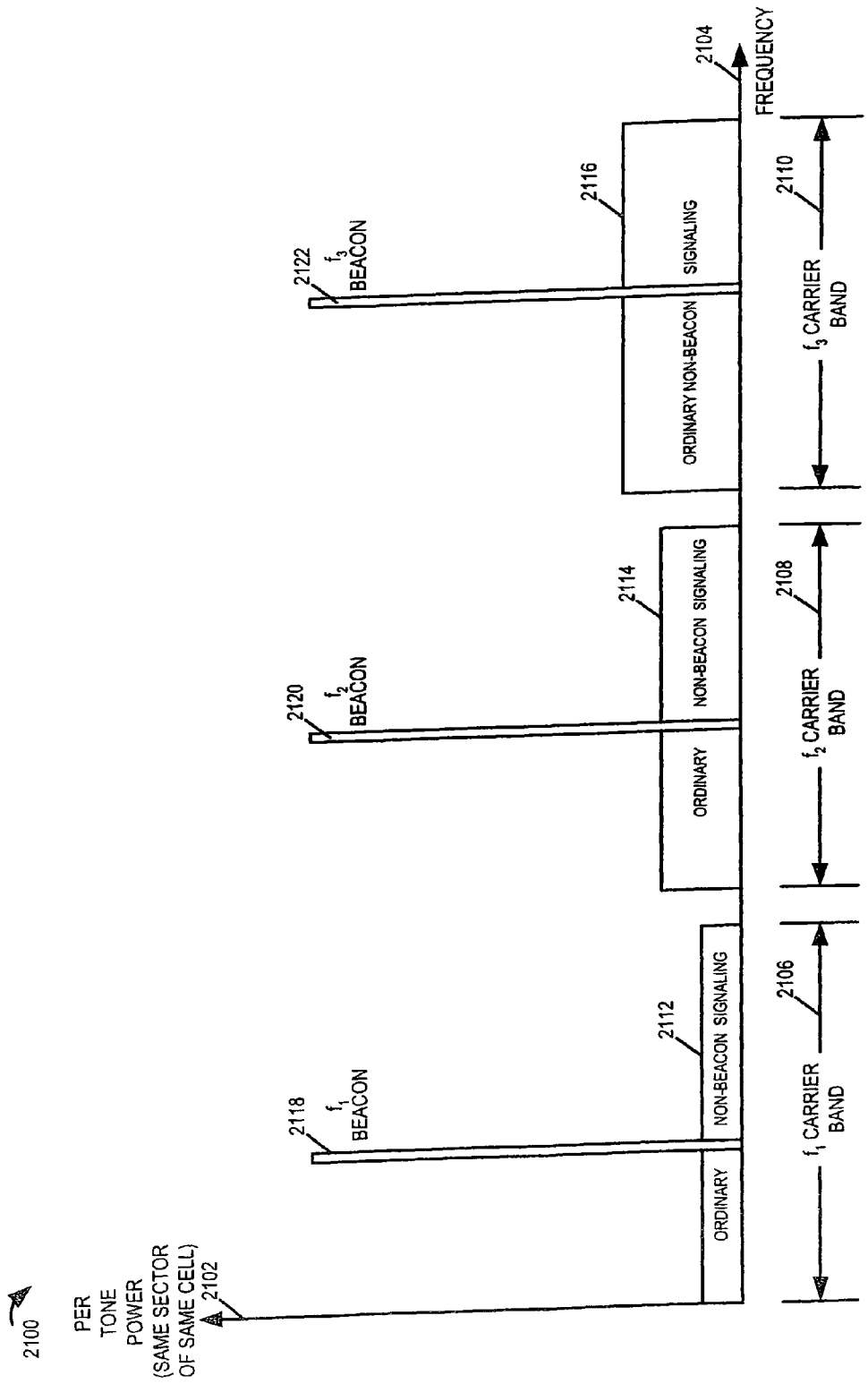
FIG. 21 is a drawing illustrating an exemplary embodiment of base station sector transmission power for different carriers used within the same sector of the same cell, in accordance with the present invention.

FIG. 21 is a drawing 2100 illustrating an exemplary embodiment of base station sector transmission power for different carriers used within the same sector of the same cell, in accordance with the present invention. Vertical axis 2102 represents per tone power (same sector of same cell) while horizontal axis 2104 represents frequency. Three frequency bands ($f_1$ carrier band 2106, $f_2$ carrier band 2108, $f_3$ carrier band 2110) are used. In the $f_1$ carrier band 2106 ordinary non-beacon signals 2112 are transmitted at a first power level, e.g., a low power level $P_L$, and an $f_1$ beacon 2118 is transmitted at a beacon power level $P_B$. In the $f_2$ carrier band 2108 ordinary non-beacon signals 2114 are transmitted at a second power level, e.g., an intermediate power level $P_I$, and an $f_2$ beacon 2120 is transmitted at a beacon power level $P_B$. In the $f_3$ carrier band 2110 ordinary non-beacon signals 2116 are transmitted at a third power level, e.g., a high power level $P_H$, and an $f_3$ beacon 2122 is transmitted at a beacon power level $P_B$.

In some embodiments, the beacons signals are transmitted at different times than the ordinary signaling. The beacons signals are transmitted relatively infrequently in comparison to the ordinary signaling. The ordinary signaling in different carrier bands is transmitted at different power levels, while the beacon signaling in the different carrier bands is transmitted at the same power level, in this exemplary embodiment. The power level of the beacon signal on a per tone basis is significantly, e.g., 20 times, higher than the per tone power of an ordinary signal.

Figure 22:
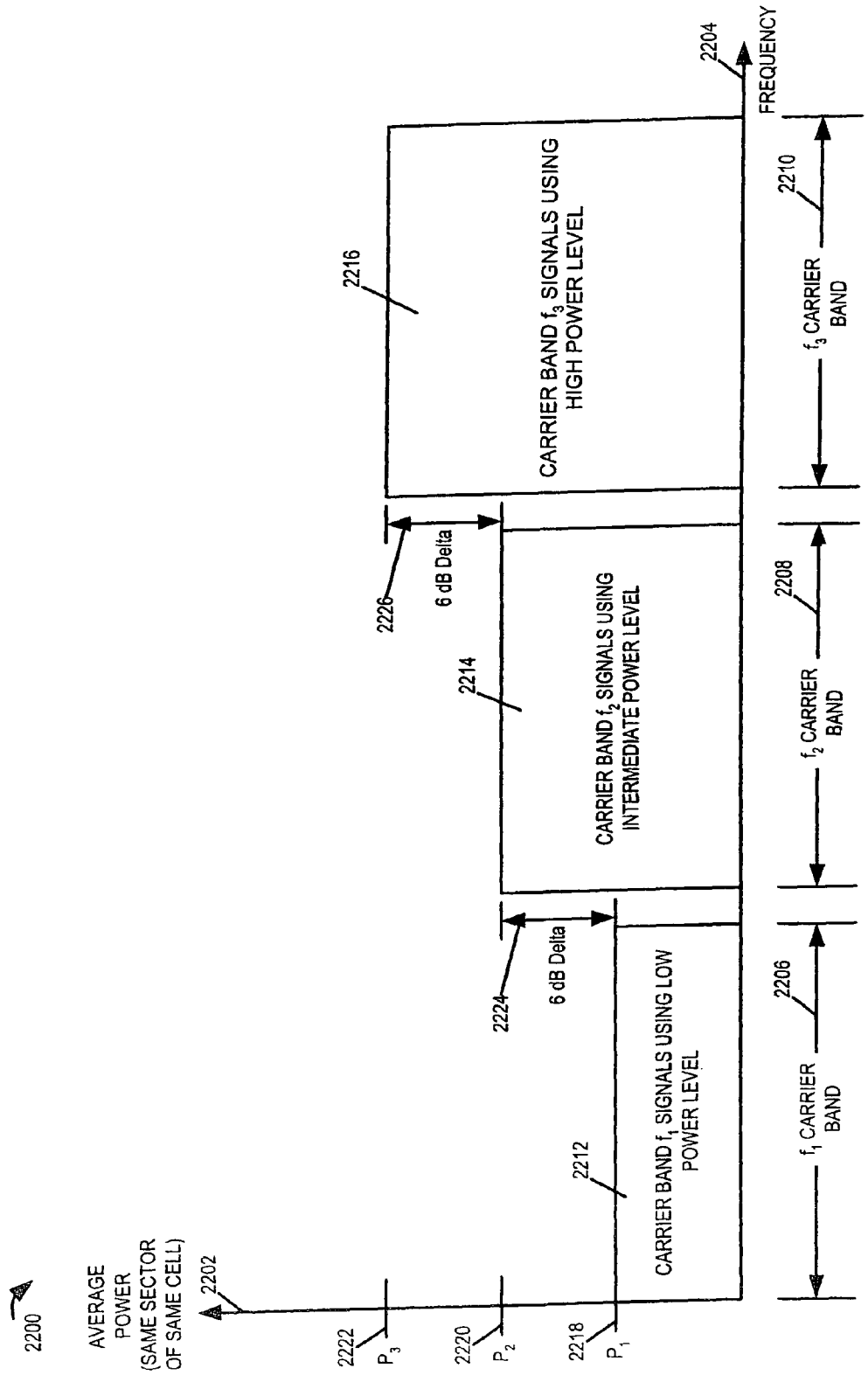
FIG. 22 is a drawing illustrating an exemplary embodiment of base station sector transmission power for different carriers used within the same sector of the same cell, in accordance with the present invention.

FIG. 22 is a drawing 2200 illustrating an exemplary embodiment of base station sector transmission power for different carriers used within the same sector of the same cell, in accordance with the present invention. Vertical axis 2202 represents average power while horizontal axis 2204 represents frequency. Three frequency bands ($f_1$ carrier band 2206, $f_2$ carrier band 2208, $f_3$ carrier band 2210) are used. Block 2212 represents carrier band $f_1$ signals using a low power level for non-beacon signals which are transmitted at average power level $P_1$ 2218. Block 2214 represents carrier band $f_2$ signals using an intermediate power level for non-beacon signals which are transmitted at average power level $P_2$ 2220. Block 2216 represents carrier band $f_3$ signals using a high power level for non-beacon signals which are transmitted at average power level $P_3$ 2222.

In the exemplary embodiment of FIG. 22, there is a 6 dB delta, i.e., power ratio, 2224 between power level $P_1$ 2218 and power level $P_2$ 2220; similarly, there is a 6 dB delta 2226 between power level $P_2$ 2220 and power level $P_3$ 2222.

FIG. 23 is an illustration of an exemplary WT stored look-up table (e.g., a detailed representation) that may be used by the WT to evaluate deployment level cell type information in an exemplary system such as the one in FIG. 13. Broadcast signals from base station transmitters may be received by the WT and processed, e.g., a received deployment cell type value obtained and compared to the table to look up and determine the corresponding cell and/or sector information. First row 2302 includes column header information, the first column identifying the deployment level cell type value and the second column including the corresponding information. In this example there are five distinct types of cells corresponding to the five type of cells shown in FIG. 13. In other embodiments, different numbers of cell types are possible. Second row 2304 corresponds to exemplary cell 1302 type; third row 2306 corresponds to cell 1304 type; fourth row 2308 corresponds to exemplary cell 1306 type; fifth row 2310 corresponds to exemplary cell 1308 type; sixth row 2312 corresponds to exemplary cell 1310 type. Each row of the stored table 2300 providing the WT with information to determine the transmitter configuration in the identified cell, e.g., in terms of which sectors use which power at what power levels.

Figure 25:
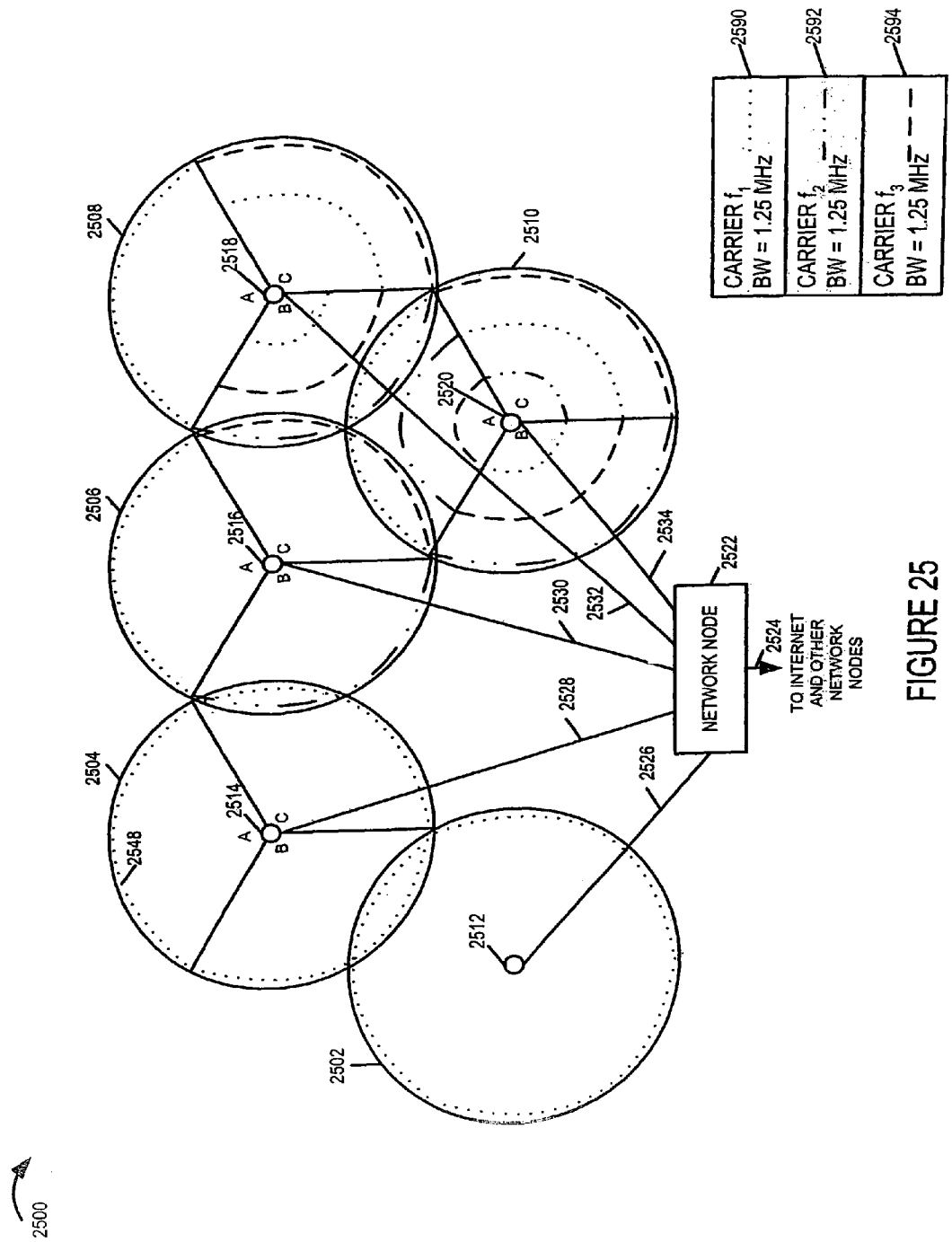
FIG. 25 is a drawing of an exemplary system, implemented in accordance with the present invention, illustrating that the exemplary base stations are connected by a network, e.g., a backhaul network.

FIG. 25 is a drawing of an exemplary system 2500, in accordance with the present invention, illustrating that the exemplary base stations are connected by a network, e.g., a backhaul network. The exemplary system 2500 includes cells (2502, 2504, 2506, 2508, 2510) each corresponding to an exemplary base station (2512, 2514, 2516, 2518, 2520), respectively. In exemplary system 2500 each base station (2512, 2514, 2516, 2518, 2520) is coupled via network link (2526, 2528, 2530, 2532, 2534), respectively, to network node 2522, e.g., a router. Network node 2522 couples the network node to the Internet and/or to other network nodes, e.g., other base station, AAA server, home agent nodes, etc. Network links (2526, 2528, 2530, 2532, 2534) may be, e.g., fiber optic cables. System 2500 also includes a plurality of WTs. Wireless terminals, e.g., WTs 700 such as MNs, may move throughout the system and establish wireless links with the base station sector attachments points using the available carriers.

Legends (2590, 2592, 2594) illustrate (carrier $f_1$, carrier $f_2$, and carrier $f_3$) as (dotted lines, dot/dash lines, and dashed lines), respectively. In each sector and/or cell, usage of a carrier is indicated by the presence of a type of line, and the relative strength is indicated by the distance of the line, e.g., radius, from the base station.

Figure 24B:
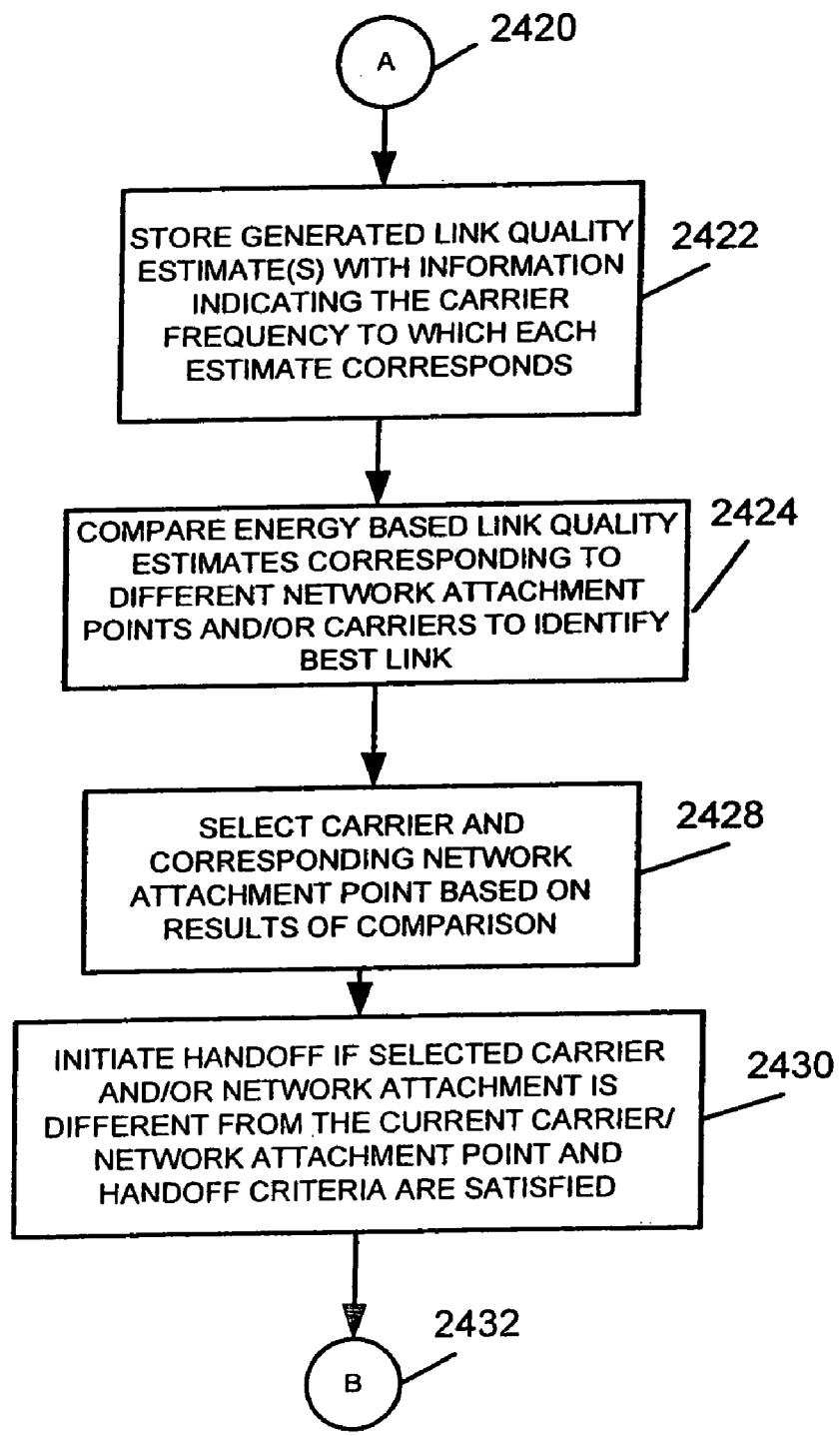
FIG. 24, which comprises the combination of FIGS. 24A and 24B, illustrates a method of operating a wireless terminal, e.g., mobile node, to select between carriers based on a received beacon signal and information about known downlink power transmission level relationships between carriers in a cell or sector.

FIG. 24, which comprises the combination of FIGS. 24A and 24B, illustrates an exemplary method of operating a wireless terminal, e.g., mobile node, to select between carriers based on a received beacon signal and information about known downlink power transmission level relationships between carriers in a cell or sector. Such a method is particularly well suited to applications where multiple carriers are used in a cell or sector and there is a fixed known power relationship, e.g., a power offset, between the transmission power used for the different carriers when transmitting signals in a downlink. A control module in the WT memory, when executed by a processor included in the WT, may cause a WT to perform the steps illustrated in FIG. 24. The method 2400 starts in step 2402 in which a WT is initialized, e.g., powered up and begins executing various control routines and begins to receive and process signals. e.g., OFDM signals. In step 2404, the WT receives a signal in a frequency band that was transmitted by a network attachment point of a base station, e.g., sector transmitter corresponding to a particular carrier frequency. The signal may correspond to, e.g., a single OFDM symbol transmission time period and may include a plurality of signal tones, each signal tone corresponding to a different frequency and being a different signal component. As discussed above, a high power narrowband signal, e.g., a beacon signal, is periodically transmitted in the downlink for each carrier frequency using a known power level which may be the same for the different carriers used in a cell or sector. In addition, in various embodiments the base station transmits cell and/or sector type information which can be used by a wireless terminal to determine the cell configuration and/or carrier frequencies available.

Operation proceeds from signal receive step 2404 to step 2406 wherein a time to frequency signal conversion operation is performed using, e.g., an FFT or DFT. This produces a plurality of signal components corresponding to different frequencies, e.g., one signal component per tone used in the system within the frequency band corresponding to the received signal. Operation proceeds from step 2406 to step 2408 where an estimate of the per signal component, e.g., per tone, signal energy is made. This may be done any one of a plurality of known energy measurement techniques being applied to the particular signal tone whose energy is being measured in step 2408. The per signal component, e.g., per tone, signal energy is compared to a threshold in step 2410 to determine if the component corresponds to a beacon signal. Since beacon signals are transmitted at 5, 10 or 20 times more than the power level of user data, e.g., text, video or voice, the beacon signal component is easy to identify. The threshold may be several times the average per tone energy level used to communicate non-beacon signals in the system. If components which do not exceed the threshold, e.g., for user data and/or other types of control information transmitted using non-beacon signals, operation proceeds from step 2422. In step 2422 the received signal component is processed to recover the information communicated on the received tone. The information may be, e.g., user data or, in some cases, cell type and/or sector type information. Cell type and/or sector type information is further processed in step 2424 when recovered in step 2422.

If a signal component is determined to correspond to a received beacon signal in step 2410, operation proceeds to steps 2414 and 2412 which can be performed in parallel. In step 2414 the frequency of the received beacon signal component, e.g., beacon tone, is determined. Then, in step 2416, based on the frequency of the received beacon signal and, in some cases information about previously received beacon signals, information conveyed by the beacon signal, e.g., a cell type, sector type, and/or a carrier frequency to which the beacon signal corresponds. The determined information is supplied to step 2424. In step 2424, the cell type and/or sector type information, corresponding to the network point of attachment from which the beacon signal being processed was received, is used to access stored cell and/or sector information and to retrieve information on the available carriers in the sector and/or cell corresponding to a received beacon signal. In step 2424 information on the relative power levels at which signals are transmitted on different carriers in the cell from which the beacon signal was received is also retrieved. The retrieved information is supplied to step 2418.

In step 2412 which can be performed in parallel with step 2414, a link quality estimate is generated based on the energy of the received beacon signal component. (For example, Qual link carrier 1=energy of beacon signal component corresponding to carrier 1.) The link quality estimate may be a simple measure of the energy that was received in the beacon tone, e.g., in some embodiments it is the value generated in energy estimation step 2408. The link quality estimate value, e.g., measured energy value, is supplied to step 2418 where it is used in combination with the information obtained from step 2424.

In step 2418, link quality estimates are generated for one or more other carriers which can be used to establish a communications connection in the sector or cell from which the received and detected beacon signal component originated. The estimates for the other carriers are generated using the known power relationship between carrier signals in the sector or cell. For example, a link quality estimate for a second carrier can be generated from a link quality estimate corresponding to a first carrier by multiplying the estimate by the ratio of the second carrier power level to the first carrier power level (e.g., Qual of link carrier 2=Qual link carrier 1 times (P2/P1) ). Similarly, a link quality for a link which can be established using a third downlink carrier may be generated from the known power relationship and link quality estimate of the first carrier by multiplying the first link quality estimate by the power level of the third carrier to the first carrier (e.g., Qual link carrier 3=Q link carrier 1 times (P3/P1) ).

Once the link strength between the wireless terminal and each detected base station sector transmitter is measured or derived, the wireless terminal can project the signal-to-interference ratio (SIR) for each carrier. In one embodiment, the handoff decision is a function of the projected SIR of each of the carriers.

Operation proceeds from step 2418 via connecting node A 2420 to step 2422, In step 2422 the generated link quality estimates(s) are stored along with carrier frequency and/or cell and sector information used to indicate the network attachment point to which the individual link quality estimates correspond. From step 2422 operation proceeds to step 2424 where the energy based link quality estimates corresponding to different network attachment points and/or carriers are compared to identify the best link. Operation then proceeds to step 2428 where a carrier and/or network attachment point is selected based on the link quality estimates generated from one or more received beacon signals, e.g., the link which has the highest quality value is selected. Operation then proceeds to step 2430 where a handoff is initiated to the network attachment point corresponding to the selected link if the network attachment point is different from the one being used and various handoff criteria are satisfied, e.g., the new link quality exceeds the current link quality by a particular amount.

If a handoff to a new network attachment point is initiated in step 2430, the receiver will adjust its transmission power level as a function of the power difference between the currently used downlink carrier signal and the power level of carrier signal used by the new network attachment point. This may involve adjusting a received target power level used by the mobile to compute the transmission power to be used. Thus, in such embodiments, the mobile will change its uplink power level to reflect the expect change in the downlink power level, e.g., the change resulting from switching to a new network attachment point.

In step 2430, no handoff is initiated if the selected carrier and corresponding network attachment point is the same as that currently being used by the WT or if the handoff criteria are not satisfied. Operation proceeds from step 2430 to step 2404 via connecting node B 2432. Thus, the evaluation of the link quality and the reception of information will be performed on an ongoing basis.

Figure 26B:
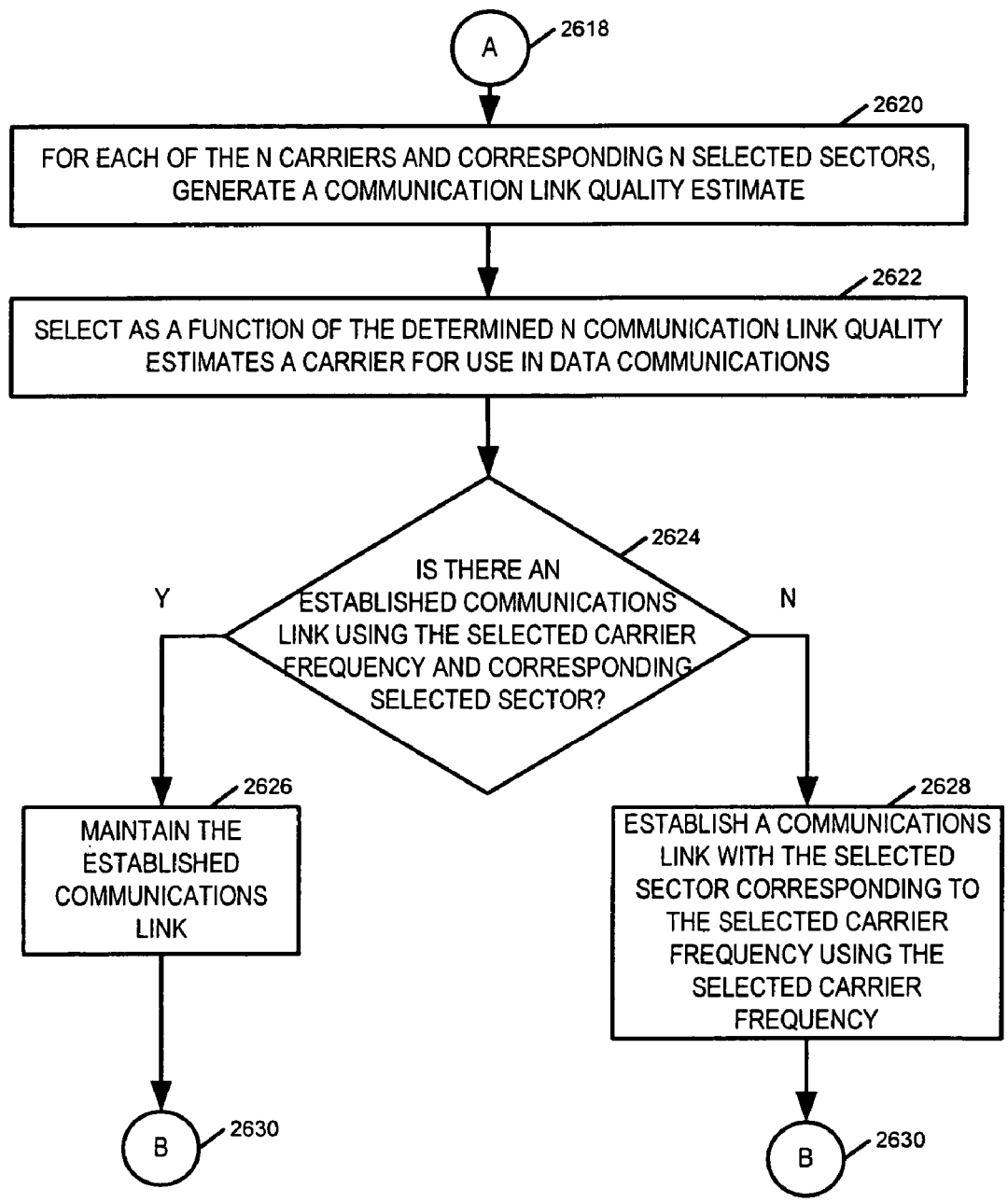
FIG. 26, which comprises the combination of FIGS. 26A and 26B, illustrates a method of operating a communications device to select a communications link from among a plurality of possible links with at least two different sectors corresponding to one or more base stations as a function of at least two received measurement signals, e.g., beacon signals.

FIG. 26, which comprises the combination of FIGS. 26A and 26B, illustrates the steps of a method of operating an exemplary communications device to select a communications link from among a plurality of possible links with at least two different sectors corresponding to one or more base stations as a function of at least two received measurement signals, e.g., beacon signals. The exemplary communications device may be a wireless terminal such as, e.g., a mobile node. The exemplary communications device is in a system, e.g., an OFDM multiple access wireless communications system, including first and second sectors, each of the first and second sectors using at least N carrier frequencies, the N carrier frequencies being the same in the first and second sectors, where N is an integer greater than one, a different frequency band being associated with each of the different carrier frequencies. In some embodiments N is equal to three. In some embodiments, each cell in the system includes three sectors. In one such embodiment, each of said first and second sectors may correspond to first and second cells, respectively. In systems using multiple sectors per cell, each of said first and second sectors may correspond to different, e.g., adjacent, sectors within the same cell or may correspond to different sectors in different, e.g., adjacent, cells. Each sector may transmit one or more measurement signals, e.g., beacon signals having a known power relationship to the power levels used to transmit user data on one or more carriers in the sector from which the measurement signal is transmitted. Operation starts in step 2602 where the communications device is powered on and initialized. Operation proceeds from start step 2602 to optional step 2604.

In optional step 2604, when performed, the communications device receives predetermined power relationship information from a base station over a wireless communications link. In some embodiments, the communications device has predetermined power relationship information stored in its memory, e.g., as part of a software version load including system parameters, and does not receive predetermined power relationship information over the airlink and thus skips step 2604. In other embodiments, the communications device performs step 2604 on a regular or occasional basis. For example, the communications device may receive predetermined power relationship information as part of an initialization process or may receive predetermined power relationship information when changes occur in the power relationships in the system. In some embodiments, including three carriers, the power relationship between each of the three carriers is the same in each of the cells of the system. In some embodiments, a known fixed power relationship exists, and in said known fixed power relationship the set of the power ratios of the power levels used to transmit user data and the power level used to transmit the measurement signal is: fixed, the same in the first and the second sectors, and known to said communications device. In some embodiments, predetermined measurement signal power relationship to user data transmitted on at least one of the N carriers in the first sector is known to indicate that zero power is used to transmit user data on said at least one of the N carriers in the first sector, for example, some of the N carriers may not be used to transmit user data, e.g., speech or text data, in a sector.

Operation proceeds from step 2604 to step 2606. In step 2606, the communications device is operated to receive first and second measurement signals within a frequency band corresponding to a single one of the N carrier frequencies, said first measurement signal having been transmitted at a first predetermined power level having a known fixed power relationship to power level used to transmit user data in the first sector using each of the N carrier frequencies, said second measurement signal having been transmitted at a second power level having a predetermined fixed power relationship to power levels used to transmit user data in the second sector user each of the N carrier frequencies. In some embodiments, the first and second measurement signals are beacon signals transmitted by the first and second sectors, respectively. Operation proceeds from step 2606 to step 2608 and step 2610.

In step 2608, the communications device is operated to measure the received power of the first measurement signal. In step 2610, the communications device is operated to measure the received power of the second measurement signal. Operation proceeds from step 2608 to step 2612, and from step 2610 to step 2614.

In step 2612, the communications device is operated to estimate from the measured received power of the first measurement signal, for each of N carriers in the first sector, an estimated received data power level for data transmitted using one of the N carriers used in the first sector to thereby generate a first set of N data signal power estimates corresponding to the first sector, each of the N data signal power estimates corresponding to a different one of the N carrier signals used in the first sector. In step 2614, the communications device is operated to estimate from the measured received power of the second measurement signal, for each of N carriers in the second sector, an estimated received data power level for data transmitted using one of the N carriers used in the second sector to thereby generate a second set of N data signal power estimates corresponding to the second sector, each of the N data signal power estimates corresponding to a different one of the N carrier signals used in the second sector. Operation proceeds from steps 2612 and 2614 to step 2616.

In step 2616, for each of the N carriers, the communications device is operated to select as a function of the estimated data signal power estimates included in the first and second sets of N data signal power estimates a corresponding sector. In some embodiments, for each of the N carriers, said selected corresponding sector has the highest estimated received power level. Operation proceeds from step 2616 via connecting node A 2618 to step 2620.

In step 2620, for each of the N carriers and corresponding N selected sectors, the communications device is operated to generate a communications link quality estimate. In some embodiments, the communications link quality estimate is a signal to interference estimate, e.g., an estimated signal to interference ratio. In some embodiments, generating the signal to interference estimate corresponding to a carrier frequency includes taking a ratio of the estimated received data signal power levels. Operation proceeds from step 2620 to step 2622. In step 2622, the communications device is operated to select as a function of the determined N communication link quality estimates a carrier for use in data communications. In some embodiments, the selection of step 2622 includes policy management decisions which include other considerations, e.g., system loading considerations, in addition to communication link quality estimate information. However, in some implementations, the selection can simply involve selecting the carrier having the best link quality estimate. Operation proceeds from step 2622 to step 2624.

In step 2624, the communications device is operated to check if there is an established communications link using the selected carrier frequency and corresponding selected sector. If there is an established link using the selected carrier frequency and corresponding selected sector, then operation proceeds to step 2626; otherwise operation proceeds to step 2628. In step 2626, the communications device is operated to maintain the established communications link. In step 2628, the communications device is operated to establish a communications link with the selected sector corresponding to the selected carrier frequency using the selected carrier frequency. Operation proceeds from step 2626 or step 2628 via connecting node B 2630 to step 2606, where additional first and second measurement signals are received. Thus, the link selection process may repeat while the mobile device stays active. In the above described manner, based on received measurement signals, e.g., beacon signals, and known power relationship information to power levels used to transmit user data in a sector from which a beacon signal is transmitted, a mobile can evaluate the quality of multiple possible communications links with each of multiple sectors and select one having the desired and/or best quality based on as little as two measurement signals, e.g., beacons signals received from different sectors.

Numerous variations on the above described methods and apparatus are possible. Some exemplary apparatus and methods will be described using numbered combinations to help provide examples of how various elements and/or steps can be combined in accordance with the invention.

In a first exemplary embodiment identified by the numeral system (1) in this example, is direct to a communications system, comprising: a plurality of multi-sector cells, including a first multi-sector cell and a second multi-sector cell, each multi-sector cell including a plurality of sectors, said first and second multi-sector cells being physically adjacent cells, wherein said first multi-sector cell includes a base station that uses a single carrier frequency in each of a plurality of different sectors of said first cell, a first carrier frequency being used in a first sector of said first cell and a second carrier being used in a second sector of said first multi-sector cell, the first and second carrier frequencies being different; and wherein said second multi-sector cell includes a second base station that uses said first and second carrier frequencies in a first sector of said second multi-sector cell. Exemplary system (1) may further include a communications link between said first and second base stations, said communications link being a link implemented using at least one of a fiber optic cable and a metal cable. In exemplary system (1) the plurality of multi-sector cells further can include a third multi-sector cell, said third multi-sector cell including a base station which uses at least said first and second carrier frequencies in each of the sectors of said third cell which results an exemplary embodiment (s). In the exemplary embodiment (3) the base station of said third multi-sector cell further uses a third carrier frequency in each of said sectors of said third multi-sector cell; and wherein a first frequency band is associated with said first carrier frequency, a second frequency band is associated with said second carrier frequency and a third frequency band is associated with the third carrier frequency, the first, second and third frequency bands being non-overlapping frequency bands. Also in exemplary embodiment (3) the base station of said third multi-sector cell can use a third carrier frequency in each of said sectors of said third multi-sector cell; and a first frequency band can be associated with and includes said first carrier frequency, a second frequency band can be associated with and includes said second carrier frequency, and a third frequency band can be associated with and includes the third carrier frequency, the first, second and third frequency bands being non-overlapping frequency bands of the same size and including a plurality of uniformly spaced tones used to transmit symbols, the first and second frequency bands being separated by an integer multiple of the tone spacing within the first and second frequency bands. Such an embodiment will be labeled embodiment (5). In embodiment (5) the integer multiple of the tone spacing can be less than 10. In some versions of embodiment (3) the integer multiple of the tone spacing is 1, said first and second frequency bands being separated by the spacing between a single pair of adjacent tones in said first frequency band. In some versions of embodiment (5) said integer multiple is 0, said first, second and third frequency bands being contiguous frequency bands. In some other versions of embodiment (3) each of said first, second, and third frequency bands have a bandwidth which is 2 MHz or less and wherein the total bandwidth occupied by said 3 bands is at most 6 MHz. One such embodiment will be referred to as embodiment (9).

In still other versions of embodiment (3) one carrier in a sector of a cell is transmitted at a different power level from another carrier transmitted in a sector. Once such embodiment will be referred to as embodiment (10). In one version of embodiment (10), each carrier in a sector of a cell is transmitted at a different power level from any other carrier transmitted in a sector. Such an embodiment will be referred to as embodiment (11). In some versions of embodiment (11) a fixed average power difference is maintained between carrier signals transmitted within a sector. Such an embodiment will be referred to as embodiment (12). In one version of embodiment (12) the average power difference is at least 3 dB. In another version of embodiment (12) different power levels are used for the same carrier frequency in adjacent sectors of a cell that transmits multiple carrier frequencies in each sector such that no two sectors within a cell use the same power level for the same carrier frequency.

In one version of embodiment (9) each base station includes means for controlling each sector transmitter to periodically transmit a narrowband signal at a high power level on each carrier used for downlink signals in the sector into which the sector transmitter transmits, said narrowband signal including a signal transmitted over a tone with tone power being at least 20 times the average power tone transmission power in each carrier. Such an embodiment will be referred to as embodiment (15).

In some versions of embodiment (15) the high power narrowband signal is a beacon signal, beacon signals corresponding to different carriers transmitted by a sector transmitter being transmitted at predetermined known power levels. Such an embodiment will be referred to as embodiment (16). In some versions of embodiment (16) beacon signals transmitted by a transmitter are transmitted at the same power level for all carriers within a sector. Such an embodiment will be referred to as embodiment (17).

In some versions of embodiment (3) each multi-sector cell in said communications system includes three sectors. In some versions of embodiment (1) each carrier frequency has a bandwidth of at least 1 MHz associated with the carrier frequency; and each cell uses a total bandwidth of approximately 5 MHz. Such an exemplary embodiment will be referred to as embodiment (19). In one version of embodiment (19) each carrier frequency has a bandwidth of less than 2 MHz associated with the carrier frequency.

In some versions of embodiment (3) each carrier in the first cell is transmitted using approximately the same power.

In some versions of embodiment (19) each carrier transmitted in said first sector of said second cell which uses said at least two carrier frequencies transmits said carrier frequencies at different power levels. Once such embodiment is referred to as embodiment (21). In some versions of embodiment (21) said power level difference is at least 3 dB.

In some versions of embodiment (17) the base station in each cell includes at least one sector transmitter for each sector of the cell, each sector transmitter transmitting OFDM signals into the sector to which the sector transmitter corresponds using one or more carrier frequencies used in the sector into which the transmitter transmits the OFDM signals.

In some versions of embodiment (3) the system further includes a single sector cell located adjacent at least one of said first, second and third cells, the single sector cell including a fourth base station which is coupled to said first and second base stations and which uses a single carrier frequency to transmit signals, said single carrier frequency being said first frequency. In other versions of embodiment (3) the system includes a fourth multi sector cell located adjacent at least one of said first, second and third cells, the fourth cell including a fourth base station which is coupled to said first and second base stations and which uses a single carrier frequency to transmit signals in each sector of the fourth cell, said single carrier frequency being said first frequency.

Another embodiment of a system implementing the present invention will now be described. This exemplary embodiment will be referred to as embodiment 27. Embodiment 27 is directed to a communication system including a first cell including a first base station which transmits into first, second and third sectors of said first cell, a single but different carrier frequency being used by said first base station to transmit into each of said first, second and third sectors, a first, a second and a third carrier frequency being used said first, second and third sectors, respectively, to transmit information, the first, second and third carrier frequencies being different; and a second cell located adjacent said first cell, said second cell including a second base station that is coupled to said first base station, the second cell including fourth and fifth, and sixth sectors, said second base station using the first carrier frequency being in each of said fourth, fifth, and sixth sectors. In some versions of embodiment (27) the second base station transmits signals using the first carrier frequency in each of the fourth, fifth and sixth sectors using different average power levels in each of said sectors. Such an embodiment will be referred to as embodiment (28). In some implementations of embodiment (28) the second base station transmits signals using a second carrier frequency which is different from said first carrier frequency in each of the fourth, fifth and sixth sectors using different average power levels in each of said sectors for signals transmitted using said second carrier frequency. Once such embodiment will be referred to as embodiment (29). In some versions of embodiment (29), known as embodiment (30), the second base station transmits signals using a third carrier frequency which is different from said first and second carrier frequencies in each of the fourth, fifth and sixth sectors using different average power levels in each of said sectors for signals transmitted using said third carrier frequency. In one version of embodiment (30) which will be referred to as embodiment (31) a first frequency band is associated with and includes said first carrier frequency, a second frequency band is associated with and includes said second carrier frequency, and a third frequency band is associated with and includes the third carrier frequency, the first, second and third frequency bands being non-overlapping frequency bands of the same size.

In at least one version of embodiment (31) referred to as embodiment (32) each of the first, second and third frequency bands is at least 1 MHz wide but not more than 2 MHz wide. In at least one version of embodiment (32) the second cell transmits the second carrier frequency in each of the fourth, fifth, and sixth sectors using different power levels in each of said sectors.

In one version of embodiment (28), known as embodiment (34) the second cell transmits the third carrier frequency in each of at least two of the fourth, fifth, and sixth sectors using different power levels in each of said sectors. In one version of embodiment (34) the difference in the power levels (P1>P2>P3) of the three different power levels used to transmit different carriers in each sector of the second cell is the same despite different carriers being associated with different power levels in each sector.

Still another exemplary embodiment, referred to as embodiment (36) is directed to a system which includes a plurality of cells, each cell including a plurality of sectors, said plurality of cells including a first cell, a second cell, and a third cell which are physically adjacent to one another; wherein a first set of cells in said plurality of cells uses a first number of carrier frequencies in each sector, and a second set of cells in said plurality of cells uses a different number of carries per sector, said different number being greater than one, said cells in the second set of cells using multiple carrier frequencies per sector.

In one version of system embodiment (36) referred to as embodiment (37) each sector of a cell which transmits the multiple carriers within the cell using different power levels. In one such embodiment, each cell includes three sectors and where said different number is three.

In one exemplary implementation of the system described as embodiment (36), the system is an OFDM communications system and wherein said number of carriers used by cells in said first set is one. Such an embodiment will be referred to as embodiment (39).

In one version of embodiment (39) a third set of cells in said plurality of cells uses a third number of carrier frequencies in each sector, said third number being two. Such an embodiment is referred to as embodiment (40). In one such embodiment at most 3 different carrier frequencies are used in the system.

In still another exemplary communication system embodiment, referred to as embodiment 42, the exemplary communication system includes a plurality of cells, each cell including three sectors, each of the three sectors using the same set of three different carrier frequencies to transmit signals, the set of three different carrier frequencies including a first carrier frequency, a second carrier frequency and a third carrier frequency, each sector in an individual cell transmitting signals using the first carrier frequency at different average power levels, each sector in the individual cell also transmitting signals using the second carrier frequency at different average power levels, each sector in the individual cell also transmitting signals using the third carrier frequency at different average power levels such that different average power levels are used for each of the first, second and third carriers in each sector of each individual cell, said average power level corresponding to a time period including multiple symbol transmission time periods.

In one version of embodiment (42), referred to as embodiment (43), each of a plurality of at least three adjacent cells using the same power levels for the first, second and third carriers in sectors oriented in the same direction, different power levels being used in different sectors of a cell for each carrier. In one such embodiment, referred to as embodiment (44), a first frequency band is associated with and includes said first carrier frequency, a second frequency band is associated with and includes said second carrier frequency, and a third frequency band is associated with and includes the third carrier frequency, the first, second and third frequency bands being non-overlapping frequency bands of the same size. In one version of embodiment (44) each of said first, second and third frequency bands is at least 1 MHz wide but not more than 2 MHz wide.

In one version of embodiment (42) referred to as embodiment (46), each of said frequency bands includes a plurality of uniformly spaced tones, the spacing between the first and second frequency bands being an integer multiple of the spacing between tones within said first frequency band. In another version of embodiment (42) the first, second and third frequency bands are contiguous frequency bands, there being no unused gap between the tones of the first and second frequency bands.

In at least one version of embodiment (46) the system is an OFDM communications system and wherein the total bandwidth occupied by said first, second and third frequency bands is no more than 5 MHz.

A few exemplary methods will now be described with reference to numbered method embodiments. In one exemplary method embodiment, referred to as method embodiment (1) the method is directed to operating a communications system including a plurality of cells, each cell including a base station coupled to the base station included in another cell, the system including a plurality of different types of cells including a first type cell including a first number of sectors and using a first number of carriers, and a second type cell using a second number of sectors and a second number of carriers, either the first number of sectors being different from the second number of sectors or the second number of carriers being-different from the first number of carriers, where method embodiment (1) includes operating the base station included in each of a plurality of cells in said system to periodically broadcast cell type information, said cell type information being sufficient for a mobile node to determine from the transmitted cell type information the number of sectors and the number of carriers used in the cell from which the cell type information was broadcast.

In one version of method embodiment (1) referred to as method embodiment (2), the cell type information is a cell type identifier, said cell type identifier corresponding to one of a plurality of at least three different cell type identifiers, said three different cell type identifiers including a first cell type identifier, the first cell type identifier corresponding to a cell including three sectors, each sector using the same carrier frequency and a second cell type identifier, the second cell type identifier corresponding to a cell including three sectors, each sector using a different carrier frequency.

In one version of method embodiment (2) referred to as method embodiment (3) said plurality of different cell type identifiers further includes a third cell type identifier, the third cell type identifier corresponding to a cell including three sectors and using three different carrier frequencies in each of said three different cells. In at least some versions of method embodiment (3) the plurality of different cell type identifiers further includes a fourth cell type identifier, the fourth cell type identifier corresponding to a cell including one sector and using a single carrier frequency.

In one particular version of method embodiment (3) referred to as method embodiment (5) the method includes, operating base stations in multiple cells of the same type to transmit the same cell type identifier. In one version of method embodiment (5), referred to as method embodiment (6) the method includes operating at least two base stations located in cells of the first type to periodically transmit said first cell type identifier. In one such embodiment, the method includes operating at least two base stations located in cells of the second type to periodically transmit said second cell type identifier.

In one version of method embodiment (1) referred to as method embodiment (8), the cell type information is a cell type identifier, said cell type identifier corresponding to one of a plurality of at least three different cell type identifiers, said three different cell type identifiers including a third cell type identifier, the third cell type identifier corresponding to a cell including three sectors and using three different carrier frequencies in each of said three different cells, and the method further includes the step of operating sector transmitters corresponding to different sectors of a cell of the third type to each use a different average transmission power level for each of the first, second and third carrier signals.

In one version of method embodiment (8) the method includes operating sector transmitters corresponding to sectors of a cell of the third type to periodically transmit a narrow band high power signal into each of three different frequency bands corresponding to each of the three different carriers used by said a cell of the third type, said narrow band high power signals being transmitted at predetermined frequencies. Such an embodiment is referred to as method embodiment (9). In one such embodiment each of the narrow band signals is a single tone signal. In another version of method embodiment (9) the narrow band signal transmitted by a sector transmitter is transmitted into the sector with the same power level for each of the three different carrier signals.

Another exemplary set of method embodiments is directed to a method of operating a mobile node. One exemplary method embodiment, referred to as method embodiment (12) is a method of operating a mobile communications device in a system which uses multiple carrier frequencies, where the method includes receiving a first beacon signal corresponding to a first carrier frequency of a first sector of a first cell; measuring the energy in the received first beacon signal to generate an estimate of the quality of a first communications link that can be established to a first network attachment point corresponding to the first carrier frequency in the first sector of the first cell; and estimating the quality of a communications link that can be established to a second network attachment point in said first sector of said first cell corresponding to a second carrier frequency, which is different from the first carrier frequency, based on the energy measured in the first received beacon signal and known information about a fixed power difference between the transmission power level of signals transmitted in said first sector using the first and second carrier frequencies. In one version of method embodiment (12) selecting between the first and second carrier frequencies as a function of an estimate of the quality of the first communications link and the second communications link.

In another version of method embodiment 12, referred to as method embodiment 14, the method further includes: receiving a second beacon signal transmitted by a network attachment point of a second sector, the second beacon signal corresponding to a third carrier frequency used by said second sector and measuring the energy in the received second beacon signal to generate an estimate of the quality of a third communications link that can be established to a third network attachment point corresponding to the third carrier frequency in the second sector.

In one version of method embodiment 14, the method further includes estimating the quality of a communications link that can be established to a fourth network attachment point in said second sector corresponding to a fourth carrier frequency, which is different from the third carrier frequency, based on the energy measured in the second received beacon signal and known information about a fixed power difference between the transmission power level of signals transmitted in said second sector using the third and fourth carrier frequencies. This embodiment is referred to as method embodiment (15).

In one version of method embodiment 15, referred to as method embodiment (16) the method further includes selecting one of the first, second, third, and fourth carrier frequencies and establishing a communications link with the corresponding one of the first, second, third, and fourth network attachment points, as a function of an estimate of the quality of the first, second, third, and fourth communications links. In one version of such an embodiment, at least one of the first and second carrier frequencies is the same as at least one of the third and fourth carrier frequencies.

In another version of method embodiment (15) said first and second sectors are located in the first cell. In still another embodiment of method embodiment (15) said second sector is located in a second cell which is different from said first cell in which said first sector is located.

In one particular version of exemplary method embodiment (15) referred to as method embodiment (20) the mobile communications device stores cell type information including information about different carriers used within a cell and the method further includes receiving, prior to receiving said first beacon signal, a first cell type indicator signal, and determining from the received first cell type indicator signal and said stored information different carrier frequencies which are used in said first cell.

In one version of exemplary method (20) the stored cell type information further includes information indicating the relative power difference at which signals on different carriers are transmitted within the first cell and the method further comprises determining from the received first cell type indicator signal and said stored information the relative power difference used by the corresponding network attachment point to transmit signals corresponding to the first and second carrier frequencies in the first sector. Such an embodiment is referred to as method embodiment (21). In one such embodiment, the first cell is a single sector cell.

In another version of method embodiment (15), referred to as method embodiment (23) the mobile communications device stores cell sector type information including information about different carriers used with a sector and the relative transition power level used for each of said different carriers, the method further comprising receiving, prior to receiving said first beacon signal, a first sector type indicator signal, and determining from the received first sector type indicator signal and said stored information different carrier frequencies which are used in said first sector.

In one version of method embodiment (23), the stored sector type information further includes information indicating the relative power difference at which signals on different carriers are transmitted within the first sector, and the method further includes determining from the received first sector type indicator signal and said stored information the relative power difference used by the corresponding network attachment point to transmit signals corresponding to the first and second carrier frequencies in the first sector. Such an embodiment is referred to as method embodiment (24). In one version of method embodiment 24, the first cell is a multi-sector cell in which different power levels are used by network attachment points in the sector to transmit signals.

The above embodiments are only intended to be exemplary and the invention is not to be limited solely to the above numbered embodiments.

While described in the context of an OFDM system, the methods and apparatus of the present invention, are applicable to a wide range of communications systems including many non-OFDM and/or non-cellular systems.

In various embodiments nodes described herein are implemented using one or more modules to perform the steps corresponding to one or more methods of the present invention, for example, signal processing, beacon generation, beacon detection, beacon measuring, connection comparisons, connection implementations. In some embodiments various features of the present invention are implemented using modules. Such modules may be implemented using software, hardware or a combination of software and hardware. Many of the above described methods or method steps can be implemented using machine executable instructions, such as software, included in a machine readable medium such as a memory device, e.g., RAM, floppy disk, etc. to control a machine, e.g., general purpose computer with or without additional hardware, to implement all or portions of the above described methods, e.g., in one or more nodes. Accordingly, among other things, the present invention is directed to a machine-readable medium including machine executable instructions for causing a machine, e.g., processor and associated hardware, to perform one or more of the steps of the above-described method(s).

Numerous additional variations on the methods and apparatus of the present invention described above will be apparent to those skilled in the art in view of the above description of the invention. Such variations are to be considered within the scope of the invention. The methods and apparatus of the present invention may be, and in various embodiments are, used with CDMA, orthogonal frequency division multiplexing (OFDM), and/or various other types of communications techniques which may be used to provide wireless communications links between access nodes and mobile nodes. In some embodiments the access nodes are implemented as base stations which establish communications links with mobile nodes using OFDM and/or CDMA. In various embodiments the mobile nodes are implemented as notebook computers, personal data assistants (PDAs), or other portable devices including receiver/transmitter circuits and logic and/or routines, for implementing the methods of the present invention.

What is claimed is:

1. A communications method comprising:
periodically broadcasting cell type information over the air from a base station in a cell of a system including a plurality of different types of cells, said cell type information permitting a mobile node to determine from the broadcast cell type information the number of sectors, the number of carriers used, and relative transmission power levels for the carriers by sector in the cell from which the cell type information is broadcast.

2. The method of claim 1, wherein said cell type information is a cell type identifier, said cell type identifier corresponding to one of a plurality of at least three different cell type identifiers used in said system, said three different cell type identifiers including:
a first cell type identifier, the first cell type identifier corresponding to a cell including three sectors, each sector using the same carrier frequency; and
a second cell type identifier, the second cell type identifier corresponding to a cell including three sectors, each sector using a different carrier frequency.

3. The method of claim 2, wherein said plurality of different cell type identifiers further includes:
a third cell type identifier, the third cell type identifier corresponding to a cell including three sectors and using three different carrier frequencies in each of said three different sectors, the total number of carriers used in a cell of the third type being three.

4. The method of claim 3, wherein said plurality of different cell type identifiers further includes:
a fourth cell type identifier, the fourth cell type identifier corresponding to a cell including one sector and using a single carrier frequency.

5. The method of claim 1,
wherein said cell type information is a third cell type identifier, said third cell type identifier being one of a plurality of at least three different values used in said system to identify different types of cells;
wherein said third cell type identifier indicates that said cell is of a third cell type corresponding to a cell including three sectors and using three different carrier frequencies in each of said three different sectors, said three different carrier frequencies including a first carrier frequency, a second carrier frequency and a third carrier frequency, the method further comprising:
operating sector transmitters corresponding to different sectors of said cell to each use a different average transmission power level for each of the first, second and third carrier frequencies.

6. The method of claim 5,
wherein periodically broadcasting cell type information includes:
operating sector transmitters corresponding to said cell to periodically transmit a narrow band high power signal into each of three different frequency bands corresponding to each of the three different carrier frequencies used by said cell, said narrow band high power signals being transmitted at predetermined frequencies and communicating said broadcast cell type information.

7. The method of claim 6, wherein said narrow band signals are single tone signals.

8. The method of claim 6, wherein the narrow band signal transmitted by a sector transmitter is transmitted into the sector with the same power level for each of the three different carrier frequencies.

9. A method of operating a mobile communications device in a system which uses multiple carrier frequencies, the method comprising:
receiving a first beacon signal corresponding to a first carrier frequency of a first sector of a first cell;

measuring the energy in the received first beacon signal to generate an estimate of the quality of a first communications link that can be established to a first network attachment point corresponding to the first carrier frequency in the first sector of the first cell; and estimating the quality of a communications link that can be established to a second network attachment point in said first sector of said first cell corresponding to a second carrier frequency, which is different from the first carrier frequency, based on the energy measured in the first received beacon signal and known information about a fixed power difference between the transmission power level of signals transmitted in said first sector using the first and second carrier frequencies.

10. The method of claim 9, further comprising:
selecting between the first and second carrier frequencies as a function of an estimate of the quality of the first communications link and the second communications link.

11. The method of claim 9, further comprising:
receiving a second beacon signal transmitted by a network attachment point of a second sector, the second beacon signal corresponding to a third carrier frequency used by said second sector;
measuring the energy in the received second beacon signal to generate an estimate of the quality of a third communications link that can be established to a third network attachment point corresponding to the third carrier frequency in the second sector.

12. The method of claim 11, further comprising:
estimating the quality of a communications link that can be established to a fourth network attachment point in said second sector corresponding to a fourth carrier frequency, which is different from the third carrier frequency, based on the energy measured in the second received beacon signal and known information about a fixed power difference between the transmission power level of signals transmitted in said second sector using the third and fourth carrier frequencies.

13. The method of claim 12, further comprising:
selecting one of the first, second, third, and fourth carrier frequencies and establishing a communications link with the corresponding one of the first, second, third, and fourth network attachment points, as a function of an estimate of the quality of the first, second, third, and fourth communications links.

14. The method of claim 13, wherein at least one of the first and second carrier frequencies is the same as at least one of the third and fourth carrier frequencies.

15. The method of claim 12, wherein said first and second sectors are located in the first cell.

16. The method of claim 12, wherein said second sector is located in a second cell which is different from said first cell in which said first sector is located.

17. The method of claim 12, wherein said mobile communications device stores cell type information including information about different carriers used within a cell, the method further comprising:
receiving, prior to receiving said first beacon signal, a first cell type indicator signal, and
determining from the received first cell type indicator signal and said stored information different carrier frequencies which are used in said first cell.

18. The method of claim 17, wherein the stored cell type information further includes information indicating a relative power difference at which signals on different carriers are transmitted within the first cell, the method further comprising:
determining from the received first cell type indicator signal and said stored information the relative power difference used by the corresponding network attachment point to transmit signals corresponding to the first and second carrier frequencies in the first sector.

19. The method of claim 18, wherein the first cell is a single sector cell.

20. The method of claim 12, wherein said mobile communications device stores cell sector type information including information about different carriers used with a sector and a relative transmission power level used for each of said different carriers, the method further comprising:
receiving, prior to receiving said first beacon signal, a first sector type indicator signal, and
determining from the received first sector type indicator signal and said stored information different carrier frequencies which are used in said first sector.

21. The method of claim 20, wherein the stored sector type information further includes information indicating the relative power difference at which signals on different carriers are transmitted within the first sector, the method further comprising:
determining from the received first sector type indicator signal and said stored information the relative power difference used by the corresponding network attachment point to transmit signals corresponding to the first and second carrier frequencies in the first sector.

22. The method of claim 21, wherein the first cell is a multi-sector cell in which different power levels are used by network attachment points in the sector to transmit signals.

23. A method of operating a communications device in a system including first and second sectors, each of the first and second sectors using at least N carrier frequencies, the N carrier frequencies being the same in the first and second sectors, where N is an integer greater than one, a different frequency band being associated with each of the different carrier frequencies, the method comprising:
receiving first and second measurement signals within a frequency band corresponding to a single one of the N carrier frequencies, said first measurement signal having been transmitted at a first predetermined power level having a known fixed power relationship to power levels used to transmit user data in the first sector using each of the N carrier frequencies, said second measurement signal having been transmitted at a second power level having a predetermined fixed power relationship to power levels used to transmit user data in the second sector using each of the N carrier frequencies;
measuring the received power of the first measurement signal;
measuring the received power of the second measurement signal;
estimating from the measured received power of the first measurement signal, for each of the N carriers in the first sector, an estimated received data power level for data transmitted using one of the N carriers used in the first sector to thereby generate a first set of N data signal power estimates corresponding to the first sector, each of the N data signal power estimates corresponding to a different one of the N carrier signals used in the first sector;
estimating from the measured received power of the second measurement signal, for each of the N carriers in the second sector, an estimated received data power level for data transmitted using one of the N carriers used in the second sector to thereby generate a second set of N data signal power estimates corresponding to the second sector, each of the N data signal power estimates corresponding to a different one of the N carrier signals used in the second sector;

for each of the N carriers selecting, as a function of the estimated data signal power estimates included in the first and second sets of N data signal power estimates, a corresponding sector;

for each of the N carriers and said corresponding N selected sectors, generating a communication link quality estimate, N communication link quality estimates being generated; and selecting as a function of the generated N communication link quality estimates a carrier to use for data communications.

24. The method of claim 23, wherein for each of the N carriers said selected corresponding sector is the sector having the highest estimated received data power level for the particular one of the N carriers.

25. The method of claim 24, wherein said communication link quality estimate is a signal to interference estimate.

26. The method of claim 25, wherein said signal to interference estimate is an estimated signal to interference ratio.

27. The method of claim 26, further comprising:
establishing a communications link with the selected sector corresponding to the selected carrier frequency using said selected carrier frequency.

28. The method of claim 27, where generating the signal to interference estimate corresponding to a carrier frequency includes taking a ratio of the estimated received data signal power levels.

29. The method of claim 28, wherein the first and second measurement signals are beacon signals transmitted by the first and second sectors, respectively.

30. The method of claim 28, wherein the predetermined measurement signal power relationship to user data transmitted on at least one of the N carriers in the first sector is known to indicate that zero power is used to transmit user data on said at least one of the N carriers in the first sector.

31. The method of claim 28, wherein N is three.

32. The method of claim 28, wherein each cell in said system includes 3 sectors.

33. The method of claim 28,
wherein each of the first and second sectors correspond to first and second cells, respectively, and
wherein N is three.

34. The method of claim 33,
wherein the power relationship between each of the 3 carriers is the same in each of the cells of said system.

35. The method of claim 23, wherein in said known fixed power relationship the set of the power ratios of the power levels used to transmit user data and the power level used to transmit said measurement signal is fixed, the same in the first and the second sectors, and known to said communication device.

36. The method of claim 28, further comprising:
receiving said predetermined power relationship information from a base station over a wireless communications link.

37. The method of claim 32, wherein each of the 3 sectors uses a different user data transmission power level for at least one of the N carriers, sectors of different cells that are oriented in the same direction using the same relative user data transmission power levels to measurement signal transmission power level for each of the N carriers.

38. A mobile communications device for use in a system including first and second sectors, each of the first and second sectors using at least N carrier frequencies, the N carrier frequencies being the same in the first and second sectors, where N is an integer greater than one, a different frequency band being associated with each of the different carrier frequencies, the mobile communications device comprising:

a receiver for receiving first and second measurement signals within a frequency band corresponding to a single one of the N carrier frequencies, said first measurement signal having been transmitted at a first predetermined power level having a known fixed power relationship to power levels used to transmit user data in the first sector using each of the N carrier frequencies, said second measurement signal having been transmitted at a second power level having a predetermined fixed power relationship to power levels used to transmit user data in the second sector using each of the N carrier frequencies;

means for measuring the received power of the first measurement signal;

means for measuring the received power of the second measurement signal;

means for estimating from the measured received power of the first measurement signal, for each of the N carriers in the first sector, an estimated received data power level for data transmitted using one of the N carriers used in the first sector to thereby generate a first set N data signal power estimates corresponding to the first sector, each of the N data signal power estimates corresponding to a different one of the N carrier signals used in the first sector;

means for estimating from the measured received power of the second measurement signal, for each of the N carriers in the second sector, an estimated received data power level for data transmitted using one of the N carriers used in the second sector to thereby generate a second set of N data signal power estimates corresponding to the second sector, each of the N data signal power estimates corresponding to a different one of the N carrier signals used in the second sector;

means for selecting, for each of the N carriers, as a function of the estimated data signal power estimates included in the first and second sets of N data signal power estimates, a corresponding sector;

means for generating, for each of the N carriers and said corresponding N selected sectors, a communication link quality estimate, N communication link quality estimates being generated; and means for selecting as a function of the generated N communication link quality estimates a carrier to use for data communications.

39. The device of claim 38, wherein for each of the N carriers said selected corresponding sector is the sector having the highest estimated received data power level for the particular one of the N carriers.

40. The device of claim 39, wherein said communication link quality estimate is a signal to interference estimate.

41. The device of claim 40, wherein said signal to interference estimate is an estimated signal to interference ratio.

42. The device of claim 41, further comprising:
means for establishing a communications link with the selected sector corresponding to the selected carrier frequency using said selected carrier frequency.

43. The device of claim 42, where said means for generating the signal to interference estimate corresponding to a carrier frequency includes means for taking a ratio of the estimated received data signal power levels.

44. A mobile communications device for use in a system including first and second sectors, each of the first and second sectors using at least N carrier frequencies, the N carrier frequencies being the same in the first and second sectors, where N is an integer greater than one, a different frequency band being associated with each of the different carrier frequencies, the mobile communications device comprising:
- a receiver module for receiving first and second measurement signals within a frequency band corresponding to a single one of the N carrier frequencies, said first measurement signal having been transmitted at a first predetermined power level having a known fixed power relationship to power levels used to transmit user data in the first sector using each of the N carrier frequencies, said second measurement signal having been transmitted at a second power level having a predetermined fixed power relationship to power levels used to transmit user data in the second sector using each of the N carrier frequencies;
- a received power signal measurement module for measuring the received power of the first measurement signal and for measuring the received power of the second measurement signal;
- a first estimation module for estimating from the measured received power of the first measurement signal, for each of the N carriers in the first sector, an estimated received data power level for data transmitted using one of the N carriers used in the first sector to thereby generate a first set of N data signal power estimates corresponding to the first sector, each of the N data signal power estimates corresponding to a different one of the N carrier signals used in the first sector;
- a second estimation module for estimating from the measured received power of the second measurement signal, for each of the N carriers in the second sector, an estimated received data power level for data transmitted using one of the N carriers used in the second sector to thereby generate a second set of N data signal power estimates corresponding to the second sector, each of the N data signal power estimates corresponding to a different one of the N carrier signals used in the second sector;
- a first selection module for selecting, for each of the N carriers, as a function of the estimated data signal power estimates included in the first and second sets of N data signal power estimates, a corresponding sector;
- link quality estimate generation module for generating, for each of the N carriers and said corresponding N selected sectors, a communication link quality estimate, N communication link quality estimates being generated; and
- a carrier selection module for selecting as a function of the generated N communication link quality estimates a carrier to use for data communications.

45. The device of claim 44, wherein for each of the N carriers said selected corresponding sector is the sector having the highest estimated received data power level for the particular one of the N carriers.

46. The device of claim 45, wherein said communication link quality estimate is a signal to interference estimate.

47. A non-transitory computer readable medium embodying machine executable instructions for controlling a base station, said non-transitory computer readable medium comprising:
- instructions for causing the base station to periodically broadcast cell type information over the air, said base station being located in a cell of a system including a plurality of different types of cells, said cell type information permitting a mobile node to determine from the broadcast cell type information the number of sectors, the number of carriers used, and relative transmission power levels for the carriers by sector in the cell from which the cell type information was broadcast.

48. The non-transitory computer readable medium of claim 47, wherein said cell type information is a cell type identifier, said cell type identifier corresponding to one of a plurality of at least three different cell type identifiers used in said system, said three different cell type identifiers including:
- a first cell type identifier, the first cell type identifier corresponding to a cell including three sectors, each sector using the same carrier frequency; and
- a second cell type identifier, the second cell type identifier corresponding to a cell including three sectors, each sector using a different carrier frequency.

49. The non-transitory computer readable medium of claim 48, wherein said plurality of different cell type identifiers further includes:
- a third cell type identifier, the third cell type identifier corresponding to a cell including three sectors and using three different carrier frequencies in each of said three different sectors.

50. The non-transitory computer readable medium of claim 49, wherein said plurality of different cell type identifiers further includes:
- a fourth cell type identifier, the fourth cell type identifier corresponding to a cell including one sector and using a single carrier frequency.

51. A mobile communications device in a system which uses multiple carrier frequencies, the device comprising:
- reception means for receiving a first beacon signal corresponding to a first carrier frequency of a first sector of a first cell;
- energy measurement means for measuring the energy in the received first beacon signal to generate an estimate of the quality of a first communications link that can be established to a first network attachment point corresponding to the first carrier frequency in the first sector of the first cell; and
- link quality estimation means for estimating the quality of a communications link that can be established to a second network attachment point in said first sector of said first cell corresponding to a second carrier frequency, which is different from the first carrier frequency, based on the energy measured in the first received beacon signal and known information about a fixed power difference between the transmission power level of signals transmitted in said first sector using the first and second carrier frequencies.

52. The device of claim 51, further comprising:
- means for selecting between the first and second carrier frequencies as a function of an estimate of the quality of the first communications link and the second communications link.

53. A mobile communications device in a system which uses multiple carrier frequencies, the device comprising:
- reception means for receiving a first beacon signal corresponding to a first carrier frequency of a first sector of a first cell and for receiving a second beacon signal transmitted by a network attachment point of a second sector, the second beacon signal corresponding to a third carrier frequency used by said second sector;
- energy measurement means for measuring the energy in the received first beacon signal to generate an estimate of the quality of a first communications link that can be established to a first network attachment point corresponding to the first carrier frequency in the first sector of the first cell, said energy measurement means also being for measuring the energy in the received second beacon signal for use in generating an estimate of the quality of a third communications link that can be established to a third network attachment point corresponding to the third carrier frequency in the second sector; and link quality estimation means for estimating the quality of a communications link that can be established to a second network attachment point in said first sector of said first cell corresponding to a second carrier frequency, which is different from the first carrier frequency, based on the energy measured in the first received beacon signal and known information about a fixed power difference between the transmission power level of signals transmitted in said first sector using the first and second carrier frequencies.

54. The device of claim 53, wherein said link quality estimation means is also for estimating the quality of a communications link that can be established to a fourth network attachment point in said second sector corresponding to a fourth carrier frequency, which is different from the third carrier frequency, based on the energy measured in the second received beacon signal and known information about a fixed power difference between the transmission power level of signals transmitted in said second sector using the third and fourth carrier frequencies.

55. A non-transitory computer readable medium embodying machine executable instruction for implementing a method of operating a mobile communications device in a system which uses multiple carrier frequencies, the method comprising:

receiving a first beacon signal corresponding to a first carrier frequency of a first sector of a first cell;

measuring the energy in the received first beacon signal to generate an estimate of the quality of a first communications link that can be established to a first network attachment point corresponding to the first carrier frequency in the first sector of the first cell; and estimating the quality of a communications link that can be established to a second network attachment point in said first sector of said first cell corresponding to a second carrier frequency, which is different from the first carrier frequency, based on the energy measured in the first received beacon signal and known information about a fixed power difference between the transmission power level of signals transmitted in said first sector using the first and second carrier frequencies.

56. The non-transitory computer readable medium of claim 55, further embodying machine executable instructions for:

selecting between the first and second carrier frequencies as a function of an estimate of the quality of the first communications link and the second communications link.

57. The non-transitory computer readable medium of claim 55, further embodying machine executable instructions for:

receiving a second beacon signal transmitted by a network attachment point of a second sector, the second beacon signal corresponding to a third carrier frequency used by said second sector; and measuring the energy in the received second beacon signal to generate an estimate of the quality of a third communications link that can be established to a third network attachment point corresponding to the third carrier frequency in the second sector.

58. The non-transitory computer readable medium of claim 57, further embodying machine executable instructions for:

estimating the quality of a communications link that can be established to a fourth network attachment point in said second sector corresponding to a fourth carrier frequency, which is different from the third carrier frequency, based on the energy measured in the second received beacon signal and known information about a fixed power difference between the transmission power level of signals transmitted in said second sector using the third and fourth carrier frequencies.

59. An apparatus for use in a system which uses multiple carrier frequencies, the apparatus comprising:

a processor configured to:

receive a first beacon signal corresponding to a first carrier frequency of a first sector of a first cell;

measure the energy in the received first beacon signal to generate an estimate of the quality of a first communications link that can be established to a first network attachment point corresponding to the first carrier frequency in the first sector of the first cell; and estimate the quality of a communications link that can be established to a second network attachment point in said first sector of said first cell corresponding to a second carrier frequency, which is different from the first carrier frequency, based on the energy measured in the first received beacon signal and known information about a fixed power difference between the transmission power level of signals transmitted in said first sector using the first and second carrier frequencies.

60. The apparatus of claim 59, wherein said processor is further configured to:

select between the first and second carrier frequencies as a function of an estimate of the quality of the first communications link and the second communications link.

61. An apparatus for use in a system which uses multiple carrier frequencies, the apparatus comprising:

a processor configured to:

receive a first beacon signal corresponding to a first carrier frequency of a first sector of a first cell;

measure the energy in the received first beacon signal to generate an estimate of the quality of a first communications link that can be established to a first network attachment point corresponding to the first carrier frequency in the first sector of the first cell;

receive a second beacon signal transmitted by a network attachment point of a second sector, the second beacon signal corresponding to a third carrier frequency used by said second sector;

measure the energy in the received second beacon signal to generate an estimate of the quality of a third communications link that can be established to a third network attachment point corresponding to the third carrier frequency in the second sector; and estimate the quality of a communications link that can be established to a second network attachment point in said first sector of said first cell corresponding to a second carrier frequency, which is different from the first carrier frequency, based on the energy measured in the first received beacon signal and known information about a fixed power difference between the transmission power level of signals transmitted in said first sector using the first and second carrier frequencies.

62. The apparatus of claim 61, wherein said processor is further configured to:

estimate the quality of a communications link that can be established to a fourth network attachment point in said second sector corresponding to a fourth carrier frequency, which is different from the third carrier frequency, based on the energy measured in the second received beacon signal and known information about a fixed power difference between the transmission power level of signals transmitted in said second sector using the third and fourth carrier frequencies.

63. A base station comprising:
a processor configured to:
periodically broadcasting cell type information over the air from said base station, said base station being located in a cell of a system including a plurality of different types of cells, a mobile node being able to determine from the broadcast cell type information the number of sectors, the number of carriers used, and relative transmission power levels for the carriers by sector in the cell from which the cell type information was broadcast.

64. A base station comprising:
a module for periodically broadcasting cell type information over the air from said base station, said base station being located in a cell of a system including a plurality of different types of cells, a mobile node being able to determine from the broadcast cell type information the number of sectors, the number of carriers used, and relative transmission power levels for the carriers by sector in the cell from which the cell type information was broadcast.

65. The base station of claim 64, wherein said cell type information is a cell type identifier, said cell type identifier corresponding to one of a plurality of at least three different cell type identifiers used in said system, said three different cell type identifiers including:
 a first cell type identifier, the first cell type identifier corresponding to a cell including three sectors, each sector using the same carrier frequency; and
 a second cell type identifier, the second cell type identifier corresponding to a cell including three sectors, each sector using a different carrier frequency.

66. The base station of claim 65, wherein said plurality of different cell type identifiers further includes:
 a third cell type identifier, the third cell type identifier corresponding to a cell including three sectors and using three different carrier frequencies in each of said three different sectors.

67. A base station comprising:
means for periodically broadcasting cell type information over the air, said base station being located in a cell of a system including a plurality of different types of cells, a mobile node being able to determine from the broadcast cell type information the number of sectors, the number of carriers used, and relative transmission power levels for the carriers by sector in the cell from which the cell type information is broadcast.

68. The base station of claim 67, wherein said cell type information is a cell type identifier, said cell type identifier corresponding to one of a plurality of at least three different cell type identifiers used in said system, said three different cell type identifiers including:
 a first cell type identifier, the first cell type identifier corresponding to a cell including three sectors, each sector using the same carrier frequency; and
 a second cell type identifier, the second cell type identifier corresponding to a cell including three sectors, each sector using a different carrier frequency.

69. The base station of claim 68, wherein said plurality of different cell type identifiers further includes:
 a third cell type identifier, the third cell type identifier corresponding to a cell including three sectors and using three different carrier frequencies in each of said three different sectors.

70. The method of claim 1, wherein said base station corresponds to a single cell.

71. The method of claim 70, wherein each sector of said cell corresponds to a different area, each of said different areas extending from said base station in a different direction.

72. The method of claim 2, wherein said first and second cell type identifiers each correspond to a different one of five different possible cell type identifier values.

73. The method of claim 70, wherein said cell type information is the same for multiple cells in said system.

74. The method of claim 1, wherein said cell type information is a cell type identifier.

75. The method of claim 74, wherein said cell type identifier is one of 5 or fewer possible cell type identifier values.

76. The method of claim 75 where said cell type identifier is one of the values 0, 1, 2, 3 and 4.

* * * * *